US009869921B2

(12) United States Patent
Ashizawa et al.

(10) Patent No.: US 9,869,921 B2
(45) Date of Patent: Jan. 16, 2018

(54) DRIVE APPARATUS, DRIVE METHOD, AND OPTICAL DEVICE

(71) Applicant: NIKON CORPORATION, Tokyo (JP)

(72) Inventors: Takatoshi Ashizawa, Tokyo (JP); Kazuyasu Oone, Tokyo (JP); Shinji Nishihara, Tokyo (JP); Toshikazu Morioke, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/152,001

(22) Filed: May 11, 2016

(65) Prior Publication Data

US 2016/0252797 A1    Sep. 1, 2016

Related U.S. Application Data

(62) Division of application No. 14/381,063, filed as application No. PCT/JP2013/055522 on Feb. 28, 2013, now Pat. No. 9,366,940.

(30) Foreign Application Priority Data

Feb. 28, 2012  (JP) .................................. 2012-042439
Mar. 16, 2012  (JP) .................................. 2012-059692
(Continued)

(51) Int. Cl.
*G03B 3/10*    (2006.01)
*G02B 7/08*    (2006.01)
(Continued)

(52) U.S. Cl.
CPC ................. *G03B 3/10* (2013.01); *G02B 7/04* (2013.01); *G02B 7/08* (2013.01); *G02B 7/36* (2013.01);
(Continued)

(58) Field of Classification Search
None
See application file for complete search history.

(56) References Cited

U.S. PATENT DOCUMENTS 5,508,579 A      4/1996  Suganuma
5,777,232 A *    7/1998  Kurita .................... G05D 19/02
                                                    198/750.1
(Continued)

FOREIGN PATENT DOCUMENTS

JP    S59-178981 A    10/1984
JP       117354 B2     3/1989
(Continued)

OTHER PUBLICATIONS

Nov. 9, 2015 Extended European Search Report issued in European Patent Application No. 13755457.2.
(Continued)

*Primary Examiner* — Clayton E Laballe
*Assistant Examiner* — Dennis Hancock
(74) *Attorney, Agent, or Firm* — Oliff PLC

(57) ABSTRACT

Noise produced during phase-difference changes is minimized without decreasing the responsiveness of a vibration-wave motor. A lens-side MCU for a lens barrel controls a drive apparatus that applies a drive voltage to the vibration-wave motor by outputting an A-phase drive signal and a B-phase drive signal thereto. The lens-side MCU uses, for example, a drive-voltage setting unit and a duty-cycle change unit to change the drive voltage. Also, the lens-side MCU is provided with a phase-difference change unit that changes the phase difference between the A-phase drive signal and the B-phase drive signal. When driving the vibration-wave motor, the lens-side MCU changes the drive voltage to $V_{reg}$, and when the phase-difference change unit is changing the aforementioned phase difference, the drive (Continued)

voltage is changed to $V_1$, $V_1$ being greater than zero and less than $V_{reg}$.

5 Claims, 46 Drawing Sheets

(30) Foreign Application Priority Data

| Dec. 28, 2012 | (JP) | ................................. 2012-286941 |
|---|---|---|
| Dec. 28, 2012 | (JP) | ................................. 2012-287812 |
| Feb. 7, 2013 | (JP) | ................................. 2013-022196 |

(51) Int. Cl.
*H02N 2/14* (2006.01)
*H02N 2/16* (2006.01)
*G02B 7/04* (2006.01)
*G02B 7/36* (2006.01)

(52) U.S. Cl.
CPC ............. *H02N 2/142* (2013.01); *H02N 2/163* (2013.01); *G03B 2205/0084* (2013.01)

(56) References Cited

U.S. PATENT DOCUMENTS

| 5,874,799 A * | 2/1999 | Mitaraí .................. H02N 2/142 310/316.01 |
|---|---|---|
| 6,031,316 A * | 2/2000 | Kataoka ............... H02N 2/0015 310/316.02 |
| 6,825,592 B2 * | 11/2004 | Magnussen ......... H01L 41/0906 310/316.01 |
| 2001/0020809 A1 * | 9/2001 | Matsuo ................ H02N 2/0025 310/328 |
| 2005/0046308 A1 | 3/2005 | Endo |
| 2011/0068718 A1 | 3/2011 | Murakami |
| 2011/0164331 A1 | 7/2011 | Sugiyama |
| 2012/0177354 A1 | 7/2012 | Ashizawa et al. |

FOREIGN PATENT DOCUMENTS

| JP | 322873 A | 1/1991 |
|---|---|---|
| JP | 4-200282 A | 7/1992 |
| JP | 783702 A | 3/1995 |
| JP | 880073 A | 3/1996 |
| JP | 2002-199749 A | 7/2002 |
| JP | 2006-115583 A | 4/2006 |
| JP | 2009-75419 A | 4/2009 |
| JP | 2009-153286 A | 7/2009 |
| JP | 2011-67035 A | 3/2011 |
| JP | 4765405 B2 | 9/2011 |

OTHER PUBLICATIONS

Oct. 6, 2015 Office Action issued in Japanese Patent Application No. 2012-059692.
Jun. 11, 2013 International Search Report issued in International Patent Application No. PCT/JP2013/055522.
Jul. 15, 2015 Requirement for Restriction-Election issued in U.S. Appl. No. 14/381,063.
Feb. 12, 2016 Notice of Allowance issued in U.S. Appl. No. 14/381,063.

* cited by examiner

FIG. 10

| CHANGE RATE OF PHASE DIFFERENCE [deg/msec] | PROPORTION OF $V_1$ TO $V_{reg}$ [%] ← 50 | | | |
|---|---|---|---|---|
| | 100 | 75 | 50 | 25 |
| 90 | 3 | 3 | 2 | 1 |
| 30 | 3 | 2 | 2 | 1 |
| 5 | 2 | 2 | 1 | 1 |

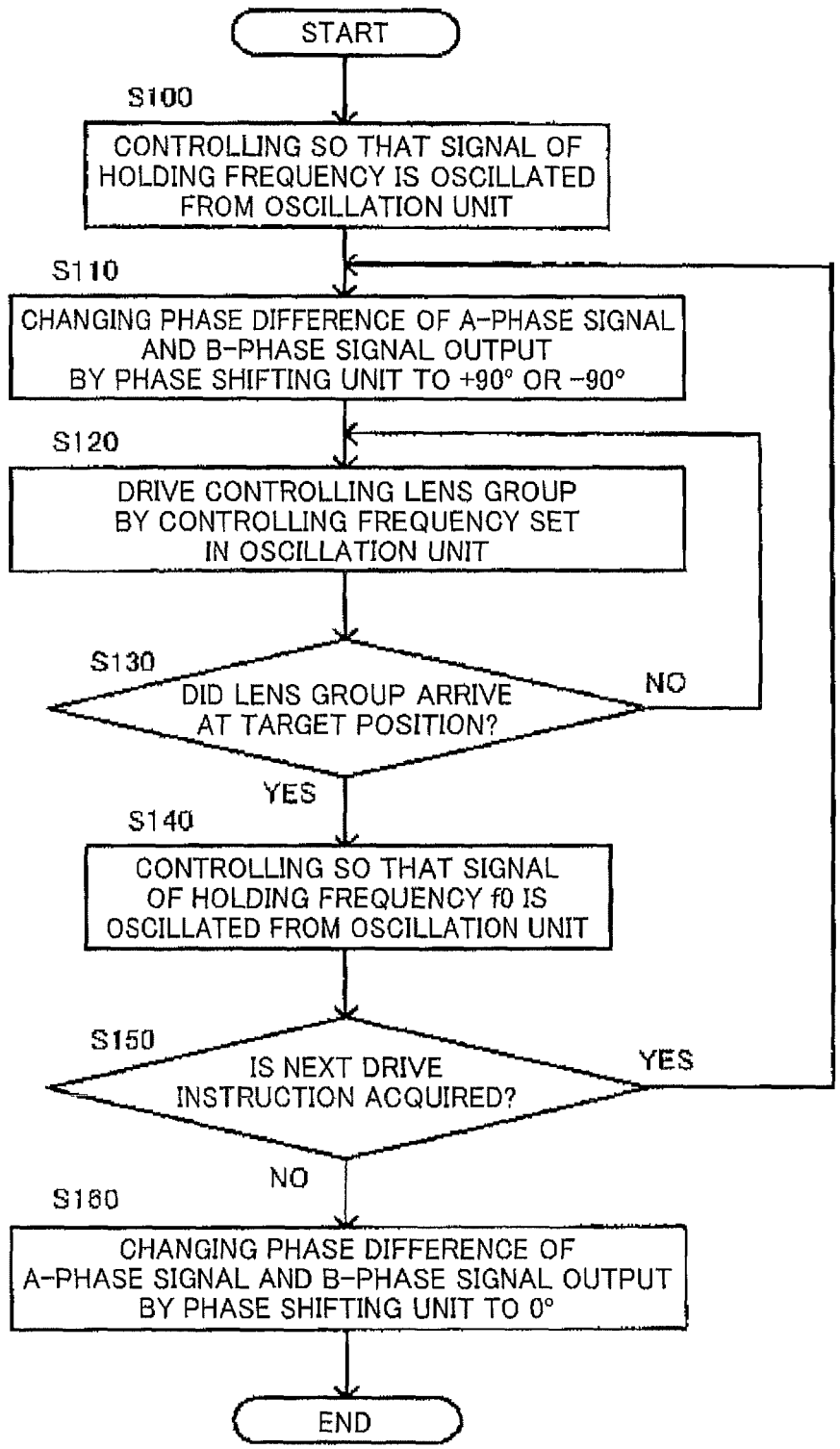

RELATIONSHIP OF PHASE DIFFERENCE - ROTATIONAL SPEED

RELATIONSHIP BETWEEN FREQUENCY - ROTATIONAL SPEED

DRIVE APPARATUS, DRIVE METHOD, AND OPTICAL DEVICE

This application is a Division of application Ser. No. 14/381,063 filed Dec. 29, 2014, which is a National Stage of PCT/JP2013/055522, filed Feb. 28, 2013, and claims the benefit of priority (priorities) from Japanese Patent Application No. 2013-022196 filed Feb. 7, 2013, Japanese Patent Application No. 2012-287812 filed Dec. 28, 2012, Japanese Patent Application No. 2012-286941 filed Dec. 28, 2012, Japanese Patent Application No. 2012-059692 filed Mar. 16, 2012, and Japanese Patent Application No. 2012-042439 filed Feb. 28, 2012, the entire contents of the prior applications being incorporated herein by reference.

TECHNICAL FIELD

The present invention relates to a drive apparatus, a drive method and an optical device.

BACKGROUND ART (1) A technique of suppressing the generation of abnormal noise related to the driving of a vibration wave motor has been known (for example, refer to Patent Document 1). In Patent Document 1, abnormal noise when stopping the vibration-wave motor is suppressed by causing the phase difference between an A-phase drive signal and a B-phase drive signal to gradually vary from 90 deg to 0 deg.

(2) An imaging device that performs processing such as auto-focus by driving an optical system by way of a vibration-wave motor has been known (Patent Document 2).

(3) A vibration actuator causes a progressive vibration wave (hereinafter abbreviated as progressive wave) to generate at the driving face of an elastic body using the expansion and contraction of a piezoelectric body, causing an elliptic motion to occur at the driving face by way of this progressive wave, thereby driving a moving element in pressurized contact with the wave crest of the elliptic motion (for example, refer to Patent Document 3). Such a vibration actuator has a characteristic in having high torque even at low revolutions, and in the case of equipping to a drive apparatus, it is possible to omit gears in the drive apparatus. For this reason, it is possible to achieve quieting by elimination gear noise, and the positioning accuracy also improves. This vibration actuator has been equipped to some electric cameras. In addition, some electric cameras can perform photography of a moving image in addition to photography of still images (refer to Patent Document 4). In the case of performing photography of a moving image, normally the capturing of sound is also performed.

(4) Conventionally, two vibration signals having different phases from each other are applied to a piezoelectric effect element in order to drive the vibration actuator. The frequency of the vibration signal inputted starts from a frequency (startup frequency) between the drive frequency used in order to drive the vibration actuator and a resonance frequency of a next higher-order vibration mode to a vibration mode (drive mode) including this drive frequency, and gradually lowers to the drive frequency (for example, refer to Patent Document 5).

(5) Conventionally, the drive apparatus of a vibration actuator has controlled the operation of the vibration actuator by causing the phase difference and frequency of alternating signals input to the vibration actuator to vary (for example, Patent Document 6).

[Patent Document 1]: Japanese Unexamined Patent Application, Publication No. 2002-199749
[Patent Document 2]: Japanese Unexamined Patent Application, Publication No. 2009-153286
[Patent Document 3]: Japanese Patent Publication No. H01-017354
[Patent Document 4]: Japanese Unexamined Patent Application, Publication No. H08-080073
[Patent Document 5]: Japanese Unexamined Patent Application, Publication No. H03-022873
[Patent Document 6]: Japanese Patent Publication No. 4765405

DISCLOSURE OF THE INVENTION

Problems to be Solved by the Invention (1) Upon performing stopping of a vibration-wave motor and reverse rotation to the driving direction, the phase difference between the A-phase drive signal and B-phase drive signal has been made to change. With a method of causing the phase difference to gradually change, the responsiveness of the vibration-wave motor is harmed, as in Patent Document 1.

(2) Upon switching the driving direction of an optical system by way of a vibration-wave motor, there has been a problem in that abnormal noise occurs. Upon switching the driving direction with the invention of Patent Document 2, driving of the optical system is temporarily stopped by causing the voltage application to the vibration-wave motor to stop. At this time, abnormal noises generate accompanying the energy rise inside the drive circuit, upon performing voltage application to the vibration-wave motor for driving after switching direction. These abnormal noises are then recorded during moving image photography, etc. by the imaging device, for example.

(3) During moving image photography, when the lens is driven in auto-focus (hereinafter abbreviated as AF), the sound at the time of operation start of the vibration actuator is captured along with the moving image. The sound at the time of operation start of the vibration actuator is generated from the stator (vibrator) upon causing the drive voltage to change from 0 V step-wise to a predetermined voltage during the driving of the vibration actuator.

(4) The above-mentioned startup frequency cannot be defined as such a high frequency because it is limited to a frequency between the drive frequency and the resonance frequency of the next higher-order vibration mode of this drive mode. Therefore, due to not being started from a sufficiently high frequency at the time of startup, an outbreak sound may generate by the vibrator 20 suddenly beginning vibration.

In recent years, there are many cases of a vibration actuator being used in cameras for moving image photography, and in these case, this outbreak sound is captured during moving image photography, etc. In particular, during moving image photography, the generation of this abnormal noise is further actualized since a wobbling operation is performed and the power source is frequently turned ON-OFF.

(5) The drive apparatus of Patent Document 6 enters a state in which electricity is always being supplied during control of the vibration actuator; therefore, there has been a problem in that electricity consumption rises.

The object of the present invention is to provide a drive apparatus, a drive method and an optical device that can suppress the generation of abnormal noise. Another object of the present invention is to provide a drive apparatus and optical device that can reduce the electricity consumption of a vibration actuator during control.

Means for Solving the Problems

A first aspect of the present invention provides an optical device including: a vibration actuator for which a driving direction changes according to a phase difference between a first drive signal and a second drive signal; a drive apparatus that applies a drive voltage to the vibration actuator by outputting the first drive signal and the second drive signal; a drive voltage change unit that changes the drive voltage; and a phase difference change unit that changes the phase difference, wherein the drive voltage change unit changes the drive voltage to a first voltage in a case of driving the vibration actuator, and changes the drive voltage to a second voltage that is greater than 0 and less than the first voltage in a case of the phase difference change unit changing the phase difference.

A second aspect of the present invention provides a drive apparatus, including: a signal generation unit that generates a pair of drive signals; an electro-mechanical conversion element to which the drive signals generated by the signal generation unit are applied; a vibrating body that generates a drive force by way of vibration of the electro-mechanical conversion element; a moving body that is under pressurized contact with the vibrating body and is driven by way of the drive force; and a control unit that sets a frequency and phase difference of the drive signals, wherein the control unit changes the phase difference after setting the frequency to a holding frequency at which a drive speed of the moving body becomes substantially zero, when changing a driving direction of the moving body.

A third aspect of the present invention provides an optical device, including: vibration actuator that drive a lens using a drive force generated at a driving face by way of excitation of an electro-mechanical conversion element; a drive control unit that provides two drive signals to the vibration actuator; and a photography setting unit that can select a moving image photography mode, wherein the drive control unit can change a speed of the vibration actuator, in a case of the photography setting unit selecting the moving image photography mode, by changing a phase difference of the two drive signals, and changing a frequency of the two drive signals to correspond to the phase difference thus changed, while maintaining a voltage of the two drive signals to be constant.

A forth aspect of the present invention provides a drive apparatus, including: a vibrating part having an electro-mechanical energy conversion element to which two drive signals having variable phase difference are inputted; a relative motion part that relatively moves in relation to the vibrating part, by way of a drive force generate at the vibrating part by according to vibration of the electro-mechanical energy conversion element; and a control unit that inputs the two drive signals to the electro-mechanical energy conversion element at a startup frequency that is higher than a drive frequency used in driving, while maintaining at phase difference at which the relative motion part is in a stopped state, and when gradually reducing the frequency of the two drive signals from the startup frequency and reaching the drive frequency, sets the phase difference to a phase difference that enables the relative motion part to relatively move in relation to the vibrating part.

A fifth aspect of the present invention provides a method of driving a vibration actuator, wherein the vibration actuator includes: a vibrating part having an electro-mechanical energy conversion element to which two drive signals having variable phase difference are inputted; and a relative motion part that relatively moves in relation to the vibrating part, by way of a drive force generated at the vibrating part according to vibration of the electro-mechanical energy conversion element, the method comprising the steps of: during startup of the vibration actuator, inputting the two drive signals to the electro-mechanical energy conversion element in a state maintaining a phase difference therebetween at a phase difference at which the relation motion part stays in a stopped state, and at a startup frequency that is higher than the drive frequency used in driving of the vibration actuator; and setting the phase difference to a phase difference at which the relation motion part can relatively move in relation to the vibrating part, upon gradually reducing the frequency of the two drive signals from the startup frequency and reaching the drive frequency.

A sixth aspect of the present invention provides a drive apparatus for controlling driving of a vibration actuator that generates a drive force, by applying two-phase alternating signals having different phases to a piezoelectric body provided to a vibrating body to cause the vibrating body to vibrate, the drive apparatus comprising: a speed control unit that controls a drive speed of the vibration actuator, by causing a frequency of the two-phase alternating signals applied to the piezoelectric body to change; a frequency storage unit that stores a predetermined frequency; and a stop determination unit that determines whether the vibration actuator is stopped, wherein the speed control unit causes the frequency of the alternating signals applied to the piezoelectric body to change to the predetermined frequency stored in the frequency storage unit, in a case of the stop determination unit having determined that the vibration actuator is stopped.

A seventh aspect of the present invention provides a drive apparatus that controls driving of a vibration actuator that generates a drive force, by applying two-phase alternating signals having different phases to a piezoelectric body provided to a vibrating body, the drive apparatus comprising: a speed control unit that controls a drive speed of the vibration actuator, by causing a frequency of the two-phase alternating signals applied to the piezoelectric body to change; and a stop determination unit that determines whether the vibration actuator is stopped, wherein the speed control unit causes the frequency of the alternating signals applied to the piezoelectric body to change so as to approach an electrical resonance frequency, in a case of the stop determination unit having determined that the vibration actuator is stopped.

A eighth aspect of the present invention provides an optical device, including: an electro-mechanical energy conversion element to which a drive signal is applied from a drive circuit; a vibrating body that generates a drive force by way of the electro-mechanical energy conversion element; a moving body that is driven by the drive force of the vibrating body; and a control unit that performs first control to control so that the drive signal becomes a first frequency when causing the moving body to drive, and performs second control to control so that the drive signal becomes a second frequency when the moving body is stopped, wherein the drive circuit has a smaller amount of power consumption when the drive signal is the second drive signal than when the drive signal is the first drive signal.

Effects of the Invention

According to the present invention, it is possible to suppress the generation of abnormal noise.

In addition, it is possible to reduce the electricity consumption of a vibration actuator during control.

BRIEF DESCRIPTION OF THE DRAWINGS

FIG. 10 is a table showing the relationship of a change rate of the phase difference between the A-phase drive signal and the B-phase drive signal and the abnormal noise suppression level during phase difference change;

FIG. 19 is a flowchart related to the drive control of the vibration-wave motor by the drive apparatus according to the third embodiment of the present invention;

Figure 1:
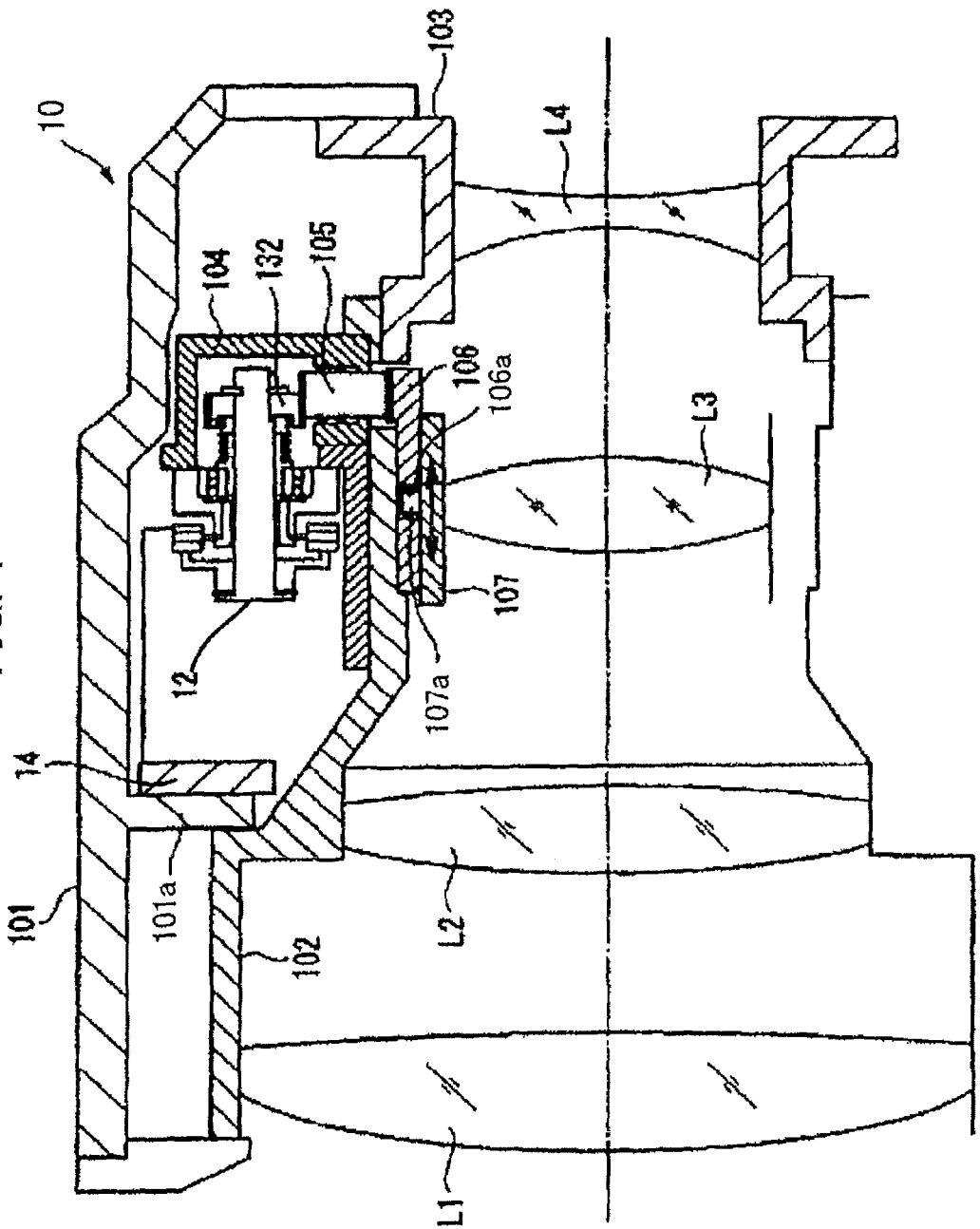
FIG. 1 is a schematic view of a lens barrel according to a first embodiment of the present invention.

EXPLANATION OF REFERENCE NUMERALS 10, 30: lens barrel, 12: vibration-wave motor, 14: drive apparatus, 15, 35: lens-side MCU, 17: storage unit, 20: camera body, 21: body-side MCU, 141: drive pulse generation unit, 142: booster unit, 151: frequency change unit, 152: drive voltage setting unit, 153: duty-cycle change unit, 154,35-4: phase difference change unit, 35-3: power source voltage change unit, 35-5: change rate setting unit, 50: level table, 201: vibration-wave motor, 202: lens barrel, 280: drive circuit, 281: control unit, 282: oscillation part, 283: phase shifting unit, 284a, 284b: amplifier, 290: drive apparatus, 261: vibrating body, 262: moving body, f0: holding frequency, f9, f10: natural frequency, 301: camera, 310: vibration-wave motor, 313: piezoelectric body, 320: lens barrel, 339: contrast detection unit, 341: drive control unit, 347: photography setting unit, 350: vibration-wave motor, 353: piezoelectric body, L3: third lens unit, 501: lens barrel, 502: camera, 520: vibrator, 521: piezoelectric body, 522: elastic body, 522a: driving face, 528: moving element, 600: vibration actuator, 601: drive apparatus, f1: startup frequency, f3: resonance frequency, fs: drive frequency, 710: lens barrel, 720: ultrasonic-wave motor, 722: vibrator, 724: piezoelectric element, 730: drive apparatus, 731: control unit, 731a: speed control part, 731b: stop determination part, 732: drive circuit, 733: storage unit, 734: speed detection unit.

PREFERRED MODE FOR CARRYING OUT THE INVENTION

First Embodiment

FIG. 1 is a schematic view showing the configuration of a lens barrel according to a first embodiment of the present invention. A lens barrel 10 is a lens barrel for an imaging device such as a digital camera. The lens barrel 10 includes an outer fixed cylinder 101, a first inner fixed cylinder 102 and second inner fixed cylinder 103. The outer fixed cylinder 101 covers an outer circumferential part of the lens barrel 10. The first inner fixed cylinder 102 and second inner fixed cylinder 103 are present more on the inner circumferential side than the outer fixed cylinder 101, with the first inner fixed cylinder 102 being positioned on a subject side, and the second inner fixed cylinder 103 being positioned on the image side.

Between the outer fixed cylinder 101 and first inner fixed cylinder 102, a vibration-wave motor (vibration actuator) 12, drive apparatus 14, and gear unit module 104 are provided, and are fixed to the first inner fixed cylinder 102. The gear unit module 104 has a reduction gear 105 that reduces and transmits the output of the vibration-wave motor 12.

In addition, from the subject side, a first lens unit L1 and second lens unit L2 are fixed to the first inner fixed cylinder 102. From the subject side, a fourth lens unit L4 is fixed to the second inner fixed cylinder 103. Between the second lens unit L2 and fourth lens unit L4, the third lens unit L3 is arranged that is an AF lens for focusing retained in an AF ring 107. In other words, the first lens unit L1, second lens unit L2, third lens unit L3 and fourth lens unit L4 are arranged in order in an optical axis direction from the subject side to an imaging element side.

Between the AF ring 107 and first inner fixed cylinder 102, a cam ring 106 is provided to rotate freely about the optical axis direction. The cam ring 106 rotates by way of the output of the vibration-wave motor 12 transmitted by way of the reduction gear 105. In addition, on the inner side of the cam ring 106, a key groove 106a is cut in a spiral shape in the circumferential direction. In addition, a fixed pin 107a is provided to the outer circumferential side of the AF ring 107. This fixed pin 107a is inserted into the key groove 106a of the cam ring 106.

In addition, the drive apparatus 14 is arranged at a retention unit 101a that overhangs from an inner circumferential side of the outer fixed cylinder 101 to inside. The drive apparatus 14 is electrically connected to the vibration-wave motor 12, and causes the vibration-wave motor 12 to drive.

The output of the vibration-wave motor 12 causes the cam ring 106 to rotate through the reduction gear 105, whereby the fixed pin 107a moves being guided in the key groove 106a, and causes the AF ring 107 to move in the optical axis direction. In addition, the output of the vibration-wave motor 12 can cause the AF ring 107 to stop by causing the cam ring 106 to stop. In other words, the drive apparatus 14 can cause the third lens unit L3 to move by driving the AF ring 107 in the optical axis direction by way of causing the vibration-wave motor 12 to drive, and thus can cause a subject focused on the imaging element to form an image.

Figure 2:
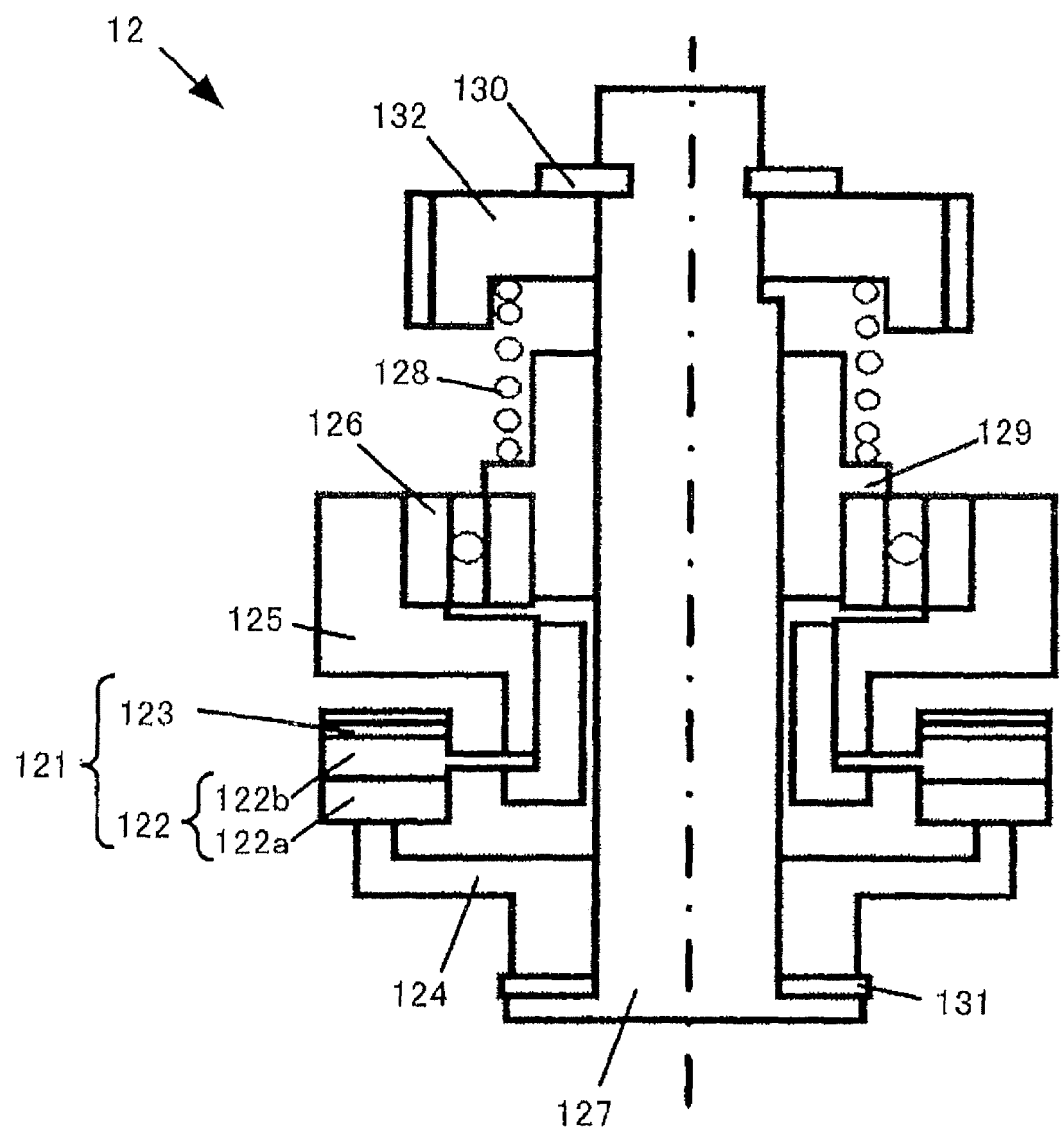
FIG. 2 is a schematic view of a vibration-wave motor provided to a lens barrel according to the first embodiment of the present invention.

FIG. 2 is a schematic view showing the configuration of the vibration wave motor 12. The vibration-wave motor 12 is a rotating shaft-type (S-type) vibration-wave motor, and includes a vibrator 121, moving element 124, fixed member 125, bearing 126, output shaft 127, pressurizing member 128, bearing receiver 129, stopper 130, rubber member 131 and gear member 132.

The vibrator 121 has an elastic body 122 and piezoelectric body 123. The elastic body 122 is formed from a metallic material having a large resonance sharpness. The shape of the elastic body 122 forms an annular shape. The elastic body 122 consists of a comb-tooth part 122a and a base part 122b. The piezoelectric body 123 is joined at one face of the base part 122b, and the comb-tooth part 122a is provided to the opposing face of this face. The comb-tooth part 122a has a tip end face of a projecting portion thereof that forms a driving face, and pressurized contacts the moving element 124. At the driving face of the elastic body 122, a resin film is formed for abrasion resistance securement when driven at high speed. The material of this resin film, for example, has polyamideimide as a main component, and PTFE is added thereto. This resin film has a Young modulus on the order of 4 to 8 GPa, and the film thickness thereof is no more than 50 μm, for example.

The piezoelectric body 123 is an electro-mechanical conversion element such as a piezoelectric element or electrorestrictive element that converts electrical energy to mechanical energy. The piezoelectric body 123 is divided into two phases (A-phase, B-phase) along the circumferential direction, and is arranged so that poles are alternatingly arranged every ½ wavelength for each phase, and an interval of ¼ wavelength is open between the A-phase and B-phase. The phase difference between the drive signal output to the A-phase of the piezoelectric body 123 and the drive signal output to the B-phase thereof is variable. When the respective drive signals are applied to the A-phase and B-phase of the piezoelectric body 123, the piezoelectric body 123 excites. Deflection of the base part 122b of the elastic body 122 due to excitation of the piezoelectric body 123 is magnified by the comb-tooth part 122a of the elastic body 122, and makes a progressive wave at the tip end of the driving face of the comb-tooth part 122.

The moving element 124 is formed from a light metal such as aluminum. A sliding face of the moving element 124 that pressurized contacts the comb-tooth part 122a is subjected to Alumite treatment for an abrasion resistance improvement.

The output shaft 127 is joined so as to rotate together with the moving element 124 via the rubber member 131. The rubber member 131 has a function of joining the moving element 124 and output shaft 127 with the adhesion by way of rubber, and a function of absorbing vibrations in order not to transmit vibration from the moving element 124 to the output shaft 127.

The pressurizing member 128 is arranged between the gear member 132 fixed to the output shaft 127 and the bearing receiver 129. The bearing receiver 129 is inserted inside of the bearing 126. The bearing 126 is inserted inside of the fixed member 125. The gear member 132 is inserted so as to fit in the notched parts (D cut) (not illustrated) of the output shaft 127. Then, the gear member 132 is fixed by the stopper 130, and rotates along with the output shaft 127. It should be noted that a pressure force adjusting washer (not illustrated) is arranged between the pressure member 128 and the bearing receiver 129.

Figure 3:
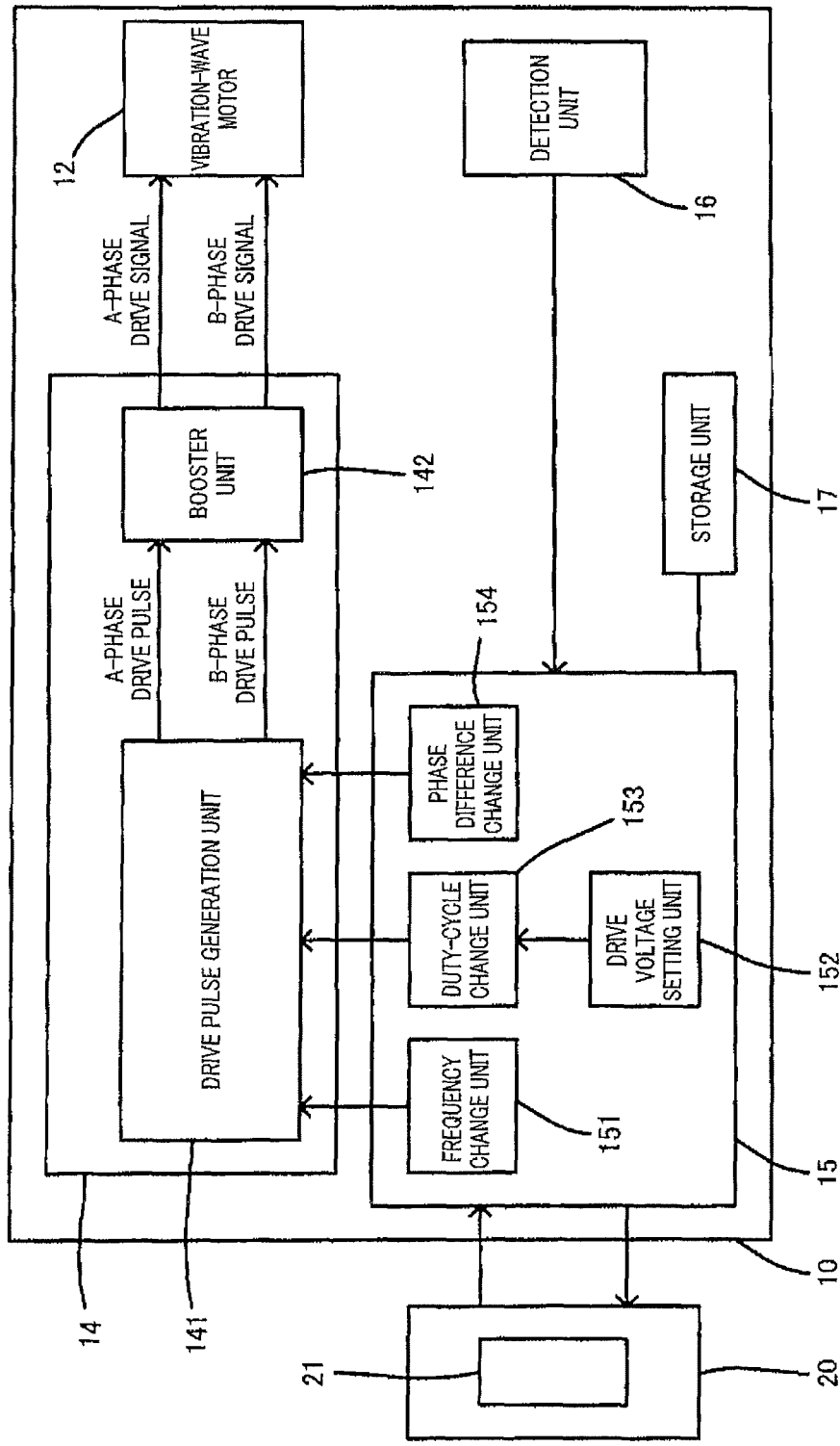
FIG. 3 is a control block diagram of a lens barrel according to the first embodiment of the present invention.

FIG. 3 is a control block diagram of the lens barrel according to the first embodiment of the present invention. FIG. 3 illustrates a camera body 20 along with the lens barrel 10. In FIG. 3, the lens barrel 10 includes the vibration-wave motor 12, drive apparatus 14, lens-side MCU (Micro Control Unit) 15, detection unit 16 and storage unit 17.

The drive apparatus 14 includes a drive pulse generation unit 141 and booster unit 142, and drives the vibration-wave motor 12 by applying drive voltage to the vibration-wave motor 12. The lens-side MCU 15 includes a frequency change unit 141, drive voltage setting unit 152, duty-cycle change unit 153 and phase difference change unit 154, and controls the drive apparatus 14.

The camera body 20 includes a body-side MCU 21.

The drive pulse generation unit 141 generates a drive pulse for the A-phase and a drive pulse for the B-phase, and outputs to the booster unit 142. The drive pulse generation unit 141 can change the frequency of the drive pulse for the A-phase and the drive pulse for the B-phase, duty cycle (value arrived at by dividing pulse width by pulse period), and phase difference, based on the control of the lens-side MCU 15.

Figure 4:
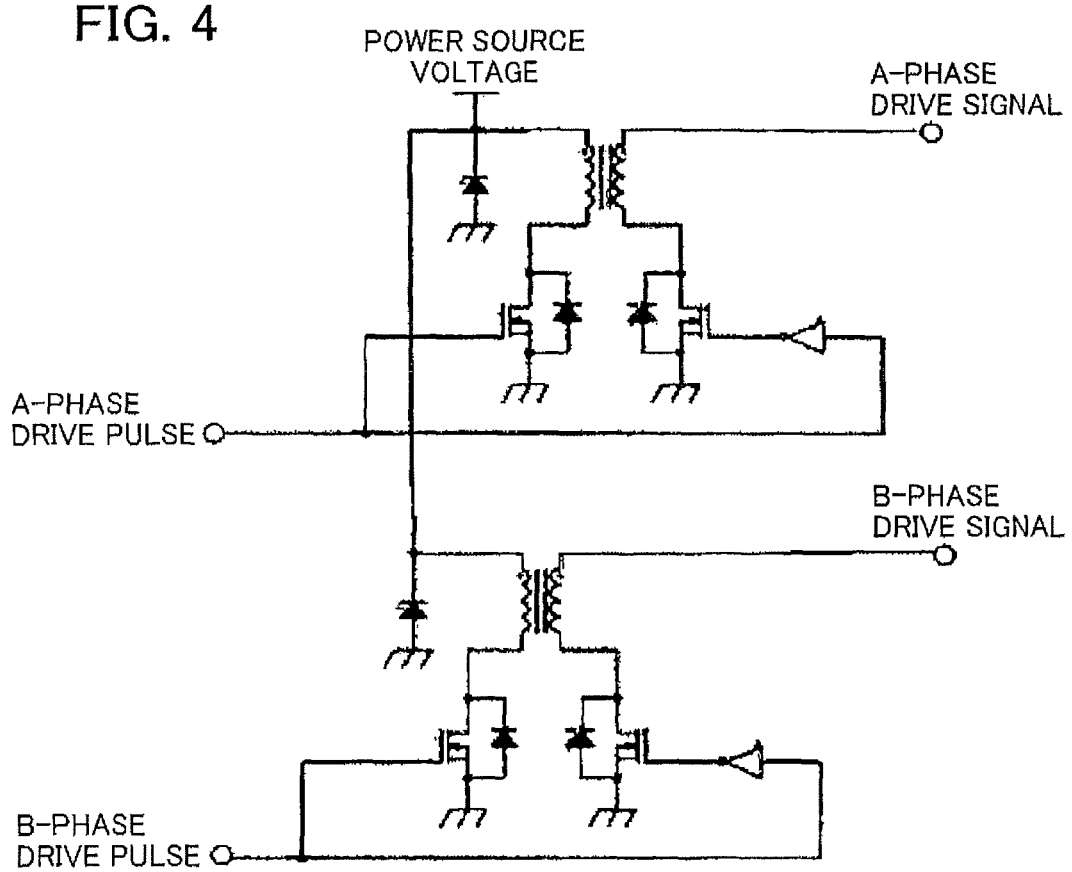
FIG. 4 is a schematic electrical circuit diagram showing an example of a booster unit.

The booster unit 142 has a circuit configuration like that shown in FIG. 4, for example, and outputs the A-phase drive signal and B-phase drive signal based on the drive pulse for the A-phase and drive pulse for the B-phase input from the drive pulse generation unit 141. The booster unit 142 outputs the A-phase drive signal and B-phase drive signal to the vibration-wave motor 12.

Figure 5:
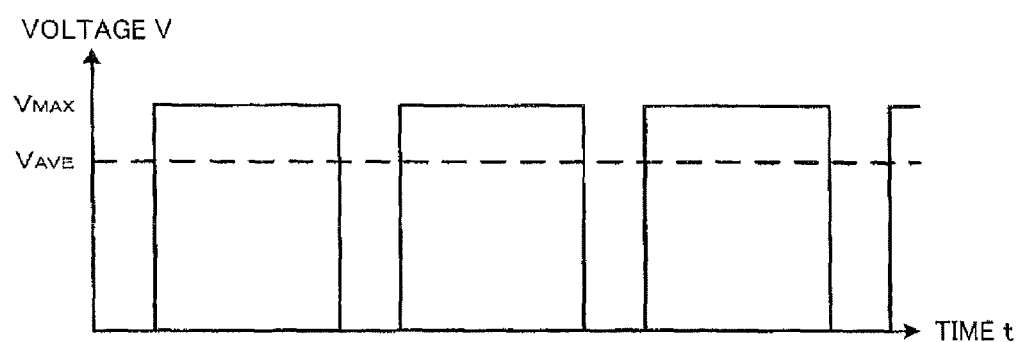
FIG. 5 is a graph illustrating the relationship between the drive voltage and duty cycle.

The vibration wave motor 12 is driven according to the A-phase drive signal and B-phase drive signal. The drive voltage driving the vibration-wave motor 12 becomes substantially the average amplitude of these drive signals, i.e. a value arrived at by dividing the time integral of the voltage of a predetermined period by the time. In the case of the drive signal being a square wave that changes between zero and a predetermined maximum voltage $V_{MAX}$ as shown in FIG. 5, the product of the maximum voltage $V_{MAX}$ of the drive signal and the duty cycle is an average amplitude $V_{AVE}$, and this average amplitude $V_{AVE}$ corresponds to the drive voltage. In the example of FIG. 3, the maximum output voltage of the booster unit 142 corresponds to the maximum voltage $V_{MAX}$ of FIG. 5, and the product with the duty cycle changed by the duty cycle changed by way of the duty-cycle change unit 153 becomes the drive voltage.

In order to change the drive voltage, it is sufficient to change the amplitude, duty cycle or both thereof. In the first embodiment, the drive voltage is changed by changing the duty cycle by way of the duty-cycle change unit 153.

When the vibration-wave motor 12 is rotating, the drive voltage is set to $V_{reg}$. Then, in the present invention, when changing the phase difference in order to stop the vibration-wave motor 12 or perform reversing the driving direction, the drive voltage is set to $V_1$, which is smaller than $V_{reg}$ and not zero. Since the amplitude of vibration generated at the vibrator 121 is great in a state in which the drive voltage is set to $V_{reg}$, abnormal noise tends to generate in a case of changing the phase difference with the drive voltage remaining as $V_{reg}$ as is conventionally. In the present invention, the generation of abnormal noise is reduced by setting the drive voltage to $V_1$ during phase difference changing.

The frequency change unit 151 of the lens-side MCU 15 changes the setting of the drive pulse generation unit 14 for the frequency of the drive pulses of the A-phase and B-phase. The frequency of the drive signal outputted to the vibration-wave motor 12 is changed accompanying change of the frequency of the drive pulses, whereby the rotational speed of the vibration-wave motor 12 changes. The frequency-rotational speed characteristic of the vibration-wave motor 12 is as shown in FIG. 6.

Figure 6:
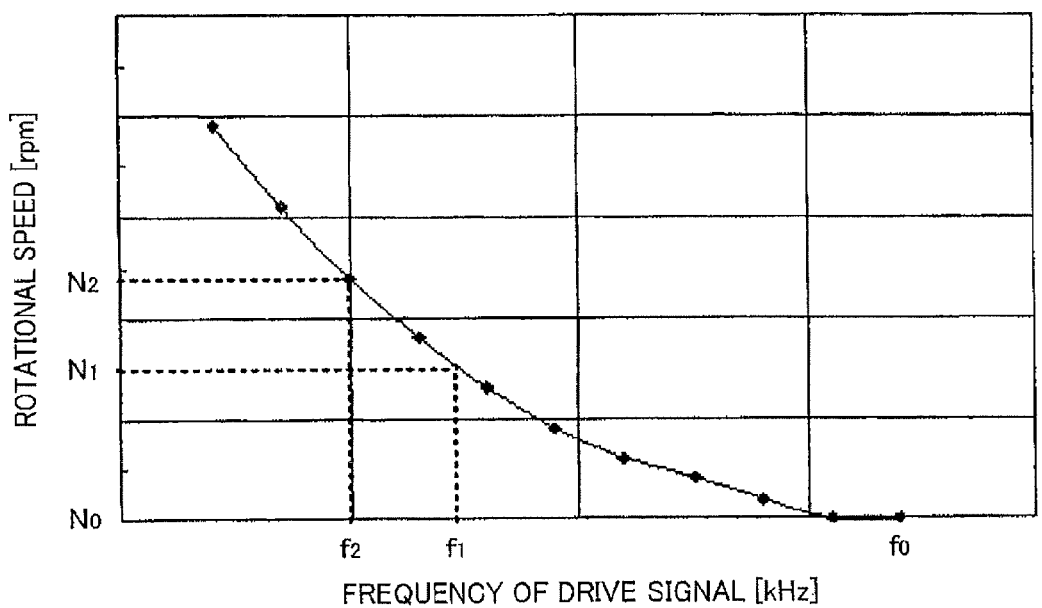
FIG. 6 is a graph showing the relationship between the frequency of drive signals applied to the vibration-wave motor and the rotational speed of the vibration-wave motor.

When the frequency of the drive signal becomes the frequency $f_0$ shown in FIG. 6, the rotational speed of the vibration-wave motor 12 becomes $N_0$rpm (for example, 0 rpm), and stops. When the frequency of the drive signal becomes a frequency $f_1$, which is smaller than the frequency $f_0$, the vibration-wave motor 12 is driven at the rotational speed $N_1$rpm. Similarly, when the frequency of the drive signal becomes a frequency $f_2$, which is smaller than the frequency $f_1$, the vibration-wave motor 12 is driven at a rotational speed $N_2$ rpm, which is faster than the rotational speed $N_1$.

The drive voltage setting unit 152 sets the drive voltage applied to the vibration-wave motor 12. The duty-cycle change unit 153 changes the setting of the drive pulse generation unit 141 for the duty cycle of the A-phase drive pulse and the B-phase drive pulse so that the drive voltage set by the drive voltage setting unit 152 is applied.

The phase difference change unit 154 changes the setting of the drive pulse generation unit 141 for the phase difference between the drive pulse for the A-phase and the drive pulse for the B-phase outputted by the drive pulse generation unit 141. The phase difference—rotational speed characteristic of the vibration-wave motor 12 is as shown in FIG. 7.

Figure 7:
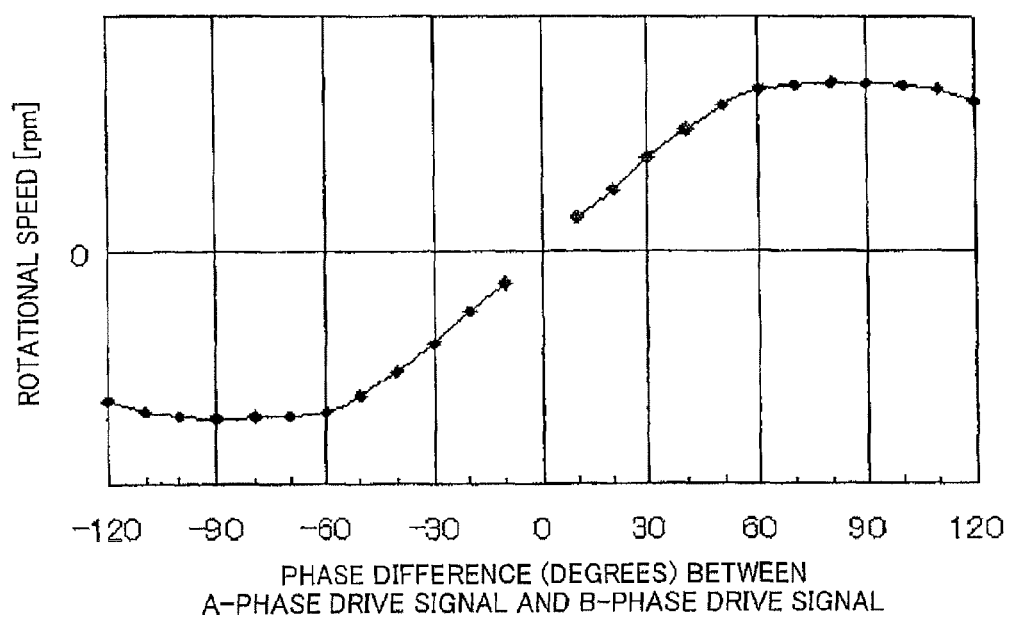
FIG. 7 is a graph showing the relationship between the phase difference between an A-phase drive signal and B-phase drive signal applied to the vibration-wave motor, and the rotational speed of the vibration-wave motor.

As shown in FIG. 7, the rotational speed of the vibration-wave motor 12 reaches a maximum speed of positive rotation (for example, clockwise rotation) when the phase difference is +90 deg, and reaches a maximum speed of reverse rotation (for example, counter-clockwise rotation) when the phase difference is −90 deg. The setting of the drive pulse generation unit 141 for the phase difference between the drive pulse for the A-phase and the drive pulse for the B-pulse is set to +90 deg or −90 deg.

The lens-side MCU 15 performs communication with the body-side MCU 21. The lens-side MCU 15 sends lens information, for example, to the body-side MCU 21. On the other hand, the body-side MCU 21 sends drive instructions of the third lens unit L3 according to the vibration-wave motor 12 to the lens-side MCU 15. A target position to which to drive the third lens unit L3 is at least included in the drive instructions of the third lens unit L3.

The detection unit 16 is configured from an optical-type encoder, magnetic encoder, etc., detects the position and/or speed of the third lens unit L3 driven by the driving of the vibration-wave motor 12, and outputs these detection values to the lens-side MCU 15 as electrical signals (detection signals). The storage unit 17 is ROM or the like, and a control program executed by the lens-side MCU 15 to control the lens barrel 10, lens information and the like are stored therein.

Figure 8:
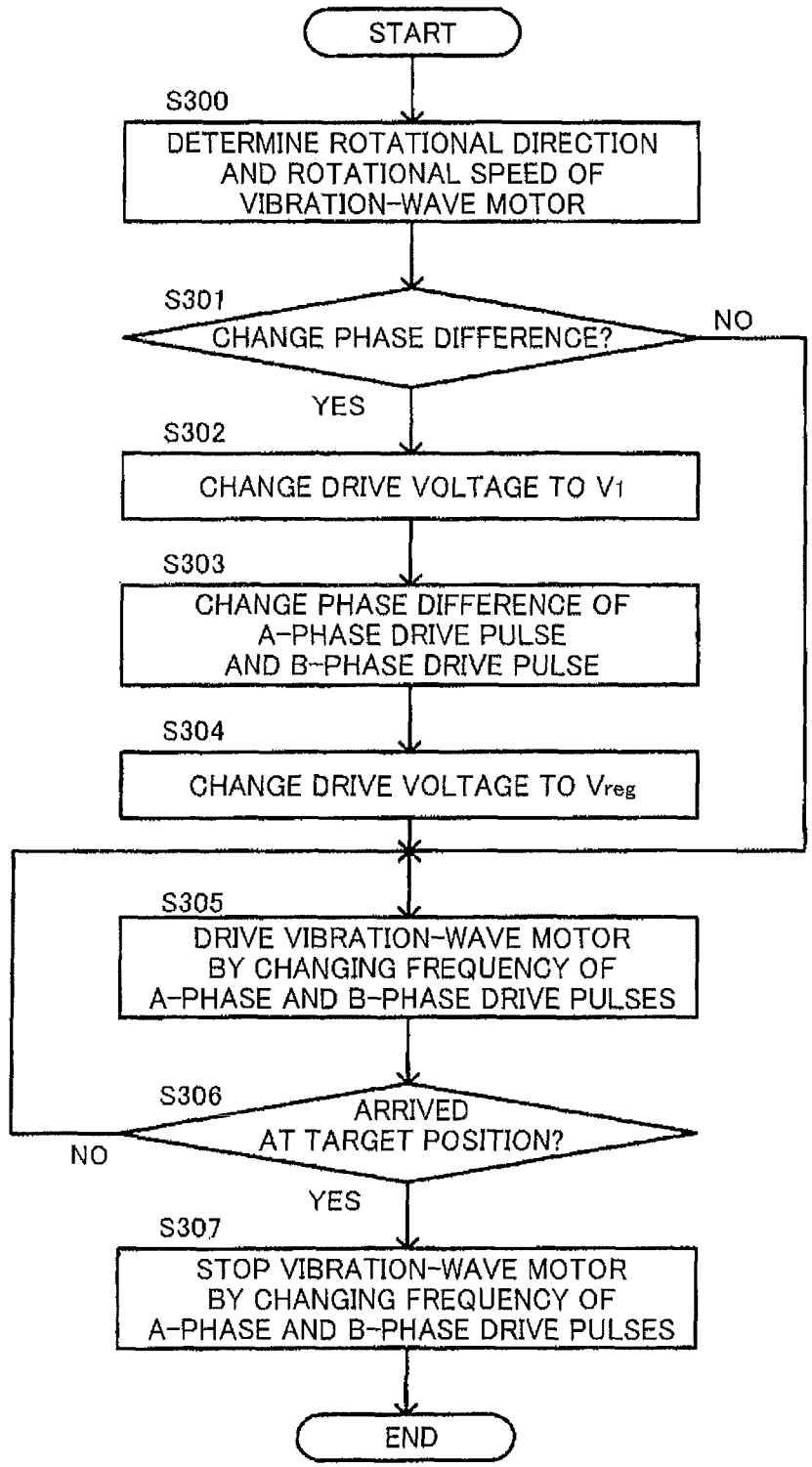
FIG. 8 is a flowchart related to control of a drive apparatus by a control device of the lens barrel according to the first embodiment of the present invention.

FIG. 8 is a flowchart relating to control of the drive apparatus 14 executed by the lens-side MCU 15. The processing in FIG. 8 is started when the lens-side MCU 15 received a drive instruction for the third lens unit L3 from the body-side MCU 21.

In Step S300 in FIG. 8, the lens-side MCU 15 determines the rotational direction and rotational speed of the vibration-wave motor 12 based on the drive instruction for the third lens unit L received from the body-side MCU 21 and the detection signals detected by the detection unit 16.

In Step S301, the lens-side MCU 15 judges whether to change the phase difference between the drive pulse for the A-phase and the drive pulse for the B-phase. The lens-side MCU 15 positively judges Step S301 in the case of it being necessary to make the rotational direction reverse, based on the rotational direction of the vibration-wave motor 12 at the moment when starting Step S301 and the rotational direction of the vibration-wave motor 12 determined in Step S300. The lens-side MCU 15 advances the processing to Step S302 in the case of Step S301 being positively judged, and advances the processing to Step S305 in the case of Step S301 being negatively judged.

In Step S302, the lens-side MCU 15 changes the drive voltage to $V_1$. For example, the following such processing is performed using the drive voltage setting unit 152 and the duty-cycle change unit 153. First, the drive voltage setting unit 152 sets the drive voltage to $V_1$. Next, the duty-cycle change unit 153 changes the setting of the drive pulse generation unit 141 relating to the duty cycles of the drive pulses of the A-phase and B-phase, so that the average amplitudes of the A-phase drive signal and B-phase drive signal become $V_1$.

In Step S303, the lens-side MCU 15 changes the phase difference between the drive pulse of the A-phase and the drive pulse of the B-phase, based on the rotational direction of the vibration-wave motor 12 determined in Step S300. For example, the phase difference change unit 154 of the lens-side MCU 15 changes the setting of the drive pulse generation unit 141 relating to the phase difference to a phase difference corresponding to the rotational direction of the vibration-wave motor 12 determined in Step S300.

In Step S304, the lens-side MCU 15 changes the drive voltage to $V_{reg}$. For example, the following such processing is performed using the drive voltage setting unit 152 and the duty-cycle change unit 153. First, the drive voltage setting unit 152 sets the drive voltage to $V_{reg}$. Next, the duty-cycle change unit 153 changes the setting of the drive pulse generation unit 141 relating to the duty cycles of the drive pulses of the A-phase and B-phase, so that the average amplitudes of the A-phase drive signal and B-phase drive signal become $V_{reg}$.

In Step S305, the lens-side MCU 15 changes the frequencies of the drive pulses of the A-phase and B-phase to drive the vibration-wave motor 12. For example, the frequency change unit 151 of the lens-side MCU 15 changes the setting of the drive pulse generation unit 141 relating to the frequency of the drive pulses of the A-phase and B-phase from $f_0$ to $f_1$ or $f_2$.

In Step S306, the lens-side MCU 15 judges whether the third lens unit L3 was driven until a target position of the third lens unit L3 included in the drive instruction. For example, the lens-side MCU 15 detects the position of the third lens unit L3 based on the detection signals of the detection unit 16, and compares this position with the target position of the third lens unit L3 included in the drive instruction. The lens-side MCU 15 returns the processing to Step S305 in the case of Step S306 being negatively judged, and advances the processing to Step S307 in the case of Step S306 being positively judged.

In Step S307, the lens-side MCU 15 changes the frequency of the drive pulses of the A-phase and B-phase to cause the vibration-wave motor 12 to stop. For example, the frequency change unit 151 of the lens-side MCU 15 changes the frequencies of the drive pulses of the A-phase and B-phase to $f_0$.

Figure 9:
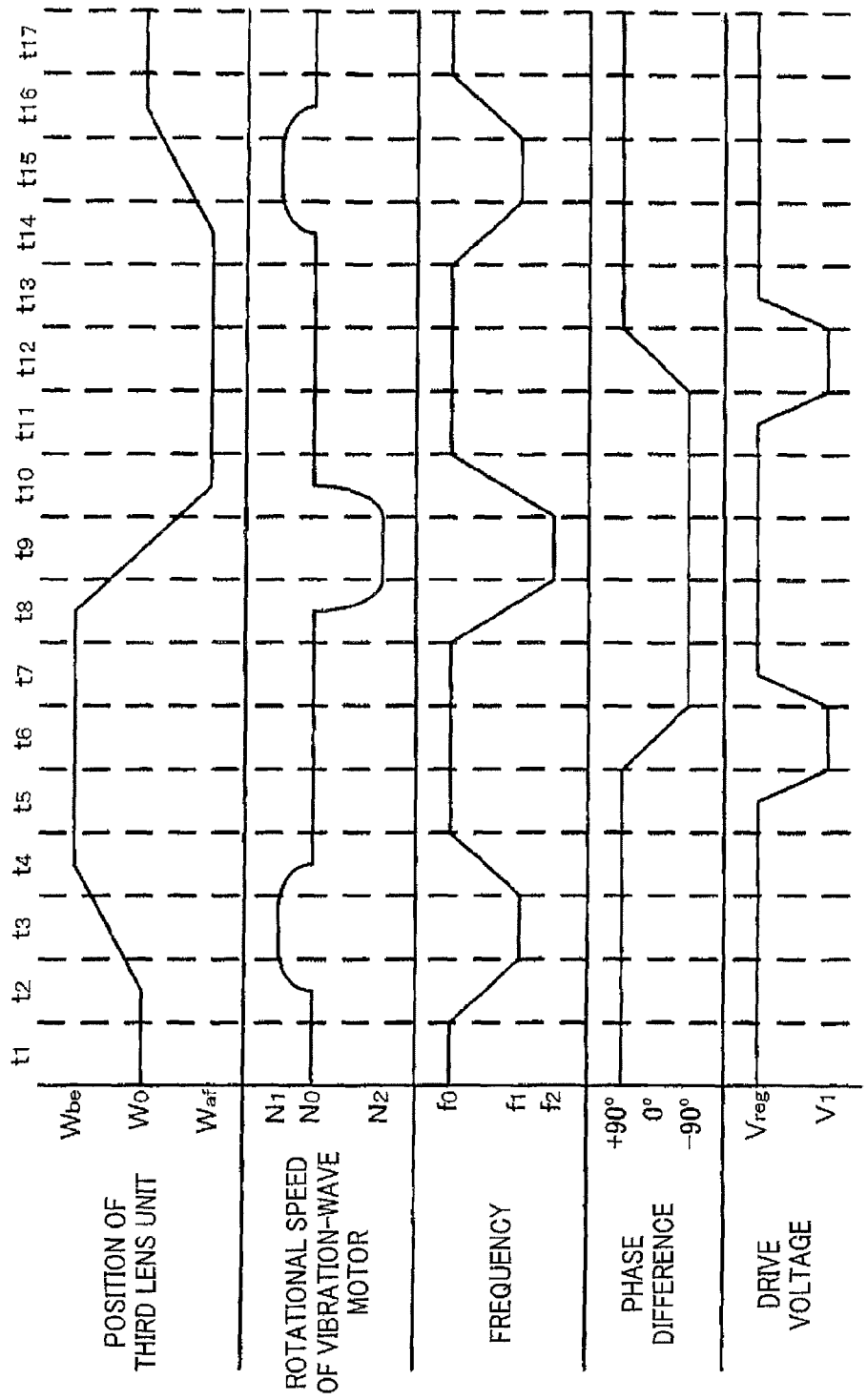
FIG. 9 is a timing chart showing an example of control of the drive apparatus by the control device of the lens barrel according to the first embodiment of the present invention.

FIG. 9 is a timing chart relating to drive control of the vibration-wave motor 12. FIG. 9 illustrates side-by-side the position of the third lens unit L3, rotational speed of the vibration-wave motor 12, setting value of frequency in the drive pulse generation unit 141, setting value of phase difference in the drive pulse generation unit 141 and timing chart of drive voltage, respectively.

In FIG. 9, the lens-side MCU 15 receives from the body-side MCU 21 the drive instructions for the third lens unit L3 three times (for example, timing t1, t5, t11). The first time drive instruction is a drive instruction to cause the third lens unit L3 to drive until a position Wbe on the optical axis. The second time drive instruction is a drive instruction to cause the third lens unit L3 to drive until a position Waf on the optical axis. The third time drive instruction is a drive instruction to cause the third lens unit L3 to drive until a position $W_0$ on the optical axis.

The lens-side MCU 15 changes the setting value of the frequency at the timing t2 (Step S305) when receiving the first time drive instruction at timing t1, since it is no longer necessary to change the phase difference (NO in Step S301 of FIG. 8). The rotational speed of the vibration-wave motor 12 gradually becomes faster in proportion as the setting value of the frequency becomes smaller than $f_0$. The position of the third lens unit L3 reaches the target position Wbe at the timing t4 (YES in Step S306), and subsequently the setting value of the frequency becomes $f_0$ and the vibration-wave motor 12 stops (Step S307).

The lens-side MCU 15 first changes the drive voltage from $V_{reg}$ to $V_1$ (Step S302) when receiving the second time drive instruction at the timing t5 since it is necessary to change the phase difference (YES in Step S301 of FIG. 8). Next, the lens-side MCU 15 changes the phase difference between the drive pulse of the A-phase and the drive pulse of the B-phase at the timing t6 from +90 deg to −90 deg (Step S303). While changing the phase difference, the drive voltage is maintained as is at $V_1$. The lens-side MCU 15 changes the drive voltage from $V_1$ to $V_{reg}$ (Step S304) at the timing t7 after changing of the phase difference finished. Subsequently, the lens-side MCU 15 changes the setting value of the frequency at the timing t8 (Step S305). At this time, since the distance that is necessary to drive the third lens unit L is longer than when at the timing t2, the setting value of the frequency is set to be lower than at the timing t2. The position of the third lens unit L3 arrives at the target position Waf at the timing t10 (YES in Step S306), and subsequently the setting value of the frequency becomes $f_0$ and the vibration-wave motor 12 stops (Step S307).

The lens-side MCU 15 first changes the drive voltage from $V_{reg}$ to $V_1$ (Step S302) when receiving the third time drive instruction at the timing t11 since it is necessary to change the phase difference (YES in Step S301 of FIG. 8). Next, the lens-side MCU 15 changes the phase difference between the drive pulse of the A-phase and the drive pulse of the B-phase at the timing t12 from −90 deg to +90 deg (Step S303). While changing the phase difference, the drive voltage is maintained as is at $V_1$. The lens-side MCU 15 changes the drive voltage from $V_1$ to $V_{reg}$ (Step S304) at the timing t13 after changing of the phase difference finished. Subsequently, the lens-side MCU 15 changes the setting value of the frequency at the timing t14 (Step S305). The position of the third lens unit L3 arrives at the target position $W_0$ at the timing t16 (YES in Step S306), and subsequently the setting value of the frequency becomes $f_0$, and the vibration-wave motor 12 stops (Step S307).

Abnormal noise upon changing the phase difference such as at the timing t6 and t12 can be suppressed enough to set the value of $V_1$ lower relative to the value of $V_{reg}$. The effect of abnormal noise suppression is not limited to only the phase difference change explained in FIG. 9 and, for example, is effective also for a phase difference change from 0 deg to +90 deg, a phase difference change from +90 deg to 0 deg, a phase difference change from 0 deg to −90 deg, a phase difference change from −90 deg to 0 deg, etc. In addition, lowering the drive voltage to $V_1$ contributes also to a reduction in the electricity consumption of the vibration-wave motor 12.

The below operating effects are obtained according to the first embodiment explained above. The lens-side MCU 15 of the lens barrel 10 controls the drive apparatus 14 that outputs the A-phase drive signal and B-phase drive signal to the vibration-wave motor 12, and applies drive voltage to the vibration-wave motor 12. The lens-side MCU 15 includes the drive voltage setting unit 152 and duty-cycle change unit 153, and changes the drive voltage applied to the vibration-wave motor 12. In addition, the lens-side MCU 15 includes the phase difference change unit 154, and changes the phase difference between the A-phase drive signal and B-phase drive signal by changing the phase difference between the drive pulses of the A-phase and B-phase. The drive voltage setting unit 152 and duty-cycle change unit 153 change the drive voltage to $V_{reg}$ in the case of rotationally driving the vibration-wave motor 12 (Step S304 in FIG. 8), and change the drive voltage to $V_1$ which is greater than zero and smaller than $V_{reg}$ in the case of the phase difference change unit 154 changing the phase difference (Step S302 in FIG. 8). By configuring in this way, the lens barrel 10 can reduce the abnormal noise during phase difference changing without harming the responsiveness of the vibration-wave motor 12.

Second Embodiment

A second embodiment of the present invention will be explained. In the second embodiment, a reduction in abnormal noise during phase difference change is achieved by not only lowering the drive voltage prior to changing the phase difference, but also setting the change rate of the phase difference to be low (slowing).

For the duty cycle of the drive pulse of each phase, the range of value options thereof is limited by the resolving power of PWM, etc. For example, the duty cycle of the drive pulse is assigned to the setting values of 0 to 255, and it is not possible to set the setting value of the duty cycle to a value between "0" and "1". The lower limit for the setting value of $V_1$ is decided, for example, by the product of the duty cycle d1 corresponding to the setting value "1" and the maximum voltage VMAX of the drive signal.

The value of VMAX varies according to the circuit configuration, ambient temperature, etc. of the drive apparatus of the vibration-wave motor 12. For example, the value of VMAX becomes larger as the ambient temperature becomes lower. In the case of the drive voltage serving as the level at which abnormal noise can be ignored being defined as Vs, there is a risk of the duty cycle ds such that $V_1 \leq V_S$ when the value of $V_{MAX}$ is large becoming a value smaller than the duty cycle d1 corresponding to the setting value "1".

In the second embodiment, by setting the change rate of the phase difference to be low in order to solve the problem in the above-mentioned such design, the generation of abnormal noise is suitably suppressed even in the case of the lower limit for the setting value of $V_1$ being large. FIG. 10 is a table illustrating the abnormal noise suppression effect by setting the change rate of the phase difference to be low.

FIG. 10 is an example of a level table relating to the suppression level of abnormal noise. In level table 50 exemplified in FIG. 10, in the cases of the proportion of $V_1$ relative to $V_{reg}$ being 100%, 75%, 50% and 25%, the suppression levels of abnormal noise are shown for when the change rate of the phase difference is 90 deg/msec, 30 deg/msec and 5 deg/msec, respectively. The suppression level of abnormal noise is a value determined in advance at the design stage of the lens barrel, and is divided into the three stages of level 1, level 2 and level 3. When the suppression level is level 1, abnormal noise does not generate upon phase difference change. When the suppression level is level 2, abnormal noise upon phase difference change does not stand out and can be ignored. When the suppression level is level 3, the abnormal noise during phase difference change stands out. Abnormal noise standing out represents a state in which abnormal noise is recorded without confusing for other noise, within recorded sound during moving image capture.

As is evident from looking at FIG. 10, for the suppression level of abnormal sound, the level becomes lower as the proportion of $V_1$ relative to $V_{reg}$ is decided smaller. In other words, abnormal noise can be suppressed more as the proportion of $V_1$ relative to $V_{reg}$ is decided smaller. In addition, for the suppression level of abnormal noise, the level comes to be lower as the change rate of the phase difference becomes slower.

For example, when deciding the setting value of $V_1$ so that the proportion of $V_1$ relative to $V_{reg}$ becomes 50% in the case of the change rate of the phase difference being 90 deg/msec, the suppression level of abnormal noise is level 2. On the other hand, in the case of slowing the change rate of the phase difference to 30 deg/msec, the setting value of $V_1$ can be decided so that the suppression level of abnormal noise becomes level 2; even if the proportion of $V_1$ relative to $V_{reg}$ is 75%. The lens barrel according to the second embodiment of the present invention, in the case of the suppression level being the same, when the proportion of $V_1$ relative to $V_{reg}$ is large, the change rate of the phase difference is set to be lower than when the proportion of $V_1$ relative to $V_{reg}$ is small.

Figure 11:
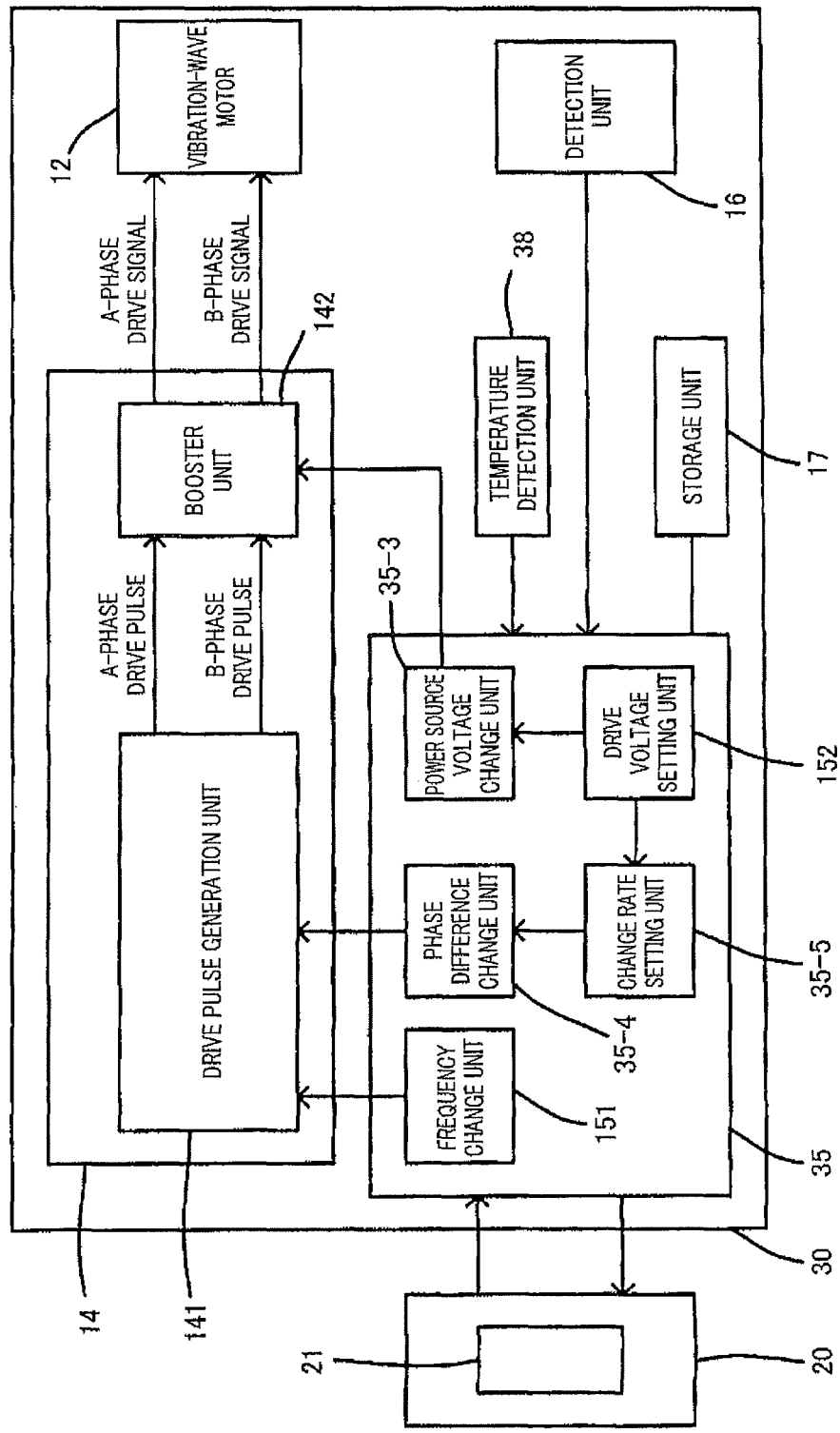
FIG. 11 is a control block diagram of a lens barrel according to a second embodiment of the present invention.

The lens barrel according to the second embodiment of the present invention includes the same configuration as FIG. 1. FIG. 11 is a control block diagram for the lens barrel according to the second embodiment of the present invention. For the same configurations as the control block diagram shown in FIG. 3 in the control block diagram shown in FIG. 11, the same reference numbers as FIG. 3 are assigned and explanations thereof are omitted. It should be noted that, in the following explanation, the setting value relating to the duty cycle of the drive pulse generation unit 141 is explained as being constant at a predetermined value. The drive voltage applied to the vibration-wave motor 12 is changed based on the power source voltage of the booster unit 142 (FIG. 4).

The lens barrel 30 in FIG. 11 includes a lens-side MCU 35 in place of the lens-side MCU 15. In addition, the lens barrel 30 further includes a temperature detection unit 38 that detects the ambient temperature. The lens-side MCU 35 includes a power source voltage change unit 35-3 and phase difference change unit 35-4 in place of the duty-cycle change unit 153 and phase difference change unit 154. Furthermore, the lens-side MCU 35 newly includes a change rate setting unit 35-5.

The power source voltage change unit 35-3 changes the power source voltage of the booster unit 142. When the power source voltage of the booster unit 142 is changed, the amplitudes of the A-phase drive signal and B-phase drive signal change, and thus the drive voltage applied to the vibration-wave motor 12 changes.

The change rate setting unit 35-5 sets the change rate of the phase difference based on the proportion of $V_1$ relative to $V_{reg}$ decided at the design stage, and the setting value of the suppression level set in advance. For example, in the case of $V_1$ being set to 75% of $V_{reg}$, and the suppression level being set to level 2 in advance, the change rate setting unit 35-5 references the column of the level table 50 in which the proportion of $V_1$ relative to $V_{reg}$ is 75%, and sets the change rate of the phase difference to a change rate such that the suppression level is level 2, e.g., 30 deg/msec. It should be noted that the level table 50 is stored in the storage unit 17 or the like. For the setting value of the suppression level, it may be configured for the user to set using an operation member that is not illustrated, or it may be configured so that the lens-side MCU 35 or body-side MCU 21 automatically sets based on the operation mode of the imaging device equipped with the lens barrel 30. For example, it may be configured so that, in the case of performing photography not accompanied by recording of sound like in still image photography, the lens-side MCU 35 or the body-side MCU 21 sets the suppression level to level 3, and in the case of performing photography accompanied by the recording of sound like in moving image photography, the lens-side MCU 35 or the body-side MCU 21 sets the suppression level to level 1.

The phase difference change unit 35-4 changes the setting of the drive pulse generation unit 141 relating to the phase difference between the drive pulse for the A-phase and the drive pulse for the B-phase outputted by the drive pulse generation unit 141. Upon doing so, the phase difference is changed based on the change rate set by the change rate setting unit 35-5.

Figure 12:
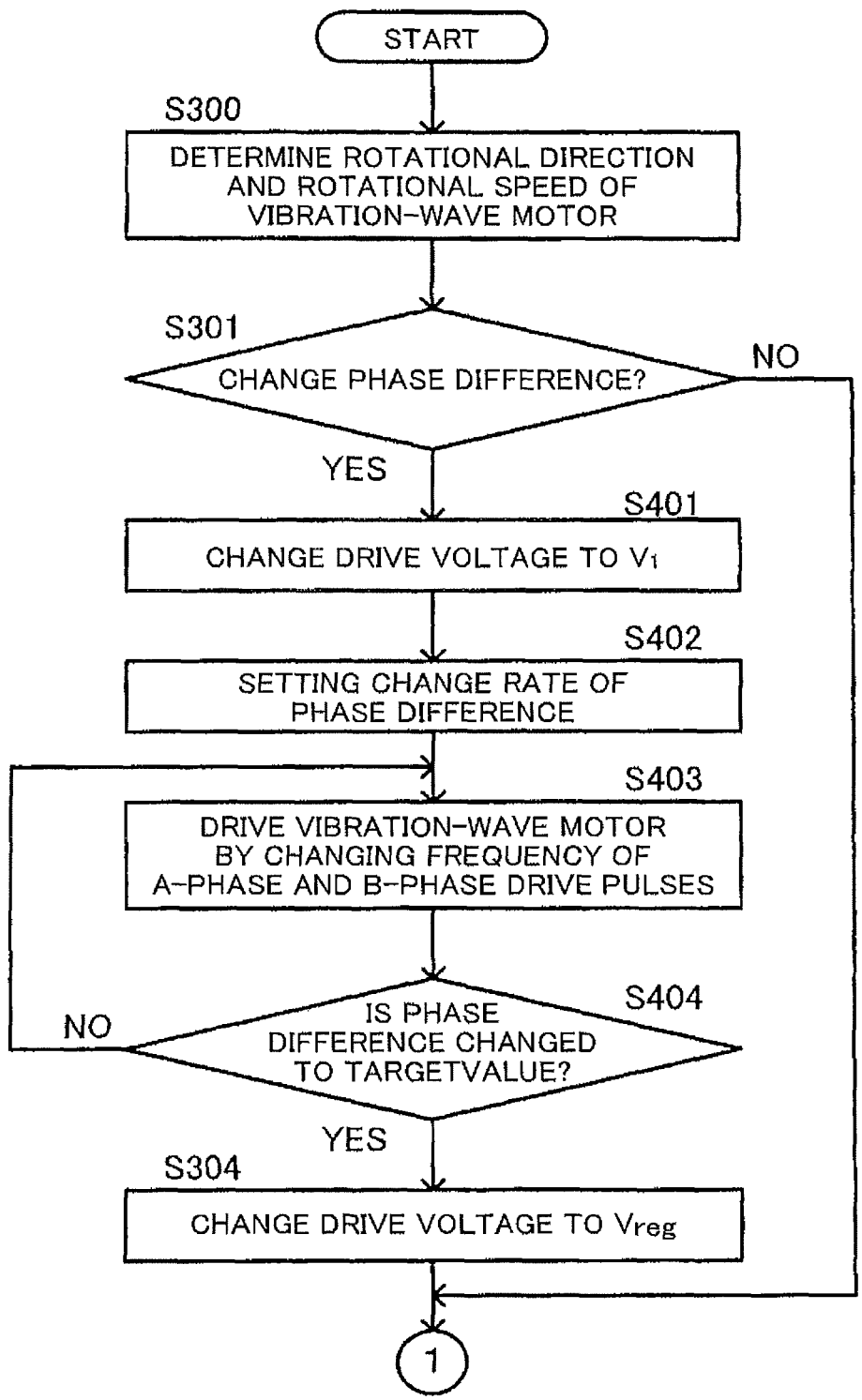
FIG. 12 is a flowchart related to control of the drive apparatus by the control device of the lens barrel according to the second embodiment of the present invention.
Figure 13:
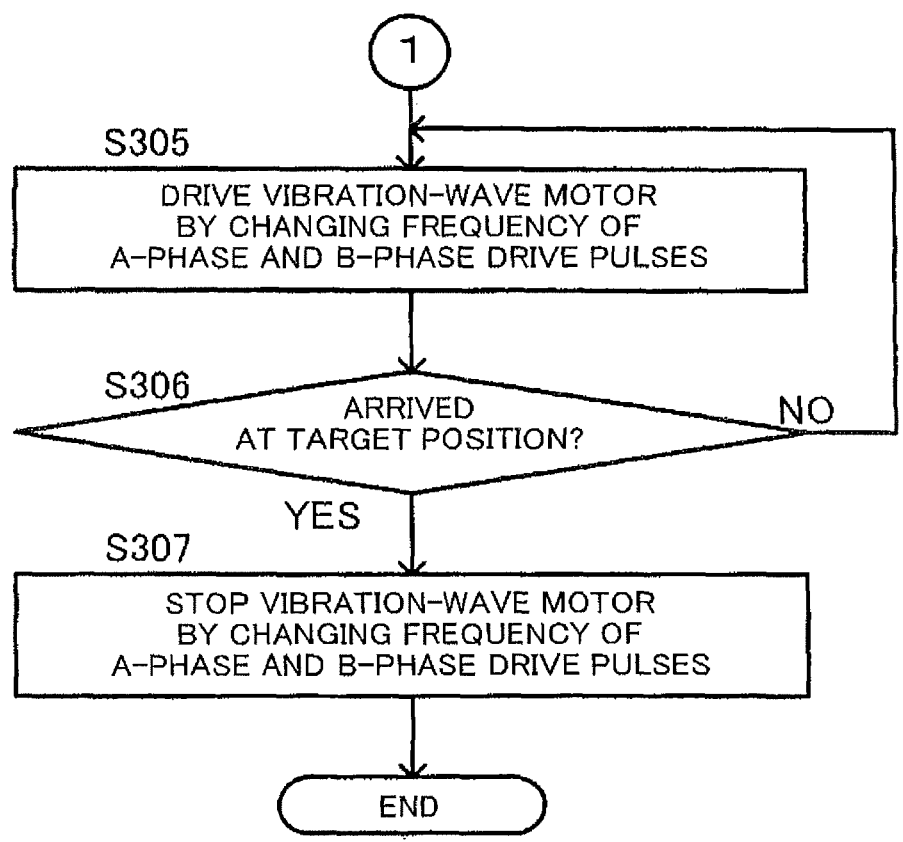
FIG. 13 is a flowchart related to control of the drive apparatus by the control device of the lens barrel according to the second embodiment of the present invention.

FIG. 12 and FIG. 13 are flowcharts relating to the control of the drive apparatus 14 performed by the lens-side MCU 35. The processing of FIG. 12 is initiated when the lens-side MCU 35 receives the drive instruction for the third lens unit L3 from the body-side MCU 21. For processing that is the same as that shown in FIG. 8 among the processing shown in FIG. 12 and FIG. 13, explanations thereof will be omitted.

In Step S401, the lens-side MCU 35 changes the drive voltage to $V_1$. For example, the drive voltage setting unit 152 of the lens-side MCU 35 sets the drive voltage to $V_1$.

Next, the power source voltage change unit 35-3 changes the power source voltage of the booster unit 142 so that the drive voltage becomes $V_1$.

In Step S402, the lens-side MCU 35 sets the change rate of the phase difference. For example, the change rate setting unit 35-5 sets the change rate of the phase difference based on the proportion of $V_1$ relative to $V_{reg}$, and the suppression level set in advance. It should be noted that it may be configured so that the change rate setting unit 35-5 references the level table 50 based on the proportion of $V_1$ relative to $V_{reg}$ to set the change rate of the phase difference.

In Step S403, the lens-side MCU 35 changes the phase difference between the drive pulse of the A-phase and the drive pulse of the B-phase, based on the change rate set in Step S402 and the rotational direction of the vibration-wave motor 12 determined in Step S300.

In Step S404, the lens-side MCU 35 judges whether the phase difference of the drive pulse of the A-phase and the drive pulse of the B-phase changed to a target value. Herein, target value indicates the phase difference representing the rotational direction of the vibration-wave motor 12 determined in Step S300 of FIG. 12. The lens-side MCU 35 returns the processing to Step S403 in the case of Step S403 being negatively judged, and advances the processing to Step S304 of FIG. 12 in the case of Step S404 being positively judged. The lens-side MCU 35 changes the drive voltage to $V_{reg}$ in Step S304 of FIG. 12, and then advances the processing to Step S305 of FIG. 13. Since the processing in FIG. 13 is the same processing for Steps S305, S306 and S307 in FIG. 8, explanations thereof will be omitted.

The following functional effects are obtained according to the second embodiment explained above.

The lens-side MCU 35 of the lens barrel 30 controls the drive apparatus 14 that outputs the A-phase drive signal and B-phase drive signal to the vibration-wave motor 12, and applies drive voltage to the vibration-wave motor 12. The lens-side MCU 35 includes the drive voltage setting unit 152 and power source voltage change unit 35-3, and changes the drive voltage applied to the vibration-wave motor 12. The lens-side MCU 35 includes the phase difference change unit 35-4, and changes the phase difference between the A-phase drive signal and B-phase drive signal by changing the phase difference between the drive pulses of the A-phase and B-phase. The drive voltage setting unit 152 and the power source voltage change unit 35-3 change the drive voltage to $V_{reg}$ (Step S304 in FIG. 12) in the case of causing the vibration-wave motor 12 to rotationally drive, and change the drive voltage to $V_1$, which is larger than zero and smaller than $V_{reg}$ (Step S401 in FIG. 12) in the case of the phase difference change unit 154 changing the phase difference.

By configuring in this way, the lens barrel 30 can reduce abnormal noise during phase difference changing, without harming the responsiveness of the vibration-wave motor. In addition, the lens-side MCU 35 can reduce the abnormal noise during phase difference changing, even in a case of not being able to set $V_1$ to a sufficiently small value according to the circuit configuration or ambient temperature of the drive apparatus of the vibration-wave motor 12, by the speed change setting unit 35-5 setting the change rate of the phase difference suitably.

The embodiments explained above can be modified and implemented in the following ways.

Modified Example 1

In the first embodiment, the lens-side MCU 15 is configured so that the duty-cycle change unit 153 changes the setting value of the duty cycle in the drive pulse generation unit 141. However, it may be configured so that the lens-side MCU 15 includes the power source voltage change unit 35-3 in place of the duty-cycle change unit 153. In addition, in the second embodiment, the lens-side MCU 35 is configured so that the power source voltage change unit 35-3 changes the power source voltage of the booster unit 142. However, it may be configured so that the lens-side MCU 35 includes the duty-cycle change unit 153 in place of the power source voltage change unit 35-3.

Modified Example 2

The vibration-wave motor driven by the drive apparatus 14 controlled by the lens-side MCU 15 and 35 is not limited to only a rotating shaft-type motor like that shown in FIG. 2. For example, it may be a ring-type vibration-wave motor. Control by way of the lens-side MCU 15 and 35 can be performs similarly to the above-mentioned embodiments even if the vibration-wave motor is of ring type.

Modified Example 3

The present invention can be applied to electronic devices other than digital cameras so long as being electronic devices that control a drive apparatus by a control device such as an MCU, and drive a vibration-wave motor with this drive apparatus.

THIRD EMBODIMENT

Figure 14:
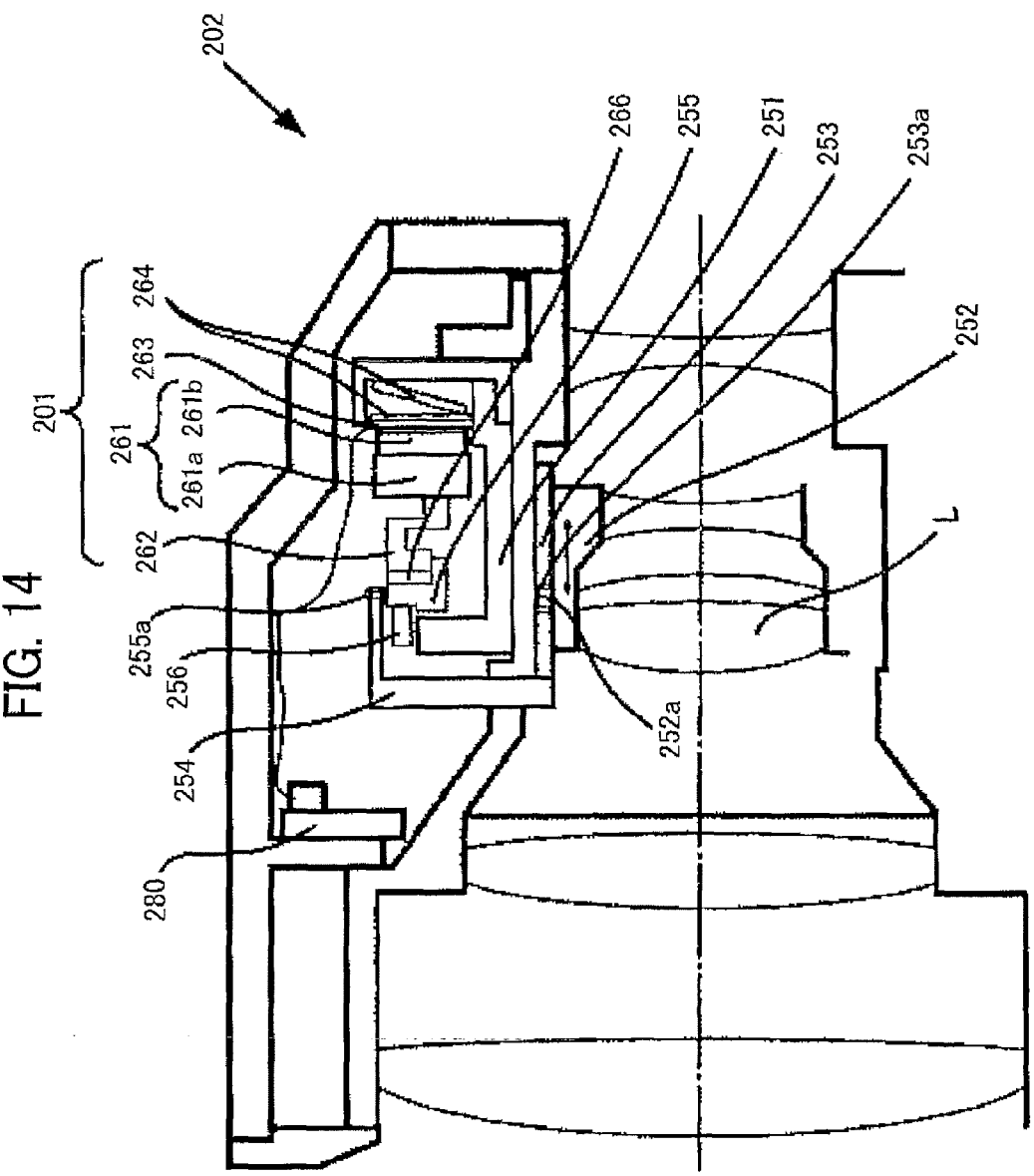
FIG. 14 is a schematic view of a lens barrel according to a third embodiment of the present invention.

FIG. 14 is a schematic view of a lens barrel according to a third embodiment of the present invention. The lens barrel 202 in FIG. 14 is a lens barrel for an imaging device such as a digital camera. The vibration-wave motor 201 includes a vibrating body 261, a moving body 262, a dampening support member 263 from a non-woven fabric or the like, and a pressurized contact means 264. The vibration-wave motor 201 provides drive power for causing a lens unit L to drive in the optical axis direction relative to the lens barrel 202.

Figure 15:
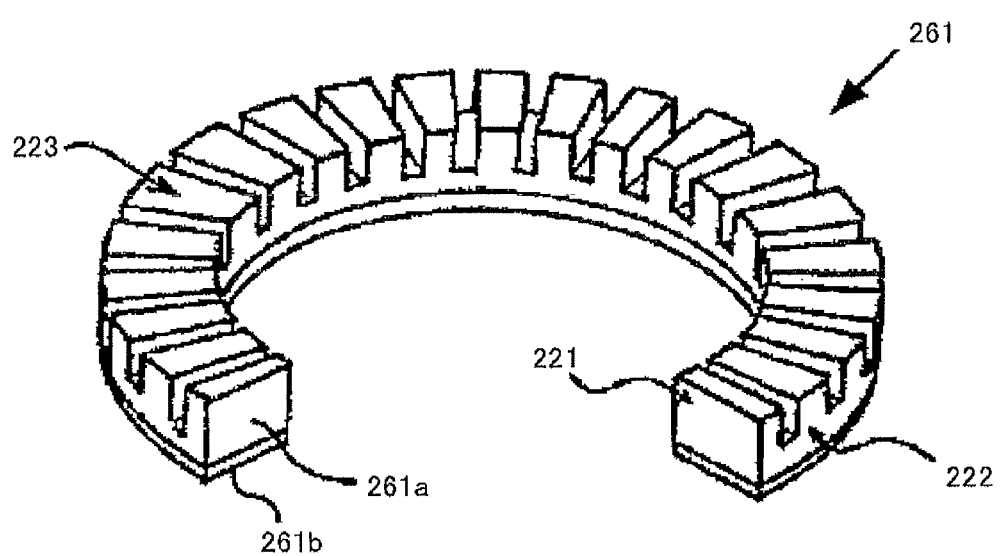
FIG. 15 is a schematic view of a vibrating body of the vibration-wave motor.

The vibrating body 261 has an elastic body 261a and a piezoelectric body 261b. The elastic body 261a is formed from a metallic material having a large resonance sharpness. The shape of the elastic body 261a forms an annular shape as shown in FIG. 15. The piezoelectric body 261b is joined to one face of the round shape of the elastic body 261a, and a comb-teeth part 221 in which grooves are cut is provided on the opposing face thereof.

The piezoelectric body 261b is an electro-mechanical conversion element that converts electrical energy to mechanical energy. The piezoelectric body 123 is divided into two phases (A-phase, B-phase) along the circumferential direction. Poles are arranged alternatingly arranged every ½ wavelength for each phase of the piezoelectric body 261b. It is arranged so that an interval of ¼ wavelength is open between the A-phase and B-phase of the piezoelectric body 262b. A drive signal is outputted from a drive circuit 280 to each phase of the piezoelectric body 261b. The phase difference between the drive signal output to the A-phase and the drive signals output to the B-phase of the piezoelectric body 261b is variable. When the respective high-frequency voltages are applied to the A-phase and B-phase of the piezoelectric body 261b, the piezoelectric body 261b excites. Deflection of the base part 222 of the elastic body 261a due to excitation of the piezoelectric body 261b is magnified by the comb-tooth part 221 of the elastic body 161a, and makes a progressive wave at the driving face 223 at the tip ends of the comb-tooth part 221. It should be noted that, in the present embodiment, the piezoelectric body 261b is made to be an electrode pattern for which a 9-peak progressive wave (9th order bending vibration wave) tends to generate.

The moving body 262 is formed from a light metal such as aluminum. The moving body 262 pressure contacts the driving face 223 by way of the pressure from the pressurized contact means 264 having the pressure plate and pressurizing member. Elliptic motion occurs at the crests of the wave of the progressive wave generated by the driving face 223. The moving body 262 under pressurized contact with the driving face 223 is driven by the friction from this elliptic motion to rotationally move. The rotational direction of the moving body 262 changes according to the phase difference between the drive signals of the A-phase and B-phase of the piezoelectric body 261b.

A vibration absorbing member 266 such as of rubber that absorbs vibration in the optical axis direction of the moving body 262 is arranged in the moving body 262. The vibration absorbing member 266 pressure contacts an output transfer unit 255 by way of the pressurized contact means 264. The rotational motion of the moving body 262 is transferred to the output transfer unit 255. However, for the output transfer unit 255, the movement in the optical axis direction and movement in the radial direction are restricted by a bearing 256 attached in a fixed member 251.

The output transfer unit 255 has a projecting part 255a. This projecting part 255a fits together with a fork 254. The rotational motion of the output transfer unit 255 is transferred to the fork 254 via the projecting part 255a. Furthermore, the rotational motion thereof transfers to a cam ring 253. On the inner side of the cam ring 253, a key groove 253a is cut in a spiral shape in the circumferential direction. A fixed pin 252a is provided to the outer circumferential side of an AF ring 252. When the cam ring 253 rotates, the fixed pin 252a moves being guided in the key groove 253a, and the AF ring 252 retaining the lens unit L moves in the optical axis direction.

In the above-mentioned way, the progressive wave generated by the vibration-wave motor 201 is transferred to the AF ring 252 via the moving body 262, output transfer unit 255, fork 254 and cam ring 253, whereby the lens unit L is driven in the optical axis direction along with the AF ring 252. The lens barrel executes a wobbling operation, etc. using this driving.

Figure 16:
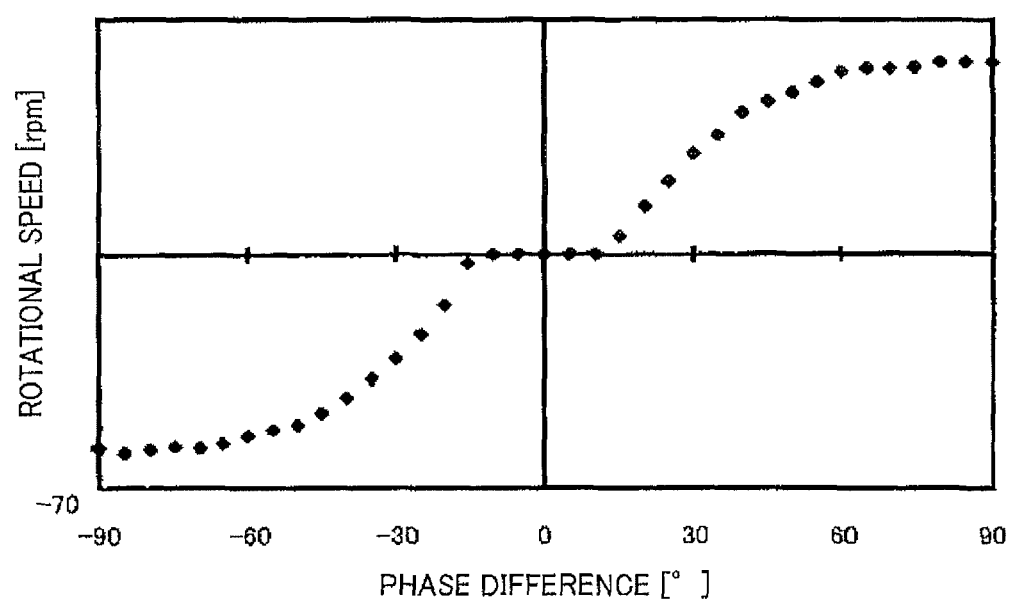
FIG. 16 is a graph showing phase difference—rotational speed characteristic of the vibration-wave motor.

FIG. 16 is a graph showing the relationship between the phase difference between the drive signals of the A-phase and B-phase and the rotational speed of the moving body 262. The rotational speed of the moving body 262 reaches a maximum speed of positive rotation (for example, clockwise rotation) when the phase difference is +90°, and reaches a maximum speed of reverse rotation (for example, counter-clockwise rotation) when the phase difference is −90°.

Figure 17:
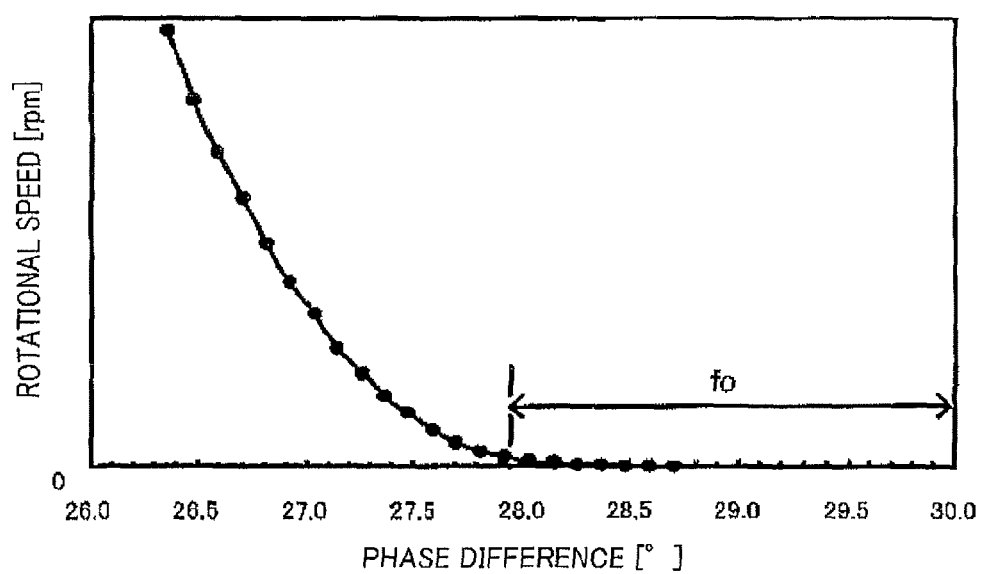
FIG. 17 is a graph showing a frequency—rotational speed characteristic of the vibration-wave motor.

FIG. 17 is a graph showing the relationship between the frequency of drive signals and the rotational speed of the moving body 262. The rotational speed of the moving body 262 is substantially zero when the frequency of the drive signal is with a predetermined range. Herein, substantially zero refers to a state in which torque for only causing the moving body 262 under pressurized contact with the vibration absorbing member 266, etc. to rotate is not generated. For example, within the range shown in FIG. 17, the rotational speed of the moving body 262 becomes zero within the range from 28.5 kHz to 30.0 kHz. In addition, even if a lower frequency than 28.5 kHz or a higher frequency than 30.0 kHz, a frequency exists at which a torque for only causing the moving body 262 under pressurized contact with the vibration absorbing member 266, etc. to rotate is not generated, the cam ring 253, etc. are not rotated, and the rotational speed of the moving body 262 is substantially zero. The matter of such a frequency at which the rotational speed of the moving body 262 becomes substantially zero is referred to as holding frequency f0.

In the present invention, upon switching the rotational driving direction of the moving body 262, the frequency of the drive signal is changed to the holding frequency f0 without stopping the voltage application to the vibration-wave motor 201. It is thereby possible to reduce the abnormal noise generating upon applying voltage again after stopping voltage application.

Figure 18:
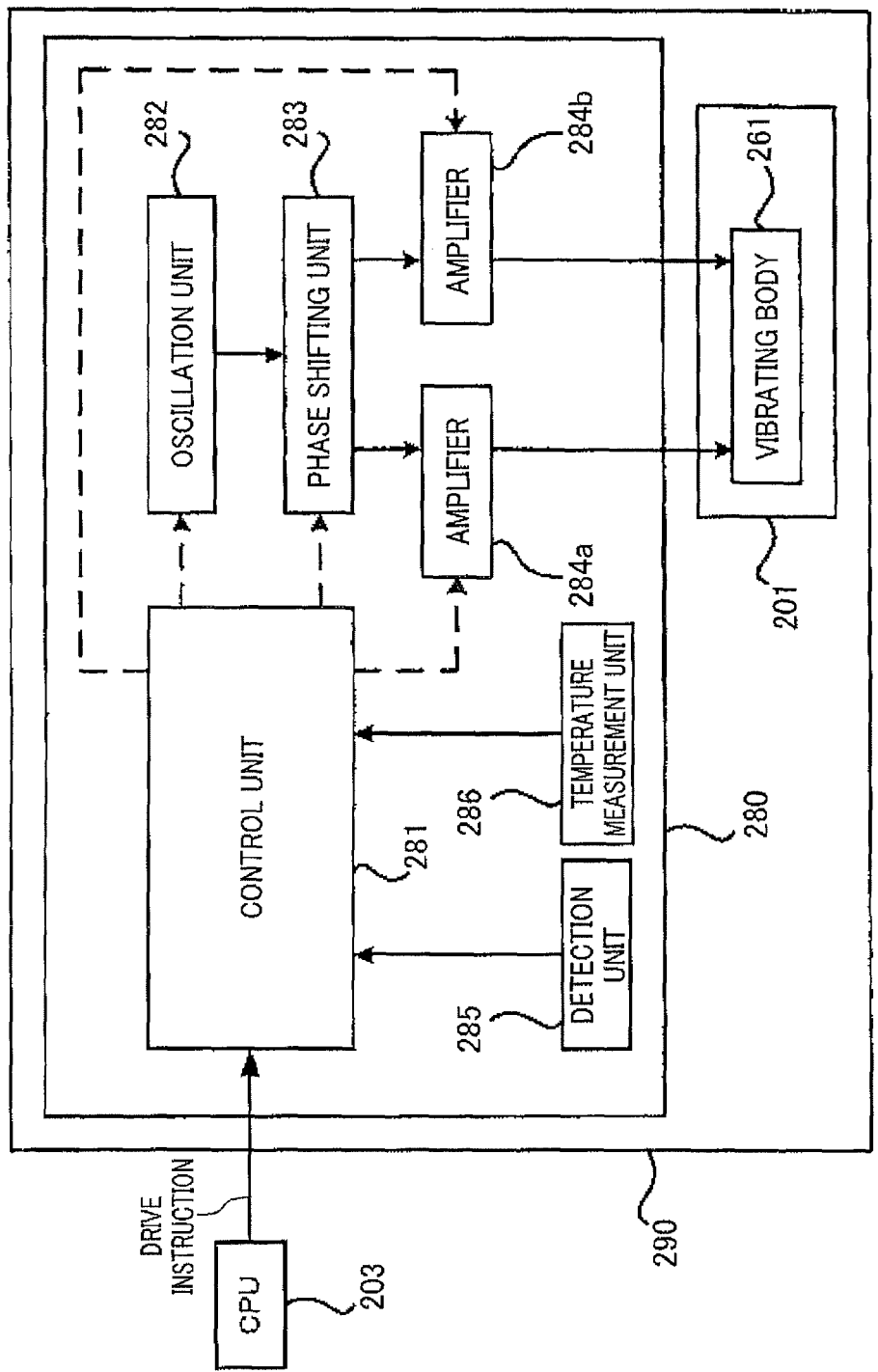
FIG. 18 is a block diagram showing the drive apparatus according to a third embodiment of the present invention.

FIG. 18 is a block diagram relating to the drive apparatus according to the third embodiment of the present invention. A drive apparatus 290 exemplified in FIG. 18 includes a vibration-wave motor 201 and drive circuit 280. The drive circuit includes a control unit 281, oscillation part 282, phase shifting unit 283, amplifiers 284a and 284b, detection unit 285 and temperature measurement unit 286.

The oscillation part 282 oscillates a signal of a frequency set by the control unit 281. The phase shifting unit 283 generates the signal of the A-phase and the signal of the B-phase based on an oscillation signal oscillated by the oscillation part 282. A phase difference between this signal of the A-phase and signal of the B-phase is set by the control unit 281.

The amplifier 284a amplifies (boosts) the voltage amplitude of the signal of the A-phase generated by the phase shifting unit 283 to a voltage set by the control unit 281. The drive signal of the A-phase is thereby generated. In addition, the amplifier 284b amplifies (boosts) the voltage amplitude of the signal of the B-phase generated by the phase shifting unit 283 to a voltage set by the control unit 281. The drive signal of the B-phase is thereby generated.

The vibrating body 261 is driven based on the drive signal of the A-phase amplified by the amplifier 284a, and the drive signal of the B-phase amplified by the amplifier 284b. The detection unit 285 is configured by an optical encoder, magnetic encoder or the like, detects the position and/or speed of the lens unit L driven by the driving of the moving body 262, and outputs these detection values to the control unit 281 as electrical signals (detection signals). The control unit 281 acquires information relating to the position and/or speed of the lens unit L based on the detection signals from the detection unit 285.

The temperature measurement unit 286 measures the temperature of the vibration-wave motor 201. The temperature of the vibration-wave motor 201 rises from the heat producing from friction between the vibrating body 261 and the moving body 262. A temperature rise in the vibration-wave motor 201 adversely affects the driving ability thereof. The temperature measurement unit 286 outputs the measured temperature signal to the control unit 281. The control unit 281 estimates the influence on the driving ability imparted by the temperature of the vibration-wave motor 201, based on the temperature signal thereof.

The control unit 281 acquires a drive instruction relating to the movement direction and movement amount of the lens unit L from a CPU 203 of the lens barrel 202. The control unit 281 controls the frequency set in relation to the oscillation part 282, the phase difference set in relation to the phase shifting unit 283, and the voltage amplitude set in relation to the amplifiers 284 and 284b, so that the lens unit L is positioned at the target position decided based on the drive instruction. It should be noted that the drive instruction acquired by the control unit 281 is not limited to only instructions related to combinations of movement direction and movement amount. For example, it may include the patterns of movement speed and movement sequence (for example, number of revolutions of wobbling operations). In addition, the drive instruction acquired by the control unit 281 may be a combination of movement direction and movement speed.

Figure 20A:
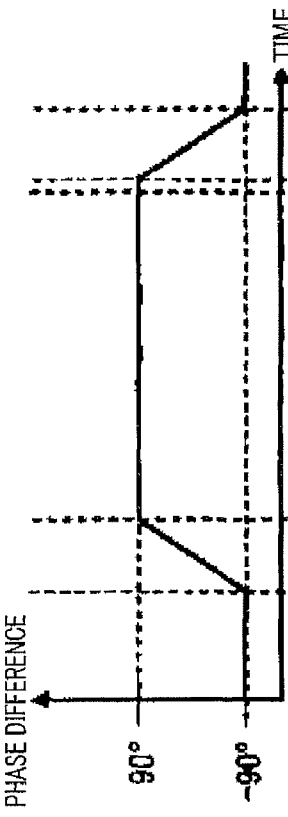
FIGS. 20A to 20C provide a timing chart example related to drive control of the vibration-wave motor by the drive apparatus according to the third embodiment of the present invention.
Figure 20B:
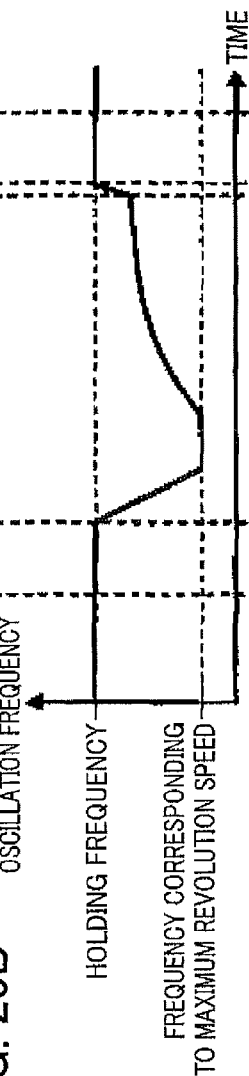
Figure 20C:
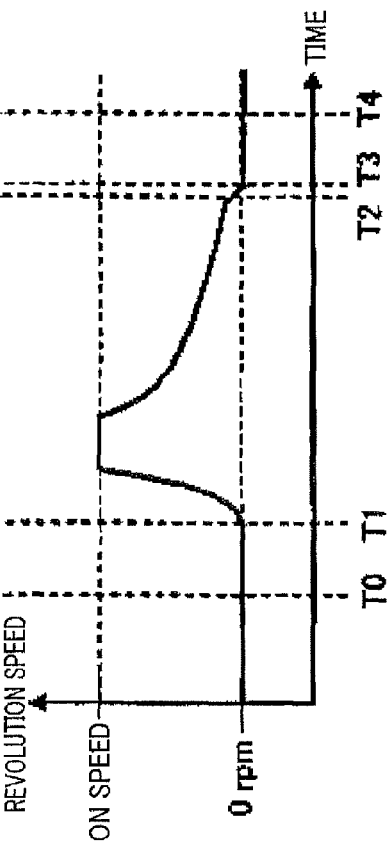

Drive control of the vibration-wave motor 201 of the present invention will be explained using FIG. 19 and FIGS. 20A to C. FIG. 19 is an example of a flowchart relating to drive control of the vibration-wave motor 201. FIGS. 20A to C are examples of timing charts relating to drive control of the vibration-wave motor 201. FIG. 20A is a timing chart relating to the phase difference between the drive signals of the A-phase and B-phase. FIG. 20B is a timing chart relating to the oscillation frequency of the oscillation part 282, i.e. frequency of the drive signal. FIG. 20C is a timing chart relating to the revolution speed of the vibration-wave motor 201.

The processing of FIG. 19 starts execution when the control unit 281 acquires a drive instruction. In Step S100, the control unit 281 controls so as to set the holding frequency f0 in the oscillation part 282, and the signal of the holding frequency f0 from the oscillation unit 282 is oscillated.

In Step S110, the control unit 281 sets the phase difference of +90° or −90° in the phase shifting unit 283, and changes the phase difference between the signal of the A-phase and the signal of the B-phase outputted by the phase shifting unit 283 (timing T0 to T1, and timing T3 to T4 in FIG. 20). When the frequency oscillated by the oscillation unit 282 is the holding frequency f0, the revolution speed of the vibration-wave motor 201 is substantially zero. Therefore, driving of the vibration-wave motor 201 will not become unstable, even if the control unit 281 changes the phase difference in Step S110.

After changing of the phase difference in Step S110 ends, the control unit 281 controls the frequency set in the oscillation part 282 based on the drive instruction, the position and/or speed of the lens unit L calculated from the detection signals from the detection unit 285, the temperature of the vibration-wave motor 201 measured by the temperature measurement unit 286, individual differences in vibration-wave motors 201, etc., and controls so that the lens unit L is positioned at the target position (timing T1 to T2 in FIG. 20).

If the frequency set in the oscillation unit 282 becomes a lower frequency wave than the holding frequency f0, the revolution speed of the vibration-wave motor 201 will become greater than zero. Since the voltage application to the vibration-wave motor 201 is not made to stop when causing the vibration-wave motor 201 to stop, abnormal noise is not generated even when the vibration-wave motor 201 starts driving.

In Step S130, the control unit 281 judges whether the lens unit L has reached the target position. The control unit 281 advances the processing to Step S120 in the case of Step S130 being negatively judged, and advances the processing to Step S140 in the case of Step S130 being positively judged.

In Step S140, the control unit 281 controls so as to set the holding frequency f0 in the oscillation part 282, and the signal of the holding frequency f0 is oscillated from the oscillation unit 282 timing T2 to T3 in FIG. 20).

In Step S150, the control unit 281 judges whether a subsequent drive instruction is being acquired. The control unit 281 advances the processing to Step S110 in the case of Step S150 being positively judged, and advances the processing to Step S160 in the case of Step S150 being negatively judged.

In Step S160, the control unit 281 sets the phase difference of 0° in the phase shifting unit 283, changes the phase difference between the signal of the A-phase and the signal of the B-phase outputted by the phase shifting unit 283, and then ends the processing of FIG. 19. It is thereby controlled so that the rotational speed of the vibration-wave motor 201 becomes zero according to the phase difference as shown in FIG. 16.

As shown in FIG. 17, the holding frequency f0 has a range of available values. In Step S140, the effect obtained in the vibration-wave motor 201 changes according to what value within the range the control unit 281 sets the holding frequency f0 set in the oscillation unit 282. The difference in effects thereof will be explained using FIG. 21.

Figure 21:
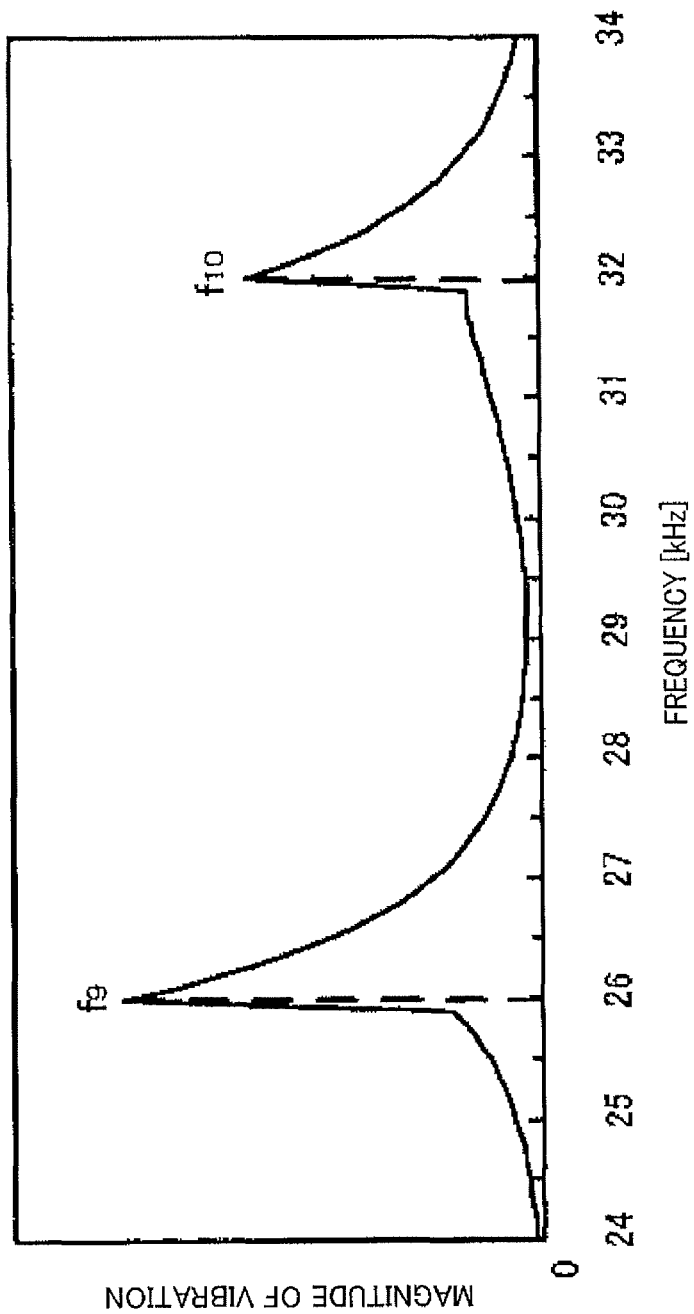
FIG. 21 is a graph illustrating a holding frequency.

FIG. 21 is a graph exemplifying the frequency—vibration deformation characteristic of the vibrating body 261. FIG. 21 exemplifies the position at which the natural frequency f9 of a 9th-order bending vibration of the vibrating body 262 is 26 kHz, and exemplifies the position at which the natural frequency f10 of the 10th-order bending vibration is 32 kHz. Hereinafter, the natural frequency f9 of the 9th-order bending vibration is abbreviated simply as natural frequency f9, and the natural frequency f10 of the 10th-order bending vibration is abbreviated simply as natural frequency f10.

When the frequency of the drive signal is in the vicinity of the natural frequency f9 of the 9th-order bending vibration, a 9-peak progressive wave generates at the driving face 223 of the vibrating body 261. Then, when the frequency of the drive signal is in the vicinity of the natural frequency f10 of the 10th-order bending vibration, a 10-peak progressive wave generates at the driving face 223 of the vibrating body 261. Among the magnitudes of vibration of the vibrating body 261, the 9-peak progressive wave component becomes smaller as the frequency distances from the natural frequency f9. Similarly, among the magnitudes of vibration of the vibrating body 261, the 10-peak progressive wave component becomes smaller as the frequency distances from the natural frequency f10.

As mentioned in the foregoing, the piezoelectric body 261b assumes an electrode pattern that tends to cause a 9-peak progressive wave to be excited, and the vibration-wave motor 201 has a better drive efficiency when using a 9-peak progressive wave than when using a 10-peak progressive wave. For this reason, the magnitude of the vibration of the 9-peak progressive wave in FIG. 21 is greater than the magnitude of the vibration of the 10-peak progressive wave.

In the case of the phase difference between the drive signals of the two phases being the same, the rotational direction of the 9-peak progressive wave and the 10-peak progressive wave will be opposite directions from each other. For example, in the case of the phase difference between the drive signals of the two phases being +90°, when the frequency of the drive signal is 27 kHz, the moving body 262 rotates as positive rotation, and when the frequency of the drive signal is 33 kHz, the moving body 262 rotates as reverse rotation. When the frequency is between the natural frequency f9 and the natural frequency f10, the rotation of the moving body 262 according to 9-peak progressive wave component and the rotation of the moving body 262 according to the 10-peak progressive wave component cancel out each other.

(1) Case of holding frequency f0 being average value of natural frequency f9 and natural frequency f10. In the case of the holding frequency f0 being the average value of natural frequency f9 and natural frequency f10, e.g., a case of the holding frequency f0 being 29 kHz in the example of FIG. 21, the magnitude of the vibration of the vibrating body 261 becomes small. This is because, in the middle between the natural frequency $f_9$ and the natural frequency f10, the 9-peak progressive wave component and the 10-peak progressive wave component decrease together. Furthermore, the rotation of the moving body 262 according to the 9-peak progressive wave component and the rotation of the moving body 262 according to the 10-peak progressive wave component cancel.

Therefore, in the case of the holding frequency f0 being the average value of the natural frequency f9 and natural frequency f10, since the moving body 262 will not distance from the vibrating body 261 due to the magnitude of the vibration of the vibrating body 261 being small, abnormal noise will not generate from collisions between the moving body 262 and vibrating body 261. In addition, since the rotation of the moving body 262 according to the 9-peak progressive wave component and the rotation of the moving body 262 according to the 10-peak progressive wave component cancel, the certainty of stopping rotation of the moving body 262 increases.

(2) Case of holding frequency f0 being higher frequency than average value of natural frequency f9 and natural frequency f10. In the case of the holding frequency f0 being higher frequency than the average value of natural frequency f9 and natural frequency f10, i.e. a case of being closer to natural frequency f10 than natural frequency f9, the 10-peak progressive wave component becomes dominant in the progressive wave generated by the vibrating body 262. The moving body 262 rotating based on the 9-peak progressive wave component in Step S120 of FIG. 19 is controlled based on the 10-peak progressive wave component when the drive frequency is changed to the holding frequency f0 in Step S140. In other words, since the rotation according to the 10-peak progressive wave component has a rotational direction that is an opposite direction to the rotation according to the 9-peak progressive wave component, the rotational direction of the moving body 262 in Step S140 becomes an opposite direction to the rotational direction during control in the immediately previous Step S120. However, since the torque generating from the vibration-wave motor 201 at this time is small, the fork 254, cam ring 253 and AF ring 252 do not rotate.

Therefore, in the case of there being a subsequent drive instruction in Step S150, when deciding to cause the moving body 262 to rotate in the reverse direction in the subsequent drive instruction, rattling between the projecting part 255a and fork 254 and rattling between the key groove 253a and fixed pin 252a stop. It is thereby possible to suppress mechanical collision noise when the moving body 262 actually starts to rotate in the reverse direction.

(3) Case of holding frequency f0 being lower frequency than average value of natural frequency f9 and natural frequency f10. In the case of the holding frequency f0 being lower frequency than the average value of natural frequency f9 and natural frequency f10, i.e. a case of being closer to natural frequency f9 than natural frequency f10, the 9-peak progressive wave component becomes dominant in the progressive wave generated by the vibrating body 262.

In this case, the rotational direction of the moving body 262 in Step S140 is the same direction as the rotational direction during control in the immediately prior Step S120. Therefore, in the case of there being a subsequent drive instruction in Step S150, when deciding to cause the moving body 262 to rotate in the same direction in the subsequent drive instruction, rattling between the projecting part 255a and fork 254 and rattling between the key groove 253a and fixed pin 252a stop. It is thereby possible to suppress mechanical collision noise when the moving body 262 actually starts to rotate in the same direction.

In addition, since the holding frequency f0 is closer to natural frequency f9 when the above (1) and (2), the period of timing T2 to T3 in FIG. 20 can be shortened when the above (1) and (2). The processing time in drive control of the moving body 262 is thereby shortened, and the stop accuracy of the moving body 262 rises.

As explained in the above (2), when driving in the opposite direction to the immediately prior drive instruction with the subsequent drive instruction, it is better to set the holding frequency f0 to a higher frequency than the average frequency of natural frequency f9 and natural frequency f10. In addition, as explained in the above (3), when driving in the same direction as the immediately prior drive instruction with the subsequent drive instruction, it is better to set the holding frequency f0 to a lower frequency than the average frequency of natural frequency f9 and natural frequency f10.

Figure 22:
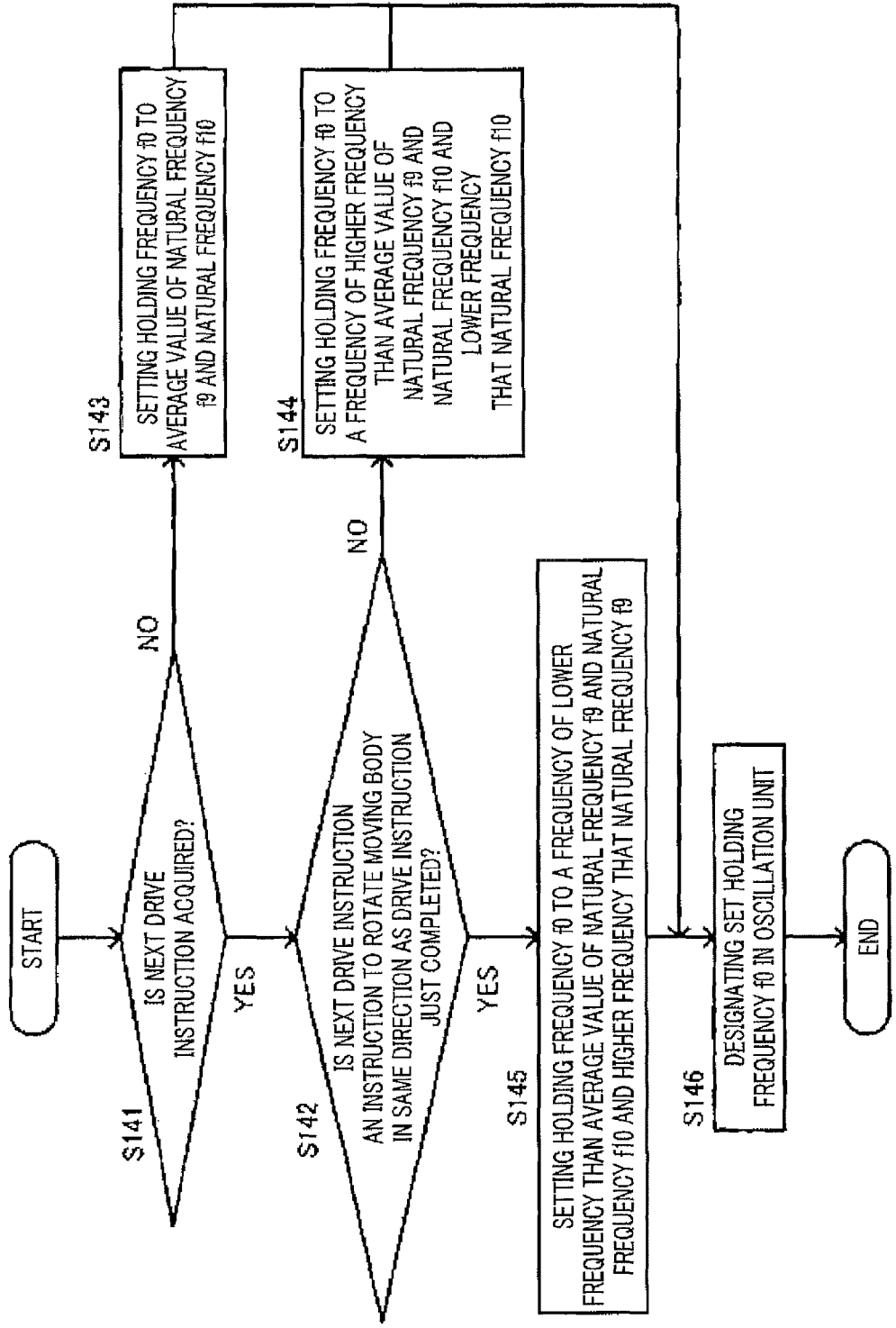
FIG. 22 is a flowchart related to setting processing of the holding frequency.

FIG. 22 is a flowchart relating to the processing of Step S140 in FIG. 19. In the processing of FIG. 22, the holding frequency is appropriately set based on the subsequent drive instruction executed after executing a drive instruction.

In Step S141, the control unit 281 judges whether to acquire a subsequent drive instruction. The control unit 281 advances the processing to Step S142 in the case of Step S141 being positively judged, and advances the processing to Step S143 in the case of Step S141 being negatively judged.

In Step S142, the control unit 281 judges whether the subsequent drive instruction is an instruction to cause the moving body 262 to rotate in the same direction as the drive instruction completed immediately prior. The control unit 281 advances the processing to Step S145 in the case of Step S142 being positively judged, and advances the processing to Step S144 in the case of Step S142 being negatively judged.

In Step S143, the control unit 281 sets the holding frequency f0 to the average value of natural frequency f9 and natural frequency f10. Effects like those explained in the above (1) are thereby obtained. In Step S144, the control unit 281 sets the holding frequency f0 to a frequency that is higher frequency than the average value of natural frequency f9 and natural frequency f10, and lower frequency than natural frequency f10. Effects like those explained in the above (2) are thereby obtained. In Step S145, the control unit 281 sets the holding frequency f0 to a frequency that is lower frequency than the average value of natural frequency f9 and natural frequency f10, and higher frequency than natural frequency f9. Effects like those explained in the above (3) are thereby obtained.

In Step S146, the control unit 281 sets the holding frequency f0 set in Steps S143 to S145 in the oscillation part 282.

The following operational effects are obtained according to the embodiment explained above. The drive apparatus 290 driving the lens unit L in the lens barrel 202 includes the drive circuit 280 and vibration-wave motor 201. The drive circuit 280 generates the drive signals of the A-phase and B-phase. The vibration-wave motor 201 includes the vibrating body 261 and moving body 262. The vibrating body 261 includes the piezoelectric body 261b to which the drive signals of the A-phase and B-phase generated by the drive circuit 280 are applied, thereby causing a progressive wave to be generated at the driving face 223 of the elastic body 261a by the vibration of this piezoelectric body 261b, and causing a drive force for driving the moving body 262 under pressurized contact to generate. The drive circuit 280 has the control unit 281 that sets the frequency and phase difference of the drive signals of the A-phase and B-phase, changes the phase difference set in the phase shifting unit 283 (Step S110 of FIG. 19) after setting the frequency oscillated by the oscillation part 282 to the holding frequency f0 when changing the driving direction of the moving body 262. By configuring in this way, it is possible to suppress the generation of abnormal noise since driving of the moving body 262 is made to stop according to the control of drive frequency, upon switching the driving direction of the moving body 262 by the drive apparatus 290.

When changing the phase difference while the moving body 262 is driving, the rotation of the moving body 262 becomes unstable, and there is concern over abnormal noise generating by collision between the moving body 262 and vibrating body 261. However, there is no concern over such abnormal noise generating so long as configuring so as to control the phase difference between the drive signals of the A-phase and B-phase in a state in which driving of the moving body 262 is stopped, as in the present invention.

In addition, when changing the phase difference while the moving body 262 is driving, the moving body 262 may be temporarily driven at low speed; however, the rotational unevenness of the moving body 262 increases during low speed driving, and thus there is concern over no longer being able to ensure stop precision. However, such an increase in rotational unevenness does not occur, and thus there is no concern over no longer being able to ensure stop precision, so long as configuring so as to control the phase difference between the drive signals of the A-phase and B-phase in a state in which driving of the moving body 262 is stopped, as in the present invention.

The third embodiment explained above can be implemented by modifying in the following way.

Modified Example 4

In the above-mentioned embodiment, the piezoelectric body 261b is configured to be in an electrode pattern for which a 9-peak progressive wave tends to generate, and generates a S-peak progressive wave or 10-peak progressive wave at the driving face 223 of the vibrating body 261. However, the progressive wave generated by the vibrating body 261 is not limited to a 9-peak progressive wave. The present invention may be configured to cause an nth-order bending vibration to generate from any n-peak progressive wave at the driving face 223.

Modified Example 5

In the above-mentioned embodiment, the phase difference between drive signals of the A-phase and B-phase is not controlled while performing drive control of the lens unit L by controlling the frequency set in the oscillation part 282. However, within a range in which abnormal noise from collisions between the moving body 262 and vibrating body 261 and an increase in rotational unevenness of the moving body 262 can be ignored, the phase difference of the drive signals of the A-phase and B-phase may be controlled also while performing drive control of the lens unit L by controlling the frequency set in the oscillation part 282.

Fourth Embodiment

Figure 23:
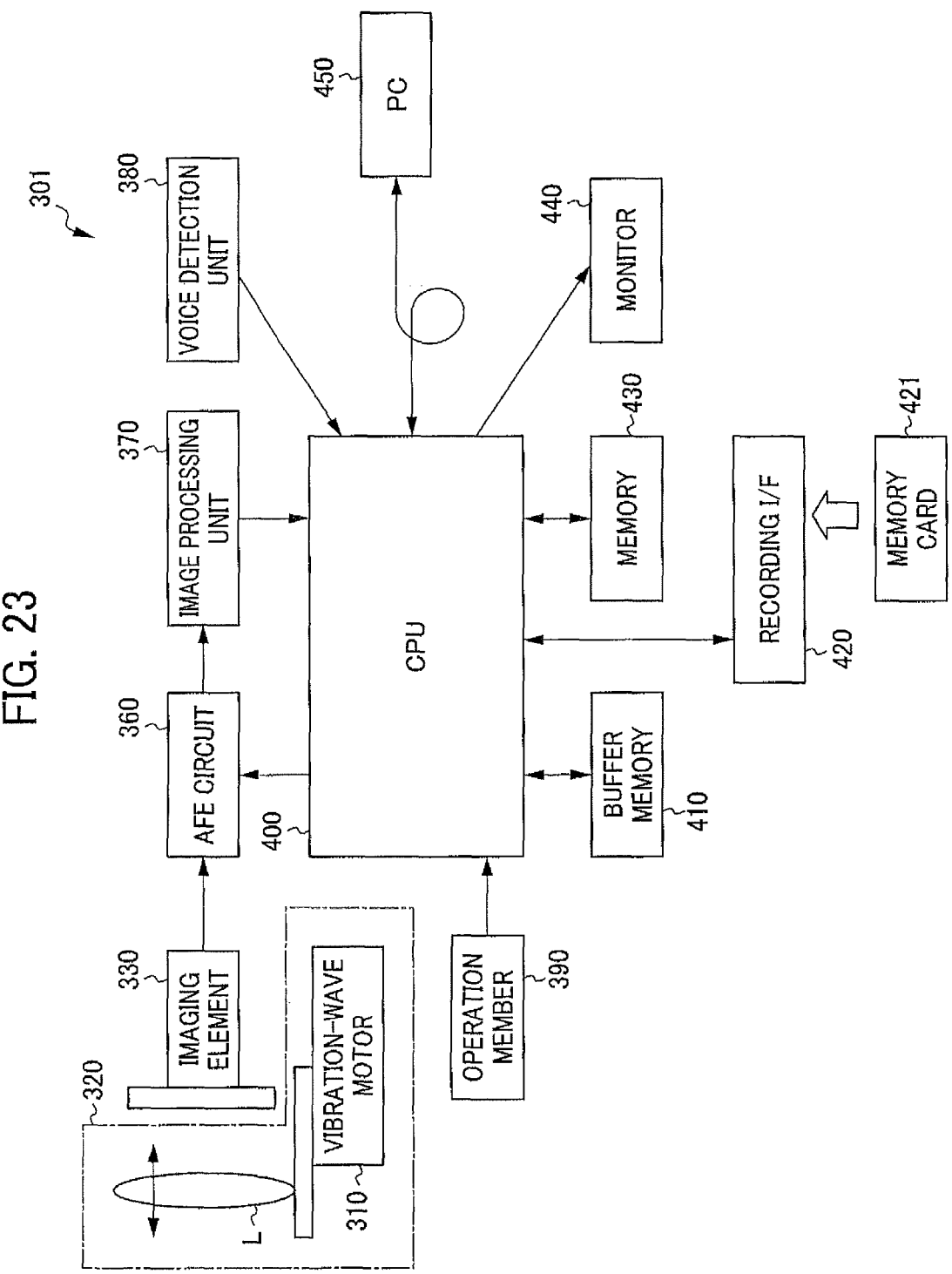
FIG. 23 is a diagram illustrating a electric camera of a fourth embodiment of the present invention.

Hereinafter an embodiment of a electric camera 301 according to the present invention will be explained in detail while referencing the attached drawings. FIG. 23 is a view illustrating a electric camera 301 of a fourth embodiment of the present invention. The electric camera 301 is a camera capable of still image and moving image photography, is configured from a lens barrel 320, which is an imaging optical system, an imaging element 330, an AFE (Analog Front End) circuit 360, an image processing unit 370, a voice detection unit 380, an operation member 390, a CPU 400, buffer memory 410, a recording interface 420, memory 430, and a monitor 440, and is connectable with a PC 450 of an external device.

The lens barrel 320 is configured from a plurality of optical lens units L, and causes a subject image to focus on a light receiving surface of the imaging element 330. FIG. 23 illustrates the plurality of optical lens units L by simplifying as a single lens. Among these optical lens units L, a third lens unit L3 for AF described later (illustrated in FIG. 23) is driven by a vibration-wave motor 310.

The imaging element 330 is configured by a CMOS image sensor and the like in which light-receiving elements are aligned in two-dimensions on the light receiving surface. The imaging element 330 generates an analog image signal by photoelectrically converting the subject image from a beam having passed through the lens barrel 320.

The analog image signal is inputted to the AFE circuit 360. The AFE circuit 360 performs gain adjustment (signal amplification according to the ISO sensitivity) on the analog image signal. More specifically, the imaging sensitivity is changed within a predetermined range according to a sensitivity setting instruction from the CPU 400. The AFE circuit 360 converts the image signal after analog processing by a built-in A/D conversion circuit into digital data. This digital data is inputted to the image processing unit 370.

The image processing unit 370 performs various image processing on digital image data. The buffer memory 410 temporarily records image data in pre-process or post-process of the image processing by the image processing unit 370.

The voice detection unit 380 is configured from a microphone and a signal amplifier, mainly detects and captures a voice from the subject direction during moving image photograph, and transmits this data to the CPU 400.

The operation member 390 indicates mode dials, the arrow keys, a select button and a release button, and sends an operation signal according to the respective operations to the CPU 400. The setting of still image photography and moving image photograph is set by way of the operation member 390.

The CPU 400 unifyingly controls actions performed by the electric camera 301 by executing a program stored in the ROM that is not illustrated. For example, AF (autofocus) operation control, AE (automatic exposure) operation control, and auto white balance control, etc. are performed.

The recording interface 420 has a connector that is not illustrated, a recording medium such as a memory card 421 is connected to this connector, and performs the writing of data to the connected recording medium or reading of data from the recording medium.

The memory 430 records a sequence of image data subjected to image processing. Images corresponding to a moving image are captured in the electric camera 301 of the present embodiment. The monitor 440 is configured by a liquid crystal panel, and displays an operation menu, still image, moving image, etc. according to an instruction from the CPU 400.

Figure 24:
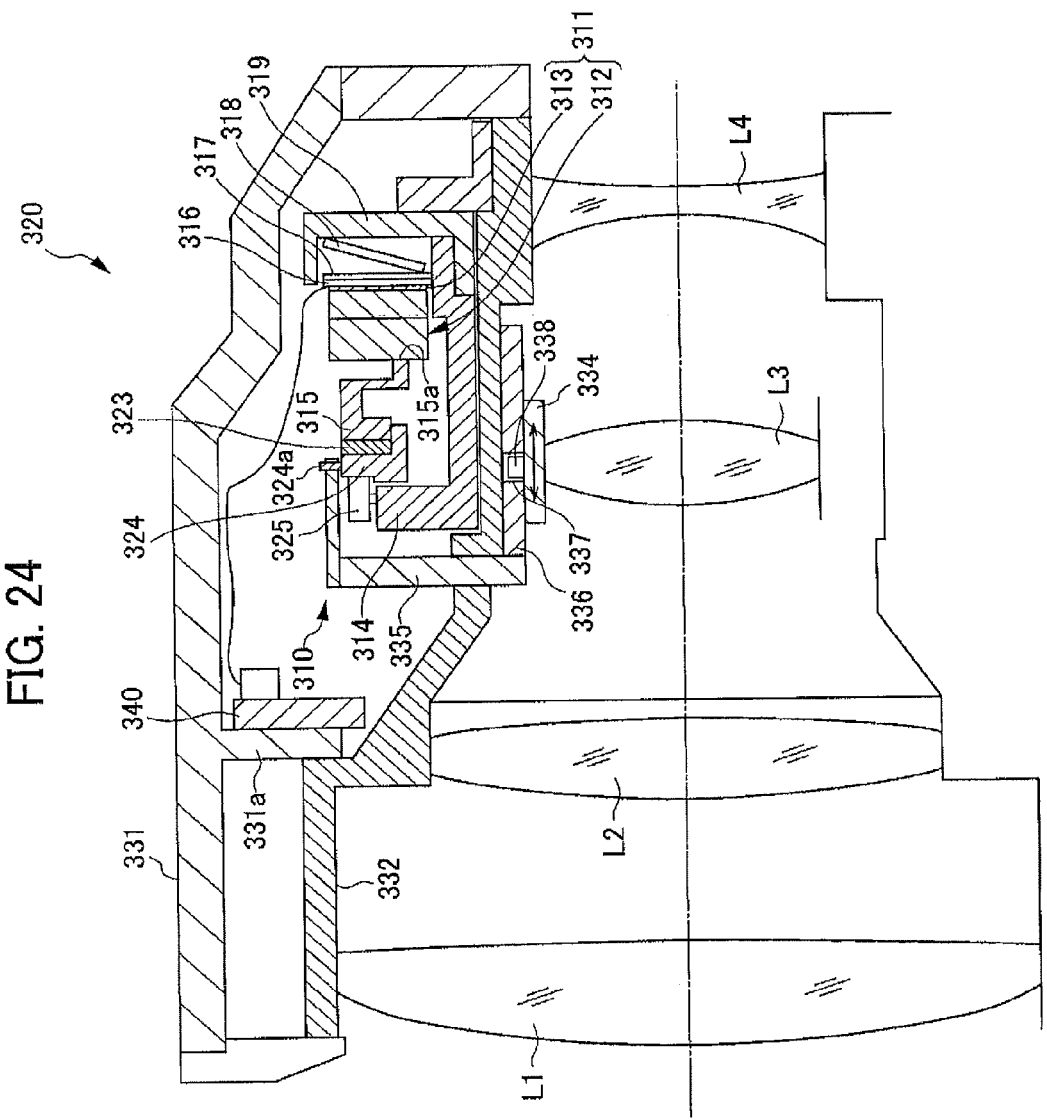
FIG. 24 is a diagram illustrating a lens barrel of the fourth embodiment of the present invention.
Figure 25:
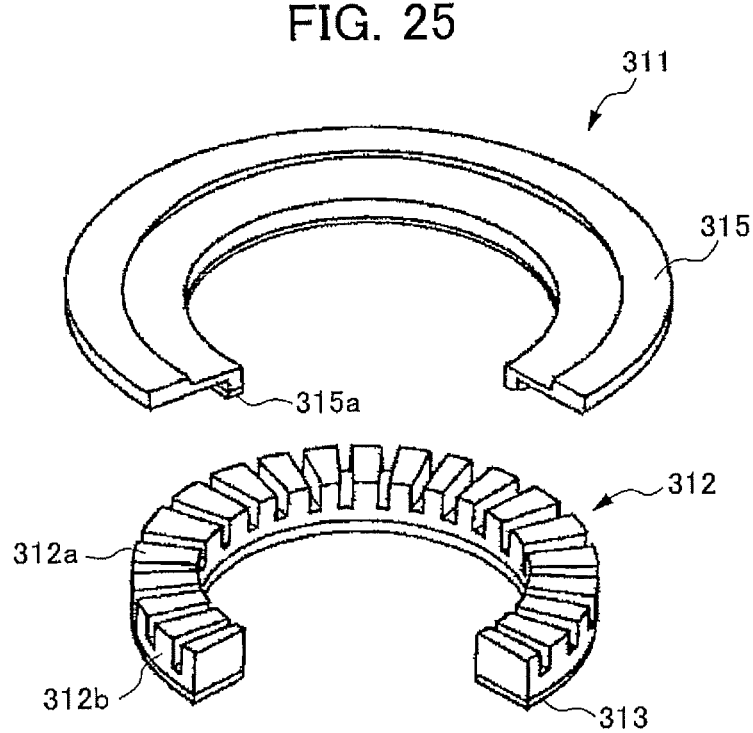
FIG. 25 is a diagram illustrating a vibrator of a vibration-wave motor according to the fourth embodiment of the present invention.

Next, the lens barrel 320 will be explained. FIG. 24 is a view illustrating the lens barrel 320 according to the fourth embodiment of the present invention. FIG. 25 is a view illustrating a vibrator 311 of the vibration-wave motor 310 according to the fourth embodiment of the present invention. The lens barrel 320 includes an outer fixed cylinder 331 that covers the outer circumferential part of the lens barrel 320, an inner fixed cylinder 332 that is positioned more to the inner circumferential side than the outer fixed cylinder 331, and further includes the vibration-wave motor 310 between the outer fixed cylinder 331 and the inner fixed cylinder 332.

From a subject side, a first lens unit L1, a second lens unit L2, a third lens unit L3, which is an AF lens retained in an AF ring 334, and a fourth lens unit L4 are arranged in the inner fixed cylinder 332. The first lens unit L1, second lens unit L2 and fourth lens unit L4 are fixed to the inner fixed cylinder 332. The third lens unit L3 is configured to be moveable relative to the inner fixed cylinder 332 by way of the AF ring 334 moving.

As shown in FIG. 24, the vibration-wave motor 310 includes a vibrator 311, a moving element 315, a pressurizing member 318, etc., and assumes a form fixing the vibration 311 side thereof and rotationally driving the moving element 315. The vibrator 311 will be explained. As shown in FIG. 25, the vibrator 311 is configured from an electro-mechanical conversion element exemplified as a piezoelectric element or electrorestrictive element that converts electrical energy to mechanical energy (hereinafter referred to as piezoelectric body 313), and an elastic body 312 joined with the piezoelectric body 313. Although made so that a progressive wave generates in the vibrator 311, a 9-peak progressive wave is generated as one example in the present embodiment.

The elastic body 312 consists of a metal material having a large resonance sharpness, and the shape thereof is an annular shape The opposing face of the elastic body 312 to which the piezoelectric body 313 is joined forms a comb-teeth portion 312 in which grooves are cut, and the tip end face of the projecting portions (parts without grooves) are a driving face and are under pressurized contact with the moving element 315. The vibration-wave motor 310 drives the third lens unit L3 by driving the moving element 315 using the drive force generated at the driving face by way of the excitation of the piezoelectric body 313. The reason for cutting the grooves is to bring the neutral plane of the progressive wave as near as possible to the piezoelectric body 313 side, thereby making the amplitude of the progressive wave at the driving face amplified. The portions not cut with grooves are called base parts 312b in the present embodiment.

The piezoelectric body 313 is joined at the opposing face of the base parts 312b than the comb-teeth part 312a. Lubricity surface treatment is made on the driving face of the elastic body 312. The piezoelectric body 313 is divided into the two phases (A-phase, B-phase) along the circumferential direction, and in each phase, elements for which the poles are alternating every ½ wavelength are aligned, and a ¼ wavelength interval is open between the A-phase and B-phase.

The piezoelectric body 313 is generally configured from a material like lead zirconate titanate, which is called by the abbreviation PZT; however, due to environmental problems in recent years, it may also be configured from potassium sodium niobate, potassium niobate, sodium niobate, barium titanate, bismuth sodium titanate, bismuth potassium titanate, etc., which are lead-free materials.

As shown in FIG. 24, below the piezoelectric body 313, a non-woven fabric 316, pressure plate 317 and pressurizing member 318 are arranged. The non-woven fabric 316 is exemplified as felt, is arranged below the piezoelectric body 313, and makes so that vibration of the vibrator 311 does not convey to the pressure plate 317 or pressurizing member 318.

The pressure plate 317 is made so as to receive the pressure of the pressurizing member 318. The pressurizing member 318 is configured from a disk spring, is arranged below the pressure plate 317, and causes an applied pressure to generate. In the present embodiment, although the pressurizing member 318 is a disk spring, it does not need to be a disk spring, and may be a coil spring or a wave spring. The pressurizing member 318 is retained by a pressing ring 319 being fixed to a fixed member 314.

The moving element 315 consists of a light metal such as aluminum, and surface treatment of a sliding material or the like for abrasion resistance improvement is done on the surface 315a of sliding face (refer to FIG. 25).

In order to absorb vibrations in the longitudinal direction of the moving element 315, a vibration absorbing member 323 formed from rubber or the like is arranged on the moving element 315, and thereon, an output transfer member 324 is arranged.

The output transfer member 324 is made so as to define the pressurizing direction and radial direction by way of a bearing 325 provided to the fixed member 314, whereby the pressurizing direction and radial direction of the moving element 315 are defined.

The output transfer member 324 has a projecting part 324a and, therefrom, a fork 335 connecting to a cam ring 336 fits. The cam ring 336 is rotated along with the rotation of the output transfer member 324.

A key groove 337 is cut obliquely relative to the circumferential direction in the cam ring 336. In addition, a fixed pin 338 is provided at the outer circumferential side of the AF ring 334. The fixed pin 338 fits into the key groove 337, and by the cam ring 336 rotationally driving, the AF ring 334 is driven in the optical axis advancing direction, and makes it possible to stop at a desired position.

The pressing ring 319 is attached by a spring to the fixed member 314. By attaching the pressing ring 319 to the fixed member 314, it is possible to configure from the output transfer member 324, moving element 315, vibrator 311 until the pressurizing member 318 as one motor unit.

Figure 26:
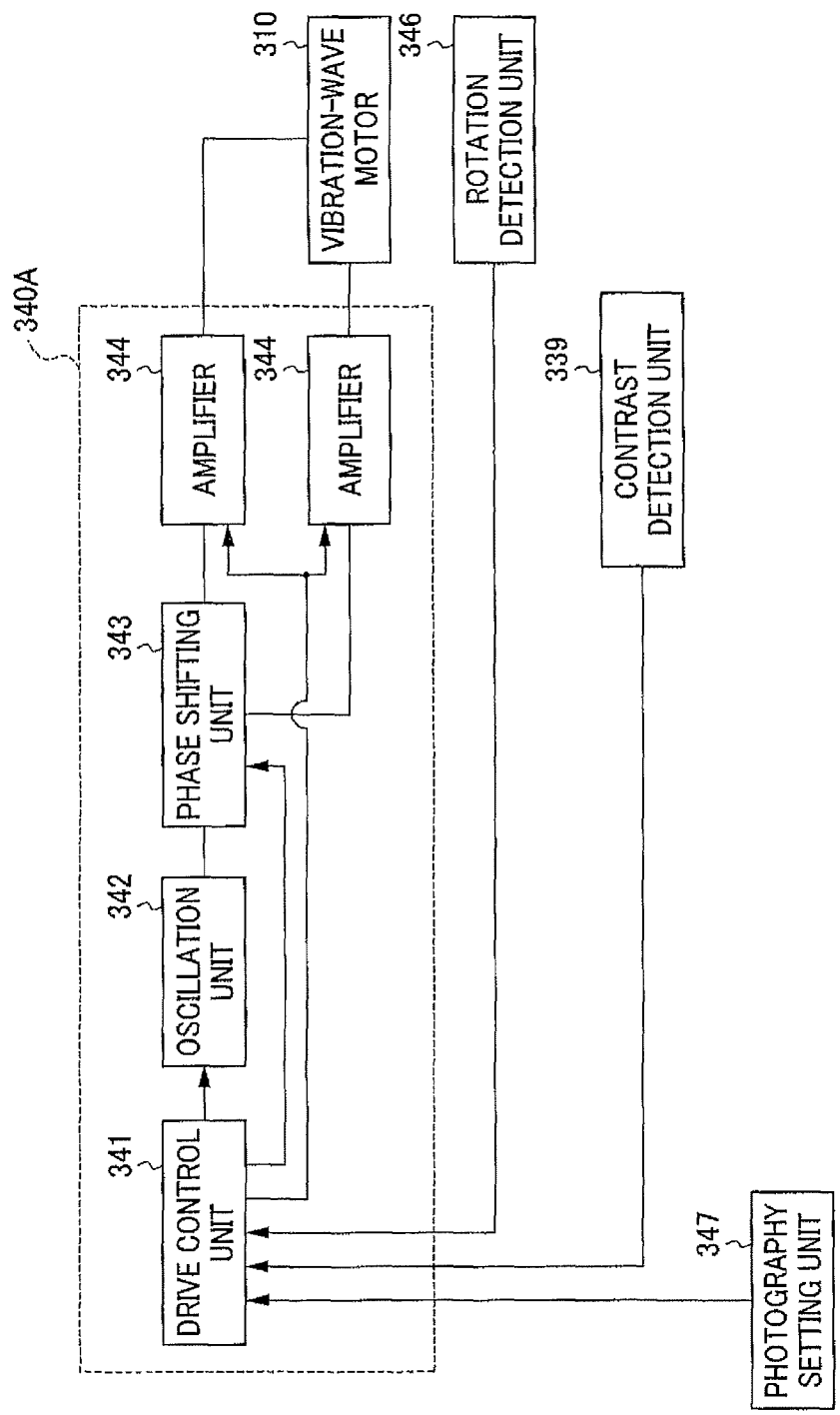
FIG. 26 is a block diagram illustrating a drive apparatus of the vibration-wave motor.

Next a drive apparatus 340A will be explained. FIG. 26 is a block diagram illustrating the drive apparatus 340A of the vibration-wave motor 310. The drive apparatus 340A is provided to a substrate 340 (refer to FIG. 24). The drive apparatus 340A is connected to the vibration-wave motor 310 as shown in FIG. 26, and receives a revolution speed of the vibration-wave motor 310 from the rotation detection unit 345 provided to the vibration-wave motor 310, as well as performing control of the vibration-wave motor 310.

The drive apparatus 340A includes a drive control unit 341, oscillation part 342, phase shifting unit 343, and amplifier 344. In addition, the rotation detection unit 346 attached to the vibration-wave motor 310, a contrast detection unit 339 and a photography setting unit 347 that can select moving image photography mode or a still image photography mode are connected to the drive control unit 341 of the drive apparatus 340A.

The drive control unit 341 controls driving of the vibration-wave motor 310 based on a drive command from the CPA 340 inside of the lens barrel 320 or the main body of the camera 301. The oscillation part 342 generates a drive signal of a desired frequency according to the command of the drive control unit 341. The drive signal is asymmetrically shaped in the + direction and − direction based on zero potential. The phase shifting unit 343 divides the drive signal generated by the oscillation part 342 into two drive signals of different phases. The amplifier 344 boosts the two drive signals divided by the phase shifting unit 343 to desired voltages, respectively. The two drive signals from the amplifier 344 are transmitted to the vibration-wave motor 310, whereby a progressive wave generates at the vibrator 311 by way of the application of these two drive signals, and the moving element 315 is driven.

The rotation detection unit 346 is configured from an optical encoder, magnetic encoder, or the like, detects the position and/or speed of a driven object driven by the driving of the moving element 315, and transmits the detection value to the drive control unit 341 as an electrical signal. The contrast detection unit 339 detects the contrast of the subject image. The contrast detection unit 339, for example, determines if the subject is within a current range of focal positions of the lens, is in the + direction, is in the − direction, and being displaced to what extent. The contrast detected by the contrast detection unit 339 is transmitted to the drive control unit 341 as an electrical signal.

The drive control unit 341 controls the driving of the vibration-wave motor 310 based on the drive command from the CPU 400 inside of the lens barrel 320 or of the main body of the camera 301. When receiving the detection signal from the rotation detection unit 346, the drive control unit 341 obtains positional information and speed information based on this value, and controls the frequency of the oscillation part 342, phase difference of the phase shifting unit 343 and voltage of the amplifier 344, so as to position at the target position.

In addition, the drive control unit 341 makes so that the photography information (still image mode/moving image mode, etc. selected by way of the photography setting unit 347) is transferred by the lens or camera. The drive control unit 341 smoothly controls the frequency and phase difference of the drive signals based on this photography information from the lens or camera. More specifically, in a case of the photography setting unit 347 having selected moving image photography mode, the drive control unit 341 switches the phase difference of the two drive signals, as well as switching the frequency of the two drive signals to correspond to the switched phase difference, while maintaining the voltages of the two drive signals to be constant, whereby the speed of the vibration-wave motor 310 is variable. In addition, the drive control unit 341 switches the frequencies of the two drive signals based on the contrast detected by the contrast detection unit 339.

In order to simplify the explanation in the present embodiment, a configuration is established in which the information of the contrast detection unit 339 and information of the photography setting unit 347 are transmitted directly to the drive control unit 341; however, it is not to be limited thereto. For example, it may be configured so that the information of the contrast detection unit 339 and/or information of the photography setting unit 347 is temporarily conveyed to the CPU of the camera, and subsequently conveyed to the drive control unit 341 in the lens.

Next, driving and control of the vibration-wave motor 310 by the drive apparatus 340A will be explained. First, the target position is transmitted from the CPU 400 inside the lens barrel 320 or the main body of the camera 301 to the drive control unit 341. The drive signal generates from the oscillation part 342, this signal is split into two drive signals of 90° different phase by the phase shifting unit 343, and is amplified to a desired voltage by the amplifier 344. The drive control unit 341 provides two drive signals to the vibration-wave motor 310.

The two drive signals are applied to the piezoelectric body 313 of the vibration-wave motor 310, the piezoelectric body 313 is excited, and a 9-peak bending vibration generates at the elastic body 312 according to this excitation. The piezoelectric body 313 is divided into the A-phase and B-phase, and the two drive signals are respectively applied to the A-phase and B-phase. The 9-peak bending vibration generating from the A-phase and the 9-peak bending vibration generating from the B-phase form so as to have a positional phase shifted by ¼ wavelength, and the A-phase drive signal and B-phase drive signal are shifted by 90° phase; therefore, the two bending vibrations are combined to form a 9-peak progressive wave. A +90° or −90° value of the phase difference is an ideal value, and although the shape of the progressive wave is disturbed at an intermediate value thereof, a progressive wave is produced. Elliptic motion occurs at the crests of the wave of the progressive wave. Therefore, the moving element 315 under pressurized contact with the driving face is driven by the friction from this elliptic motion.

An optical encoder is arranged at the driven body driven by the driving of the moving element 315, and from this, an electrical pulse generates, which is transmitted to the drive control unit 341. The drive control unit 341 becomes able to obtain the current position and current speed based on this signal, and controls the drive frequency of the oscillation part 342 based on this positional information, speed information and target position information.

In addition, in the case of driving the AF ring 334 in the positive direction, the phase difference between the two drive signals (frequency voltage signals) may be set to a + value, e.g., +90°, by the phase shifting unit 343, and in the case of driving the AF ring 334 in the reverse direction, the phase difference between the two drive signals (frequency voltage signals) may be set to a −value, e.g., −90°, by the phase shifting unit 343.

On the other hand, based on the information as to the current photography mode being the still image mode/moving image mode, the drive control unit 341 controls the drive frequency of the oscillation part 342 in the case of being the still image mode, and controls the drive frequency of the oscillation part 342 and the phase difference of the phase shifting unit 343 in the case of being the moving image mode. In particular, in the wobbling operation causing the third lens unit L3 for AF to move back and forth in small motions, the phase difference is changed to control the position and speed. Wobbling operation is an operation causing the lens for AF to move back and forth in small motions to make the focal position follow the subject.

Figure 27A:
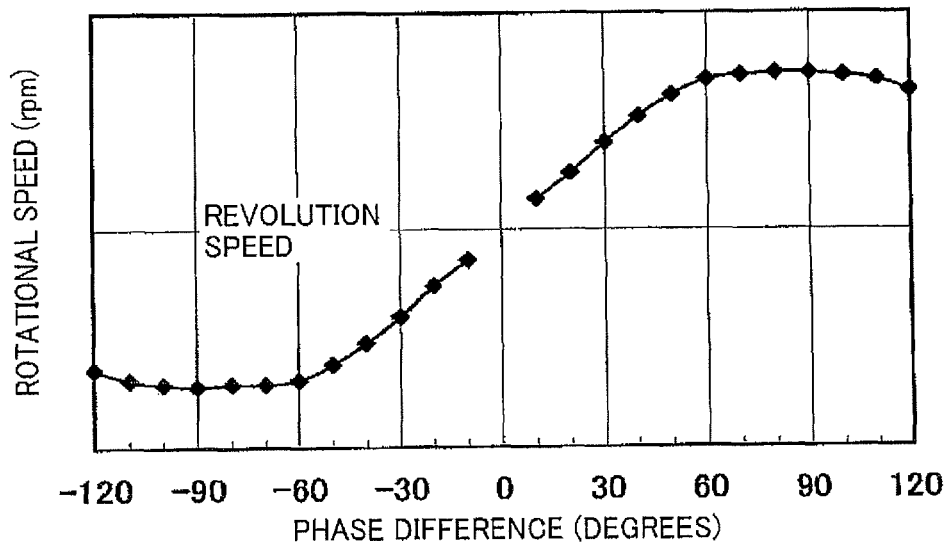
FIG. 27A is a graph showing the relationship of the rotational speed of the vibration-wave motor relative to the phase difference of the drive signals.
Figure 27B:
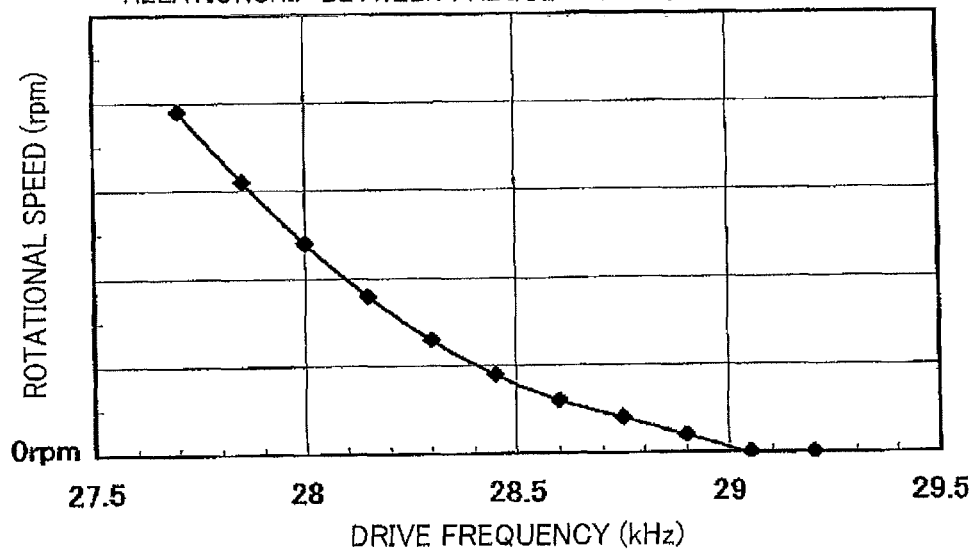
FIG. 27B is a graph showing the relationship of rotational speed of the vibration-wave motor relative to the drive frequency.

FIG. 27A is a graph showing the relationship of rotational speed relative to the phase difference of the drive signals of the vibration-wave motor, and FIG. 27B is a graph showing the relationship of the rotational speed relative to the drive frequency of the vibration-wave motor. As shown in FIG. 27A, the rotational speed reaches a maximum speed of positive rotation at the phase difference of the two drive signals of +90°, and reaches a maximum speed of reverse rotation at the phase difference of the two drive signals of −90°, and the intermediate phase differences thereof indicate intermediate speed values. In addition, as shown in FIG. 27B, when the drive frequency is decreased, the rotational speed increases, and when increasing the frequency, the rotational speed declines, and reaches 0. For example, when setting the phase difference of the two drive signals to +90°, the rotational speed increases with smaller drive frequency.

First Operation Example

Figure 28:
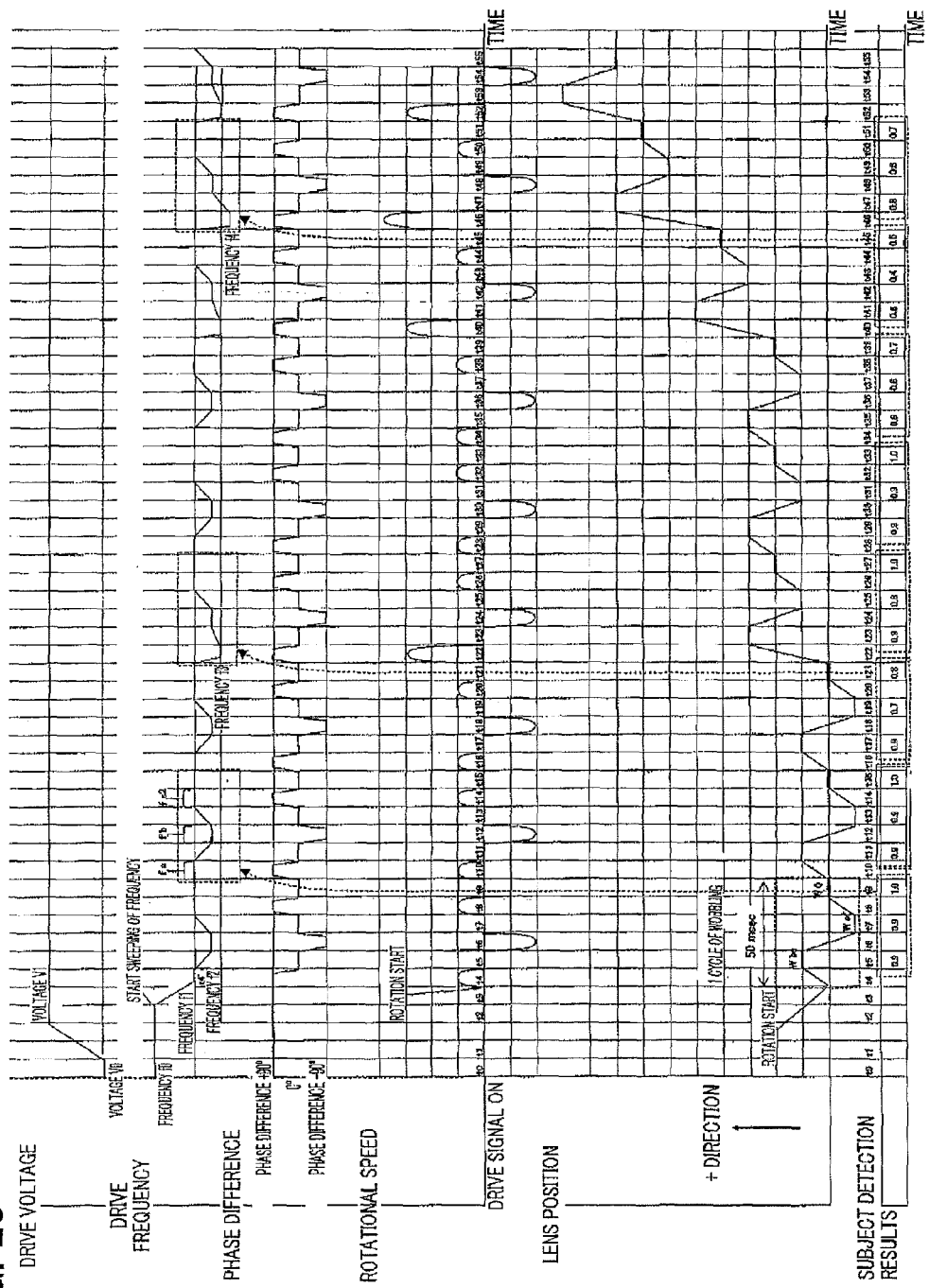
FIG. 28 is a timing chart illustrating the operations of a first operation example of the drive apparatus according to the fourth embodiment.

Next, a first operation example of a fourth embodiment of the present invention will be explained based on a timing chart for the driving of the vibration-wave motor 310 by the drive apparatus 340A in the case of the moving image mode being selected. FIG. 28 is a timing chart illustrating operations of the first operation example of the drive apparatus 340A according to the fourth embodiment. In the case of the moving image mode being selected in the present embodiment, the relationships of the drive frequency, drive voltage, phase difference, and rotational speed of the vibration-wave motor 310 will be explained in sequential order. In the present embodiment, in the case of the moving image mode being selected, the drive frequency is set to f0 (maximum frequency), and the drive voltage is set to V0 (minimum voltage).

At t0, the drive apparatus 340A sets the phase difference of the two drive signals to +90°, and turns ON the drive signal.

At t1, the drive apparatus 340A causes the drive voltage to increase.

At t2, the drive apparatus 340A sets the drive voltage to V1.

At t3, the drive apparatus 340A starts sweeping the drive frequency from the maximum frequency f0.

At t4' immediately after t4, the drive apparatus 340A starts driving the vibration-wave motor 310 in the middle of the drive frequency being swept, and sets the drive frequency to frequency f1.

In the case of being the moving image mode, wobbling operation is performed to make the third lens unit L3 for AF to move back and forth in small motions. In the case of the present embodiment, it is established at an interval of 20 Hz. At t4 to t5, the drive apparatus 340A sets the phase difference of the two drive signals to +90° to cause rotation as positive rotation, and makes the speed V. At t5 to t6, the drive apparatus 340A sets the phase difference of the two drive signals to 0°, and the contrast at position Wbe is detected by the contrast detection unit 339. At t6 to t7, the drive apparatus 340A sets the phase difference of the two drive signals to −90°, setting the frequency to f2, which is smaller than f1, causing to reverse-rotationally drive at the frequency f2, and the speed is set to −2V (twice V). The reason for setting the speed during reverse rotation of the wobbling operation to twice the positive rotation is that the movement amount of the lens position is twice.

At t7 to t8, the drive apparatus 340A sets the phase difference of the two drive signals to 0°, and detects the contrast at position Waf. At t8 to t9, the drive apparatus 340A sets the phase difference of the two drive signals to +90°, causing positive rotational driving at frequency f1, and makes the speed V. At t9 to t10, the drive apparatus 340A sets the phase difference of the two drive signals to 0°, and detects the contrast at $W_0$ position.

Wobbling operation is performed by repetition hereinafter. One cycle of the wobbling operation (for example, between t4 and t10) is an interval of 20 Hz (=approx. 50 msec). Between t9 and t10, the position of the subject is calculated from the detection results of contrast of position Wbe, position Waf and position $W_0$ to decide the drive frequency of one cycle of the next wobbling operation. In other words, based on the contrast of a predetermined one cycle in the wobbling operation detected by the contrast detection unit 339, the drive control unit 341 switches the frequency of the two drive signals of a subsequent one cycle to a predetermined one cycle, so that the focal position of the third lens unit L3 for AF follows the subject.

The deciding parameters are the frequency fs between t10 and t11, the frequency fb between t12 and t13, and the frequency fs2 between t14 and t15. For example, in the results of contrast detection in one cycle of the wobbling operation between t4 and t10, in the case of being determined that the subject is between the wobbling amplitude (+1 to −1), in one cycle of the subsequent wobbling operation, the wobbling amplitude is set to +1 to −1 and defines frequency fs=$f_1$, frequency fb=f2 and frequency fs2=$f_1$. It should be noted that the subject detection results in FIG. 28 are configured so as to indicate better contrast with a larger value (good contrast=in focus=defined as 1, and indicating a smaller numerical value as going more out of focus).

In addition, as another case, in the case of being determined that the subject is in the +direction from the current lens position as a result of contrast detection in one cycle of the wobbling operation between t17 to t22, one cycle of the subsequent wobbling operation defines the speed at t22 to t23 as 3V, and performs movement of the lens at three times the wobbling amplitude. In this case, it defines frequency fs=f3 (frequency even smaller than f2), frequency fb=f2, and frequency fs2=f1.

Furthermore, as another case, in the case of being determined that the subject is greatly in the +direction from the current lens position as a result of contrast detection in one cycle of the wobbling operation between t40 and t45, one cycle of the subsequent wobbling operation performs movement of the lens at three times the wobbling amplitude, with the speed between t40 and t41 as 4V. In this case, it defines frequency fs=f4 (frequency even smaller than f3), frequency fb=f2, and frequency fs2=f1.

Herein, when trying to drive the lens, there is a possibility of a problem arising in that a very small sound during the drive signal ON when starting the drive signal to the vibration-wave motor is picked up by the microphone that detects voices during moving image photography. The cause thereof is from sound of various frequencies generating from the stator (vibrator) at the moment when the drive signal applied to the vibration-wave motor changes step-wise from 0V to a certain voltage, and the audible sound thereof being picked up with the voices. The sound pressure of this sound depends on the magnitude of voltage, and in the case of the voltage of the drive signal being small, a trend is observed of the sound pressure declining.

In this aspect, the moment when the drive signal is ON, the voltage value of the drive signal voltage decreases, and a countermeasure is taken by setting the sound pressure of the sound generated from the stator (vibrator) to no more than the sensitivity of the microphone, and after the drive signal is ON, returning the drive voltage to a normal voltage (rated voltage).

However, it is necessary to perform the wobbling operation to cause the AF lens to move forward and backward during moving image photography, and between when driving in the positive direction and when driving in the reverse direction, it temporarily stops, and the phase difference must change. In this case, in order to prevent a small noise from generating from the stator (vibrator), by a conventional control method, the phase difference between the two drive signals is set to +90°, and the drive voltage is changed from $V_0$ to $V_1$ to cause the AF ring 34 to positively rotationally drive. Next, the drive voltage is changed from $V_1$ to $V_0$, and the phase difference between the two drive signals is set to −90°. Furthermore, the drive voltage is changed from $V_0$ to $V_1$ to cause the AF ring 34 to reverse rotationally drive. Next, the drive voltage is changed from $V_1$ to $V_0$, and the phase difference between the two drive signals is set to +90°. Since repetition is performed hereinafter, it becomes a very complicated operation.

In the present embodiment, it is configured so as to perform the wobbling operation by switching the phase difference of the two drive signals between three stages (90°, 0°, −90°), and the setting a frequency according to this phase difference, while maintaining the voltage to be fixed. It should be noted that switching of the phase difference of the two drive signals is ideally continuously switching the phase difference gradually for very small sound generation prevention.

By configuring in this way, silent driving becomes possible without requiring complicated driving as is conventionally.

It should be noted that, in the case of the still image mode being selected, the voltage is set to the rated voltage $V_1$ and then the drive signal is turned ON to perform sweeping start of the drive frequency, as is conventionally. In addition, in the case of the still image mode, positional and/or speed control becomes control according to the drive frequency or drive voltage due to not being required to perform wobbling operation.

It should be noted that the sound during drive signal ON is small and detected as sound due to the voice microphone being provided very near the vibration-wave motor; however, it is sound that can almost not be heard by the operating person.

Hereinafter, operations of a first operation example of the drive apparatus 340A according to the fourth embodiment will be explained based on the flowchart.

Figure 29:
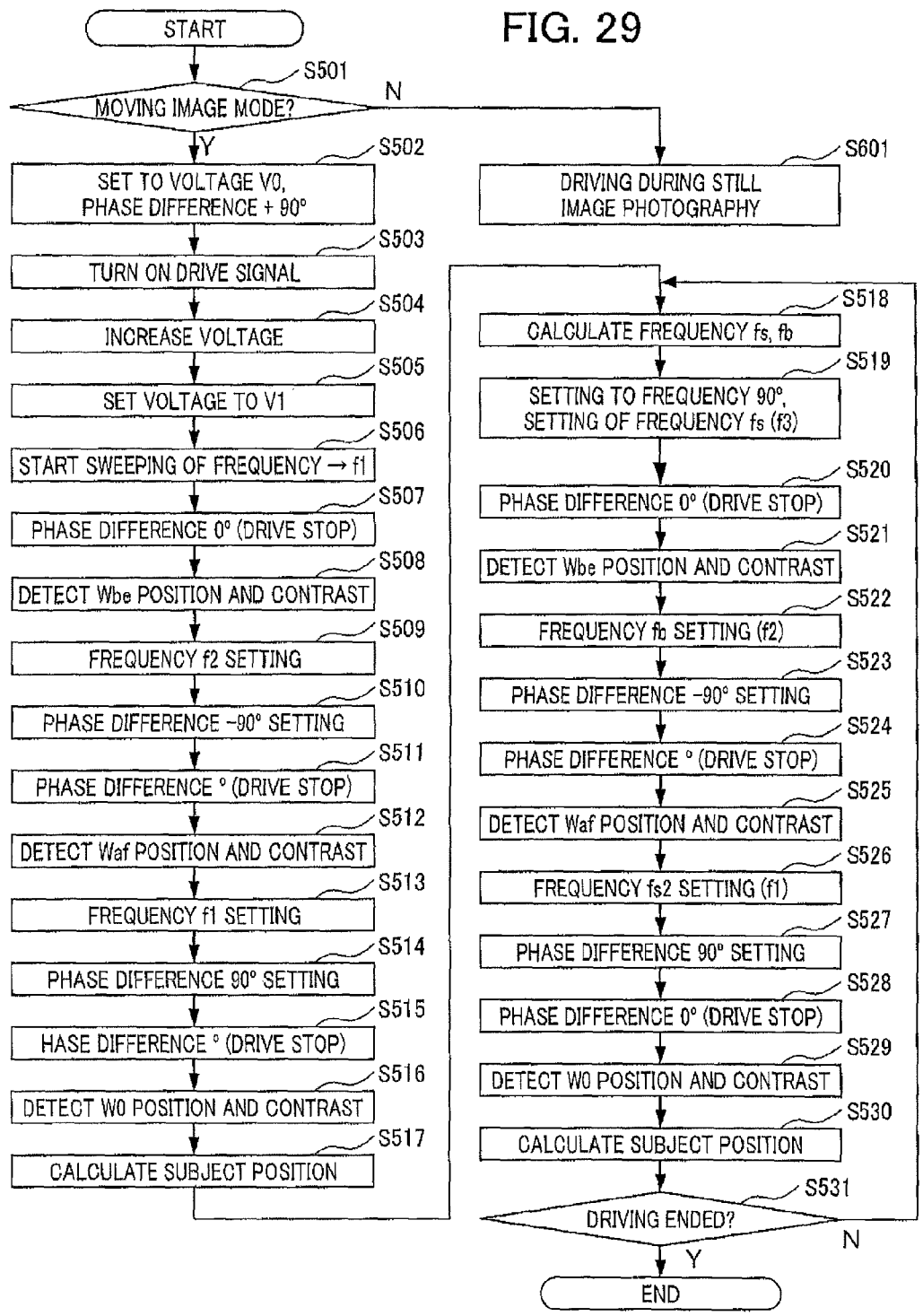
FIG. 29 is a flowchart illustrating the operations of the first operation example of the drive apparatus according to the fourth embodiment.

FIG. 29 is a flowchart illustrating operations of the first operation example of the drive apparatus 340A according to the fourth embodiment.

First, driving of the lens is started.

In S501, the drive apparatus 340A determines whether being the moving image mode or being the still image mode. In the case of being the moving image mode, the processing advances to Step S502. The drive apparatus 340A advances to Step S601 in the case of being the still image mode, and performs the driving operation during still image photography without performing the wobbling operation.

In Step S502, the drive apparatus 340A sets the voltage to V0, as well as setting the phase difference of the two drive signals to +90°.

In Step S503, the drive apparatus 340A turns the drive signal ON.

In Step S504, the drive apparatus 340A causes the voltages of the two drive signals increase.

In Step S505, the drive apparatus 340A sets the voltages of the two drive signals to $V_1$.

In Step S506, the drive apparatus 340A starts sweeping of the frequency, and sets the frequency to f1.

The moving element 315 thereby drives, and the AF ring 334 is driven in the positive direction.

In Step S507, the drive apparatus 340A sets the phase difference of the two drive signals to 0°. Driving of the moving element 315 thereby stops.

In Step S508, the drive apparatus 340A detects the position Wbe and contrast.

In Step S509, the drive apparatus 340A sets the frequency to f2.

In Step S510, the drive apparatus 340A sets the phase difference of the two drive signals to −90°.

The moving element 315 thereby drives, and the AF ring 334 is driven in the reverse direction.

In Step S511, the drive apparatus 340A sets the phase difference of the two drive signals to 0°. Driving of the moving element 315 thereby stops.

In Step S512, the drive apparatus 340A detects the position Waf and contrast.

In Step S513, the drive apparatus 340A sets the frequency to f1.

In Step S514, the drive apparatus 340A sets the phase difference of the two drive signals to 90°.

The moving element 315 thereby drives, and the AF ring 334 is driven in the positive direction.

In Step S515, the drive apparatus 340A sets the phase difference of the two drive signals to 0°.

Driving of the moving element 315 thereby stops.

In Step S516, the drive apparatus 340A detects the position W0 and contrast.

In Step S517, the drive apparatus 340A calculates the subject position according to the position Wbe, position Waf, position W0 and respective contrast information.

In Step S518, the frequencies fs and fb are calculated.

In Step S519, the drive apparatus 340A sets the phase difference of the two drive signals to +90°.

The drive apparatus 340A sets the frequency to fs. For example, in the results of detecting contrast in one cycle of the wobbling operation between t17 and t22 in FIG. 28, when determined that the subject is in the +direction from the current lens position, one cycle of the subsequent wobbling operation sets f3 (frequency even smaller than f2). The moving element 315 thereby drives, and the AF ring 334 is driven in the positive direction.

In Step S520, the drive apparatus 340A sets the phase difference of the two drive signals to 0°. Driving of the moving element 315 thereby stops.

In Step S521, the drive apparatus 340A detects the position Wbe and contrast.

In Step S522, the drive apparatus 340A sets the frequency to fb. For example, in the contrast detection results in one cycle of the wobbling operation between t17 and t22 in FIG. 28, the drive apparatus 340A sets the drive frequency to f2.

In Step S523, the phase difference of the two drive signals is set to −90°. The moving element 315 thereby drives, and the AF ring 334 is driven in the reverse direction.

In Step S524, the drive apparatus 340A sets the phase difference of the two drive signals to 0°. Driving of the moving element 315 thereby stops.

In Step S525, the drive apparatus 340A detects the position Waf and contrast.

In Step S526, the drive apparatus 340A sets the frequency to fs2 (=f1).

In Step S527, the drive apparatus 340A sets the phase difference of the two drive signals to 90°. The moving element 315 thereby drives, and the AF ring 334 is driven in the positive direction.

In Step S528, the drive apparatus 340A sets the phase difference of the two drive signals to 0°. Driving of the moving element 315 thereby stops.

In Step S529, the drive apparatus 340A detects the position W0 and contrast.

In Step S530, the drive apparatus 340A detects the subject position according to the position Wbe, position Waf, position W0 and respective contrast information.

In Step S531, the drive apparatus 340A determines whether driving of the AF ring 334 is finished.

In the case of driving of the AF ring 334 not being finished, the processing returns to Step S518, and performs the subsequent wobbling operation. In the case of there being a photography end command and making stop when driving finishes, phase difference switching control is finished, and the motion of the vibration-wave motor is stopped by sweeping the frequency to the high frequency side to f0. Then, the voltage is gradually decreased from V1 to V0, and thereafter, the drive signal is turned OFF.

In the present embodiment, the subject position is estimated by detecting the contrast of three places of the lens position in Steps S519 to S530, and the calculation of the frequencies fs and fb is done in Step S518 according to this information. By switching the phase difference between the A-phase and B-phase in three stages (90°, 0°, −90°) and setting the three drive frequencies of frequencies fs, fb and fs2, wobbling operation of the vibration-wave motor 10 is made possible.

Second Operation Example

Next, a second operation example according to the fourth embodiment of the present invention will be explained. In the second operation example, since the configurations of the lens barrel, vibration-wave motor and drive apparatus 340A are the same as the first operation example, explanations thereof will be omitted. The first operation example and second operation example differ in the operations within the drive apparatus 340A. The second operation example is a case of the position of the subject moving to the +direction of the lens position, and then from midway, moving in one direction.

Figure 30:
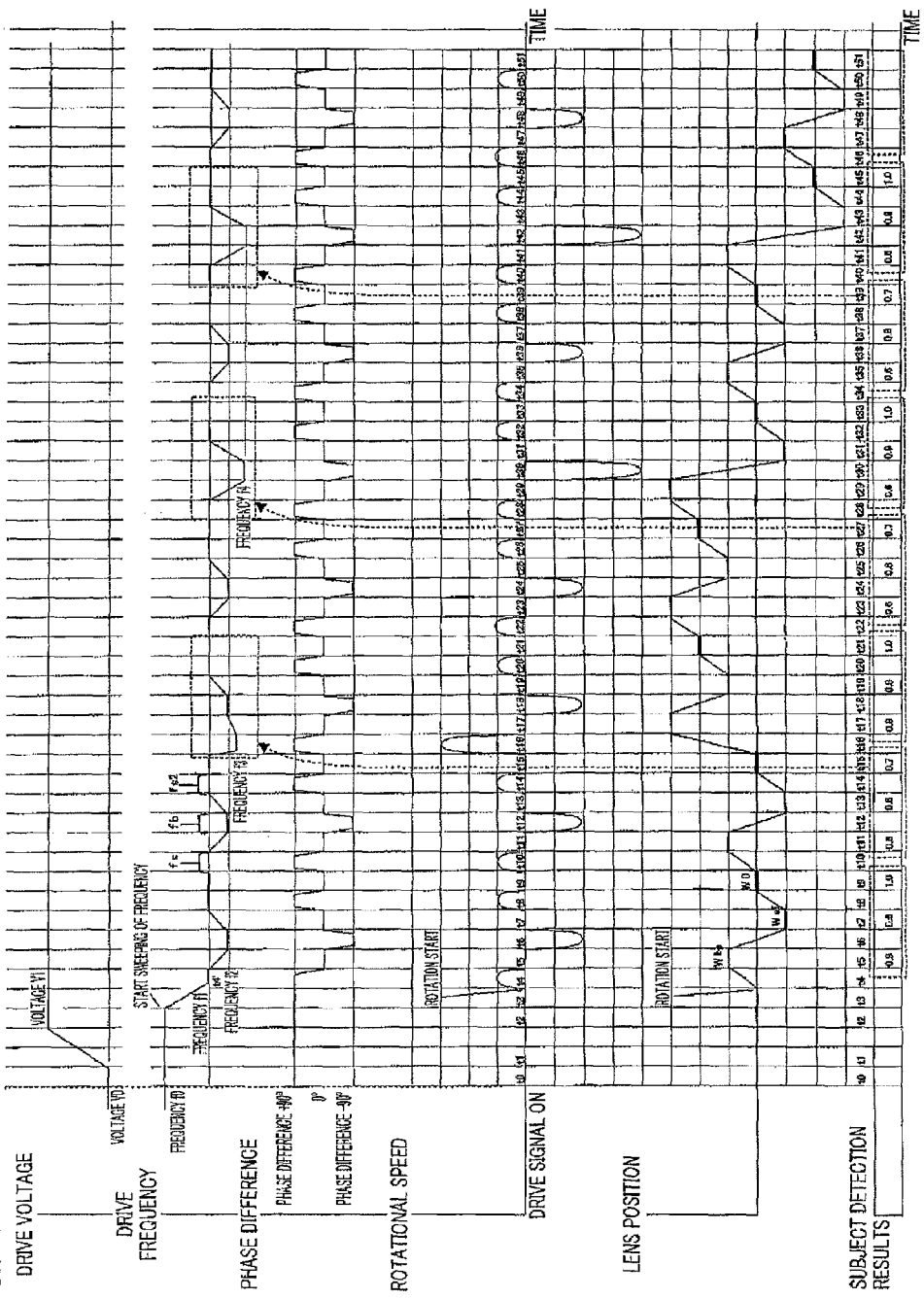
FIG. 30 is a timing chart illustrating the operations of a second operation example of the drive apparatus according to the fourth embodiment of the present invention.

Driving of the vibration-wave motor 310 by the drive apparatus 340A of the second operation example will be explained based on the timing chart. FIG. 30 is a timing chart illustrating operations of the second operation example of the drive apparatus 340A according to the fourth embodiment of the present invention. The second operation example will be explained in the case of the moving image mode being selected, in chronological order for the behavior in the case of the position of the subject moving in the +direction of the lens position, and from midway, moving in one direction.

In the present embodiment, in the case of the moving image mode being selected, the drive frequency is set to f0 (maximum frequency), and the drive voltage is set to V0 (minimum voltage).

At t0, the drive apparatus 340A sets the phase difference of the two drive signals to +90°, and turns the drive signal ON.

At t1, the drive apparatus 340A causes the drive voltages of the two drive signals to increase.

At t2, the drive apparatus 340A sets the drive voltages of the two drive signals to $V_1$.

At t3, the drive apparatus 340A starts sweeping of the drive frequency from the maximum frequency f0.

At t4' immediately after t4, the drive apparatus 340A starts driving of the vibration-wave motor 310 in the middle of the drive frequency being swept, and then sets the drive frequency to frequency f1.

In the case of the moving image mode, the wobbling operation to cause the AF lens to move back and forth in small motions is performed. In the case of the present embodiment, the interval of 20 Hz is established.

At t4 to t5, the drive apparatus 340A sets the phase difference of the two drive signals to +90° to cause to rotate as positive rotation, and make the speed V.

At t5 to t6, the drive apparatus 340A sets the phase difference of the two drive signals to 0°, and detects the contrast at position Wbe.

At t6 to t7, the drive apparatus 340A sets the phase difference of the two drive signals to −90° to reverse rotationally drive at the frequency f2, and make the speed −2V (twice V). In proportion to increasing speed, the frequency is set to f2, which is smaller than f1.

The reason for setting the speed during reverse rotation in the wobbling operation to twice the positive rotation is that the movement amount of the lens position is twice.

At t7 to t8, the drive apparatus 340A sets the phase difference of the two drive signals to 0°, and detects the contrast at position Waf.

At t8 to t9, the drive apparatus 340A sets the phase difference of the two drive signals to +90° to positive rotationally drive at the frequency f1, and makes the speed V.

At t9 to t10, the drive apparatus 340A sets the phase difference of the two drive signals to 0°, and detects the contrast at position W0.

Wobbling operation is performed by repetition hereinafter. One cycle of the wobbling operation (for example, between t4 and t10) is an interval of 20 Hz (=approx. 50 msec)

Between t9 and t10, the position of the subject is calculated from the detection results of contrast at position Wbe, position Waf and position W0 to decide the next wobbling operation.

The deciding parameters are the frequency fs between t10 and t11, the frequency fb between t12 and t13, and the frequency fs2 between t14 to t15.

For example, in the results of contrast detection in one cycle of the wobbling operation between t4 and t10, in the case of being determined that the subject is between the wobbling amplitude (+1 to −1), in one cycle of the subsequent wobbling operation, the wobbling amplitude is set as +1 to −1 and defines frequency fs=f1, frequency fb=f2 and frequency fs2=f1.

It should be noted that the subject detection results in FIG. 30 are configured so as to indicate better contrast with a larger value (good contrast=in focus=defined as 1, and indicating a smaller numerical value as going more out of focus).

In addition, in the case of the subject moving to the + direction of the lens, for example, in the case of being determined that the subject is in the + direction from the current lens position as a result of contrast detection in one cycle of the wobbling operation between t10 and t16, one cycle of the subsequent wobbling operation defines the speed at t16 to t17 as 3V, and performs movement of the lens at three times the wobbling amplitude. In this case, it defines frequency fs=f3 (frequency even smaller than f2), frequency fb=f2, and frequency fs2=f1.

Next, in the case of the subject moving from the + direction to the − direction, if determined that the subject is greatly in the − direction from the current lens position as a result of contrast detection in one cycle of the wobbling operation between t22 and t27, one cycle of the subsequent wobbling operation performs movement of the lens at four times the wobbling amplitude, with the speed 4V between t30 and t31. In this case, it defines frequency fs=f1, frequency fb=f4 (frequency even smaller than f3), and frequency fs2=f1.

Basically, it is the same as the explanation for the logic and the flowchart illustrated in FIG. 28 and FIG. 29, as in the aforementioned first operation example. In other words, in the wobbling operation during moving image photography, the subject position is estimated by detecting the contrast at three places of the lens position, and the frequencies fs and fb are calculated according to this information. Then, by switching the phase difference between the A-phase and B-phase in three stages (approx. 90°, 0°, −90°) and setting the three drive frequencies of frequencies fs, fb and fs2, it is possible to handle both a case of the subject moving in the + direction of the lens midway, and a case of moving in the − direction.

In addition, in the case of being determined that the subject is greatly shifting from the current position, focusing on the subject is made possible by inserting suitable values for the frequencies fs and fb (by setting to frequency values far smaller than f4 in FIG. 28 or FIG. 30)

The following effects are possessed by the present embodiment above.

(1) In a case of the photography setting unit 347 having selected the moving image photography mode, the phase difference of the two drive signals is switched, as well as the frequency of the two drive signals being switched to correspond to the switched phase difference, while maintaining the voltages of the two drive signals to be constant, whereby the speed of the vibration-wave motor 310 can be changed. It is thereby possible to decrease the operating noise of the vibration-wave motor 310 during moving image photography, without performing complicated drive control.

(2) Based on the contrast of a predetermined one cycle in the wobbling operation, it is configured so as to switch the frequencies of the two drive signals in the subsequent one cycle to a predetermined one cycle so as to make the focal position of the third lens unit L3 for AF to follow the subject. The vibration-wave motor 310 can thereby cause the third lens unit L3 for AF to move by following the movement of the subject, and can decrease the operating noise upon causing the vibration-wave motor 310 to drive by way of the wobbling operation.

Fifth Embodiment

Next, a fifth embodiment of the present invention will be explained. The fifth embodiment has similarly configurations for the lens barrel and drive apparatus 340A as the aforementioned embodiment; therefore, explanations thereof will be omitted. In addition, operations of the drive apparatus 340A during moving image photography are also similar to the fourth embodiment. The point by which the fifth embodiment differs from the fourth embodiment is mainly the configuration of a vibration-wave motor 350.

Figure 31:
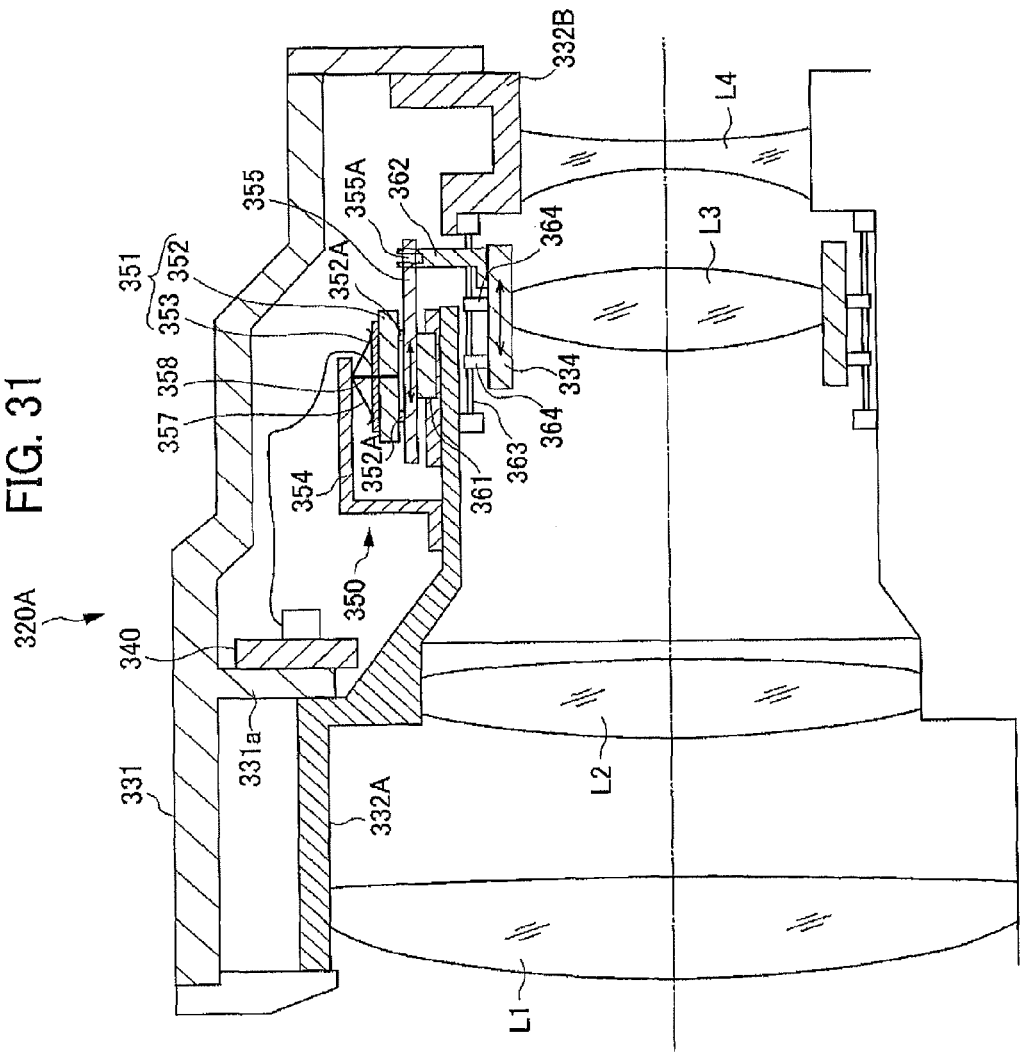
FIG. 31 is a view illustrating a lens barrel according to a fifth embodiment of the present invention.
Figure 32:
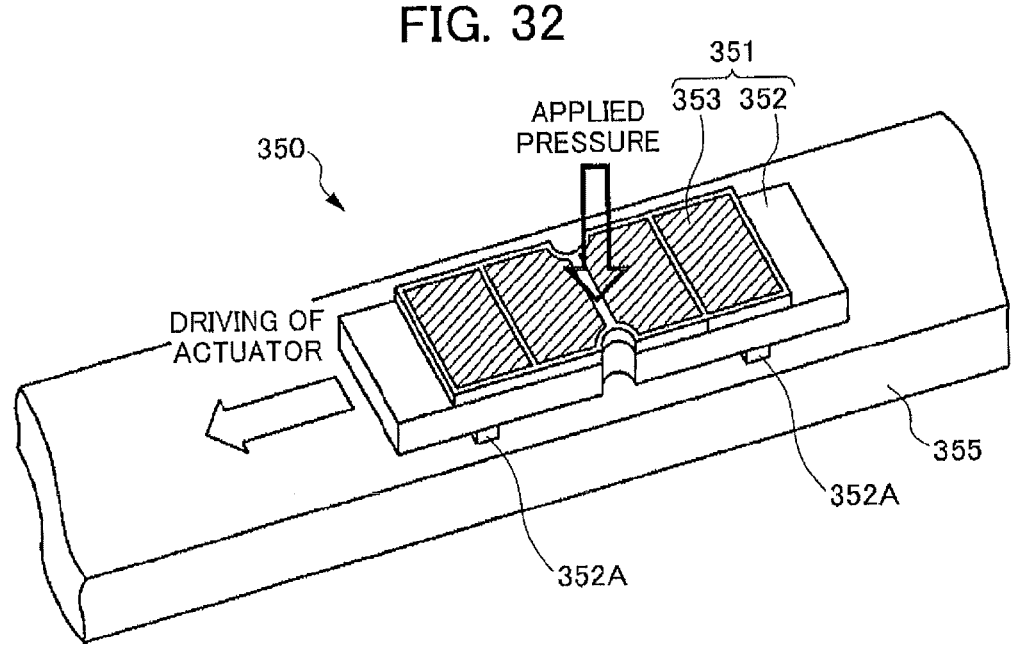
FIG. 32 is a view illustrating a vibration-wave motor according to the fifth embodiment.
Figure 33:
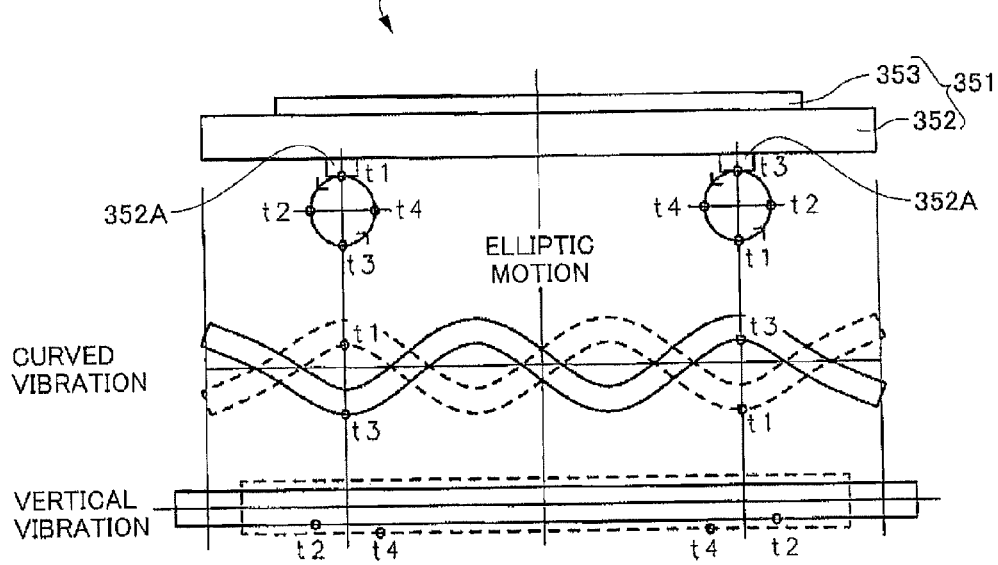
FIG. 33 is a view illustrating the operating principle of the vibration-wave motor according to the fifth embodiment.

The configuration of a lens barrel 320A according to the fifth embodiment will be explained next. FIG. 31 is a view illustrating the lens barrel 320A according to the fifth embodiment of the present invention. FIG. 32 is a view illustrating the vibration-wave motor 350 according to the fifth embodiment. FIG. 33 is a view illustrating the operating principle of the vibration-wave motor 350 according to the fifth embodiment.

As shown in FIG. 31, the lens barrel 320A includes an outer fixed cylinder 331 that covers the outer circumferential part of the lens barrel 320A, an inner first fixed cylinder 332A that is positioned more to the inner circumferential side on the subject side than the outer fixed cylinder 331, an inner second fixed cylinder 332B that is positioned on an image side more to the inner circumferential side than the outer fixed cylinder 331, and further includes the vibration-wave motor 350 between the outer fixed cylinder 331 and the inner first fixed cylinder 332A.

The first lens unit L1 and second lens unit L2 are fixed from the subject side to the inner first fixed cylinder 332A. In addition, the fourth lens unit L is fixed to the inner second fixed cylinder 332B. The third lens unit L3, which is the AF lens supported by the AF ring 334, is arranged between the second lens unit L2 and fourth lens unit L4.

As shown in FIG. 31, the vibration-wave motor 350 includes a vibrator 351, moving element 355, pressurizing member 357, etc., and assumes a form that drives by moving the moving element 355.

The vibrator 351 is pivotally supported in the longitudinal direction of the vibrator 351 by a support pin 358 provided to a fixed member 354, and is configured so there is a degree of freedom in pressurizing direction.

The pressurizing member 357 is provided between the fixed member 354 and vibrator 351, and makes the vibrator 351 pressurized contact the moving element 355.

The fixed member 354 is attached to the inner first fixed cylinder 332A. By attaching the fixed member 354 to the inner first fixed cylinder 332A, it comes to be possible to configure from the moving element 355, vibrator 351 to the pressurizing member 357 as one motor unit.

The moving element 355 consists of a light metal such as aluminum, and a sliding plating for an abrasion resistance improvement is provided to the surface of the sliding face. In addition, the moving element 355 is fixed to a linear guide 361, and the linear guide 361 is pivotally supported to the inner first fixed cylinder 332A, whereby the moving element 355 is able to move in a linear direction relative to the inner first fixed cylinder 332A.

A fork 362 connected to the AF ring 334 fits to an end part 355A of the moving element 355, and the AF ring 334 is driven straight ahead by the driving of the moving element 355.

The AF ring 334 assumes a mobile structure along a linear rail 363 provided to the inner first fixed cylinder 332A and inner second fixed cylinder 332B. A guide part 364 provided to the AF ring 334 fits to the linear rail 363, and accompanying the straight ahead driving of the moving element 355, is driven in the straight ahead direction on the optical axis direction, and is configured so as to be able to stop at the desired position.

The vibrator 351 is configured from the piezoelectric body 353, the elastic body 352 made of metal, and a projecting part 352A for output extraction, as shown in FIG. 32 and FIG. 33. The design of the elastic body 352 makes so that the resonance frequencies of a vertical first-order vibration and a curved fourth-order vibration match. When the voltage of this frequency (drive signal) is applied to the piezoelectric body 353 and the phases of both vibrations are shifted 90°, an elliptic motion is produced from the combination of the vertical vibration and curved vibration excited at the projecting part 352A, as shown in FIG. 33. Since the projecting part 352A is under pressurized contact to the moving element 355, a drive force is produced from friction. A wear-resistance material is used on the projecting part 352A, and suppresses the abrasion from friction.

The piezoelectric body 353 is generally configured from a material like lead zirconate titanate, which is called by the abbreviation PZT; however, due to environmental problems in recent years, it may also be configured from potassium sodium niobate, potassium niobate, sodium niobate, barium titanate, bismuth sodium titanate, bismuth potassium titanate, etc., which are lead-free materials.

In the fifth embodiment, the vibration-wave motor 350 is a linear-type vibration-wave motor. However, speed control is possible by controlling the frequency, voltage and phase difference of the two drive signals in the vibration-wave motor 350 according to the fifth embodiment; therefore, the same effects as the aforementioned fourth embodiment can be obtained.

In addition, as in the case of equipping the ring-type ultrasonic-wave motor according to the fourth embodiment, the conversion efficiency rises in the fifth embodiment due to there no longer being loss occurring when converting from rotational motion to linear motion. For this reason, the efficiency as a drive system overall can be raised.

Sixth Embodiment

Figure 34:
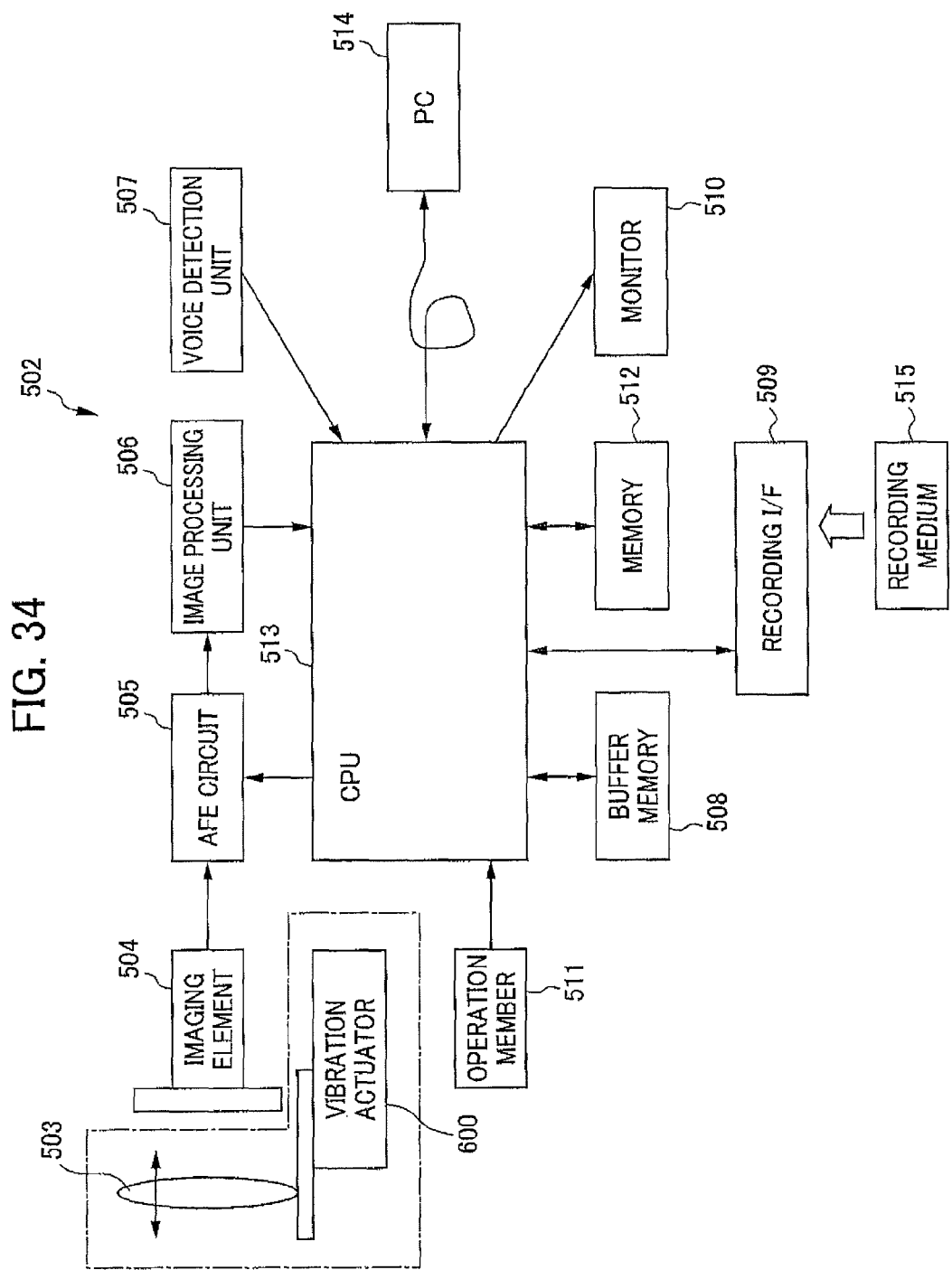
FIG. 34 is a view illustrating a camera including a lens barrel equipped with a vibration actuator driven by a drive apparatus according to a sixth embodiment.

FIG. 34 is a view illustrating a camera 502 including a lens barrel 501 equipped with a vibration actuator 600 driven by a drive apparatus according to a sixth embodiment of the present invention.

The lens barrel 501 of the present embodiment is detachable relative to the main body of the camera 502; however, it is not limited thereto, and maybe be an undetachable one.

The camera 502 of the present embodiment includes an imaging optical system (lens) 503 inside of the lens barrel 501.

In addition, the inside of the main body of the camera 502 is configured from an imaging element 504, an AFE (Analog Front End) circuit 505, an image processing unit 506, a voice detection unit 507, buffer memory 508, a recording interface 509, a monitor 510, an operation member 511, memory 512 and a CPU 513, and is connectable with a PC 514 of an external device.

The imaging optical system 503 is configured from a plurality of optical lenses, and causes an subject image to focus on a light receiving surface of the imaging element 504. FIG. 34 illustrates the optical lens system with reference number 503 by simplifying as a single lens.

In addition, in the optical lens unit, the optical lens for AF is driven by the driving of the vibration actuator 600.

The exposure time (shutter speed) to the imaging element 504 is decided according to the operation member 511 and the conditions of the image.

The imaging element 504 is configured by a CMOS image sensor and the like in which light-receiving elements are aligned in two-dimensions on the light receiving surface. The imaging element 504 generates an analog image signal by photoelectrically converting the subject image from the beam having passed through the imaging optical system 503. The analog image signal is input to the AFE circuit 505.

The AFE circuit 505 performs gain adjustment (signal amplification according to ISO sensitivity) on the analog image signal. More specifically, the imaging sensitivity is changed within a predetermined range according to the sensitivity setting instruction from the CPU 513. The AFE circuit 505 further converts the image signal after analog processing by a built-in A/D conversion circuit into digital data. This digital data is input to the image processing unit 506.

The image processing unit 506 performs various image processing on the digital image data.

The memory 512 temporarily records image data in pre-process or post-process of the image processing according to the image processing unit 506.

The voice detection unit 507 is configured from a microphone and a signal amplifier 605, mainly detects and captures a voice from the subject direction during moving image photography, and transmits this data to the CPU 513.

The recording interface 509 has a connector that is not illustrated, a recording medium 515 is connected to this connector, and performs the writing of data to the connected recording medium 515 or reading of data from the recording medium.

The monitor 510 is configured by a liquid crystal panel, and displays images, an operation menu, etc. according to an instruction from the CPU 513.

The operation member 511 indicates mode dials, the arrow keys, a select button and a release button, and sends an operation signal according to respective operations to the CPU 513. The setting of still image photography and moving image photograph is set by way of the operation member 511.

The CPU 513 unifyingly controls actions performed by the camera 502 by executing a program stored in the ROM that is not illustrated. For example, AF (autofocus) operation control, AE (automatic exposure) operation control, and auto white balance control, etc. are performed.

The memory 512 records a sequence of image data subjected to image processing. The present invention captures images corresponding to a moving image in the camera 502 of such a configuration.

Figure 35:
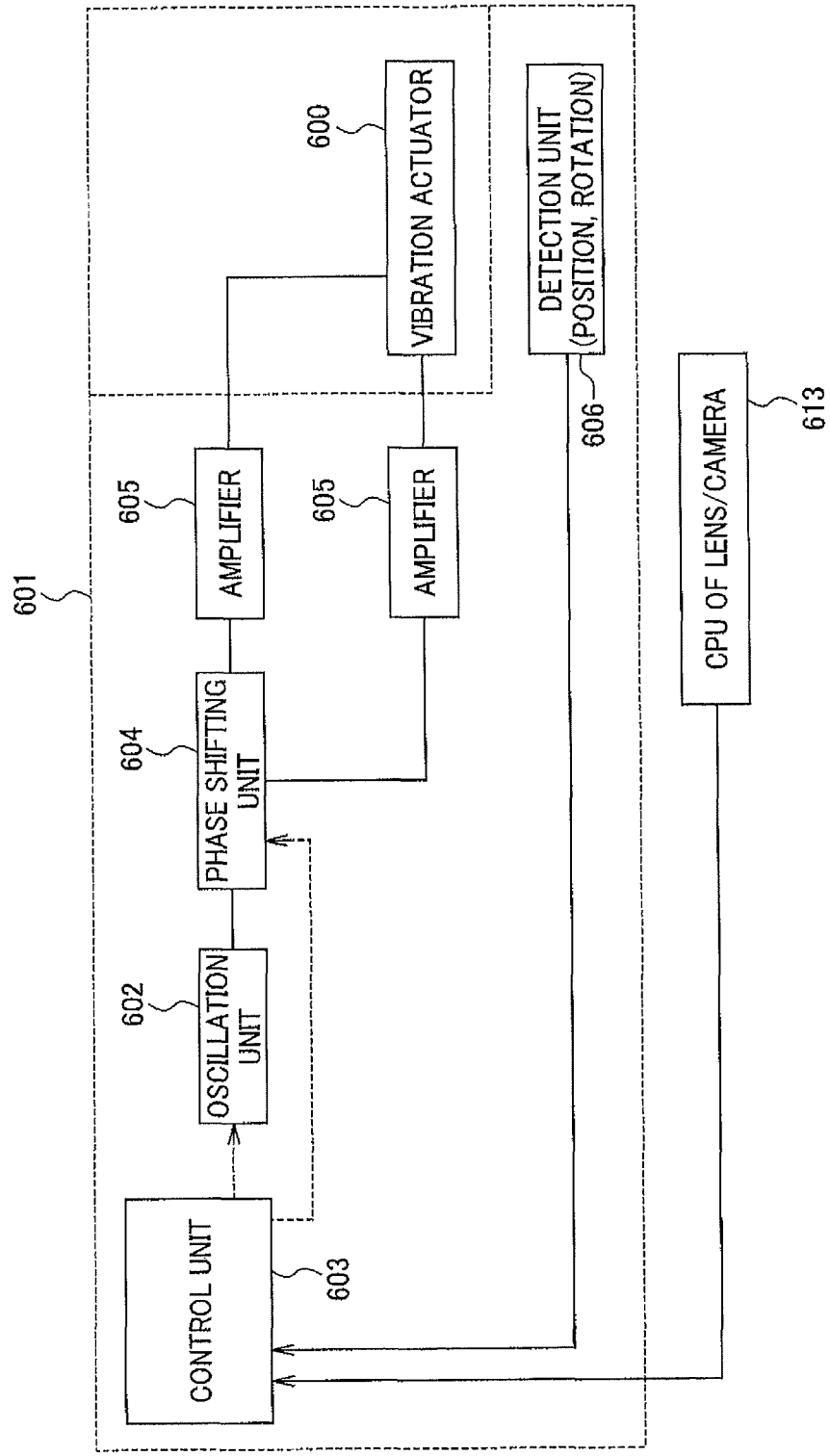
FIG. 35 is a block diagram illustrating a vibration actuator and a drive apparatus of a vibration-wave actuator according to the sixth embodiment.

FIG. 35 is a block diagram illustrating the vibration actuator 600 and a drive apparatus 601 of the vibration-wave actuator according to the sixth embodiment. The drive apparatus 601 includes an oscillation part 602, phase shifting unit 604, amplifier, detection unit 606 and control unit 603 that controls these.

The oscillation part 602 generates a drive signal of a desired frequency according to the command of the control unit 603.

The phase shifting unit 604 divides the drive signal generated by the oscillation part 602 into two drive signals of different phases desired according to the command of the control unit 603.

The amplifier 605 boosts the two drive signals divided by the phase shifting unit 604 to desired voltages, respectively. The drive signal from the amplifier 605 is transmitted to the vibration actuator 600, and by way of the application of this drive signal, a progressive wave generates at the vibrator 520 described later of the vibration actuator 600, whereby the moving element 528 is driven.

The rotation detection unit 606 is configured from an optical encoder, magnetic encoder, or the like, detects the position and/or speed of a driven object driven by the driving of the moving element 528, and transmits the detection value to the control unit 603 as an electrical signal.

The control unit 603 controls the driving of the vibration actuator 600 and the movement of the vibration-wave actuator based on the drive command from the CPU 513 inside the lens barrel 501 or the camera main body. The control unit 603 receives the detection signal from the rotation detection unit 606, obtains positional information and speed information based on this value, and controls the frequency of the oscillation part 602 of the vibration actuator 600, phase difference, etc., so as to position at the target position.

Figure 36:
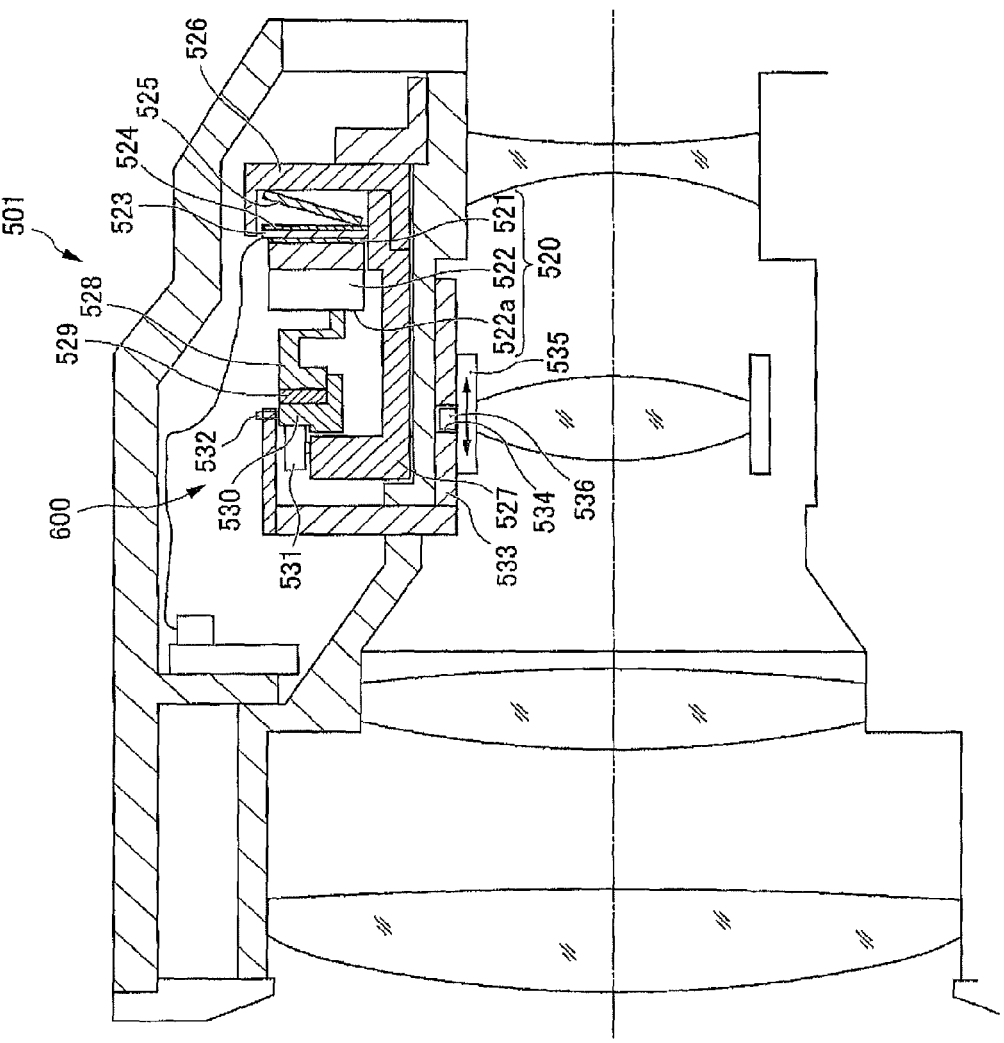
FIG. 36 is a view illustrating the lens barrel equipped with the vibration actuator driven by the drive apparatus according to the sixth embodiment.

FIG. 36 is a view illustrating the lens barrel 501 equipped with the vibration actuator 600 driven by the drive apparatus according to the sixth embodiment of the present invention, and is a view of a state in which a ring-shaped vibration actuator 600 is incorporated into the lens barrel 501.

The vibrator 520 is configured from an electro-mechanical energy conversion element 521 exemplified as a piezoelectric element or electrorestrictive element that converts electrical energy to mechanical energy (hereinafter referred to as piezoelectric body), and an elastic body 522 joined with the piezoelectric body 521. A 9-peak progressive wave is generated at the vibrator 520 as one example in the present embodiment.

The elastic body 522 consists of a metal material having a large resonance sharpness, and the shape thereof is an annular shape A groove is cut into the opposing face of the elastic body 522 to which the piezoelectric body 521 is joined, and the tip end face of the projecting portions (parts without grooves) are the driving face 522a and are under pressurized contact with the moving element 528. The reason for cutting the grooves is to bring the neutral plane of the progressive wave as near as possible to the piezoelectric body 521 side, thereby making the amplitude of the progressive wave at the driving face 522a amplified.

The piezoelectric body 521 is divided into the two phases (A-phase, B-phase) along the circumferential direction, and in each phase, elements for which the poles are alternating every ½ wavelength are aligned, and a ¼ wavelength interval is open between the A-phase and B-phase.

Below the piezoelectric body 521, a non-woven fabric 523, pressure plate 524 and pressurizing member 525 are arranged.

The non-woven fabric 523 is felt, for example, is arranged below the piezoelectric body 521, and makes so that vibration of the vibrator 520 does not convey to the pressure plate 524 or pressurizing member 525.

The pressure plate 524 is made so as to receive the pressure of the pressurizing member 525.

The pressurizing member 525 is arranged below the pressure plate 524, and causes an applied pressure to generate.

In the present embodiment, although the pressurizing member 525 is a disk spring, it does not need to be a disk spring, and may be a coil spring or a wave spring.

The pressurizing member 525 is retained by a pressing ring 526, and the pressing ring 526 is fixed to a fixed member 527.

The moving element 528 consists of a light metal such as aluminum, and a sliding material for abrasion resistance improvement is provided on the surface of sliding face.

In order to absorb vibrations in the longitudinal direction of the moving element 528, a vibration absorbing member 529 like rubber is arranged on the moving element 528, and thereon, an output transfer member 530 is arranged.

With the output transfer member 530, the pressurizing direction and radial direction are defined by way of a bearing 531 provided to the fixed member 527, whereby the pressurizing direction and radial direction of the moving element 528 are defined.

The output transfer member 530 has a projecting part 532 and, therefrom, a fork connecting to a cam ring 533 fits, whereby the cam ring 336 is rotated along with the rotation of the output transfer member 530.

In the cam ring 533, a key groove 534 is cut obliquely in the cam ring 533, and a fixed pin 536 provided to the AF ring 535 fits together with the key groove 534.

Then, by the cam ring 533 rotationally driving, the AF ring 535 is driven in the straight ahead direction on the optical axis direction, and is made so as to be able to stop at the desired position.

The fixed member 527, the pressing ring 526 is attached by a spring to the fixed member 314, and by the fixed member 527 attaching this, it is possible to configure from the output transfer member 530, moving element 528, vibrator 520 until the pressurizing member 525 as one motor unit.

The phase shifting unit 604 of FIG. 35 separates the drive signal generated by the oscillation part 602 into drive signals of the A-phase and B-phase having different phases from each other. These drive signals of the A-phase and B-phase are applied at the respective electrodes of the piezoelectric body 521.

In the case of the phase difference existing between the drive signals of the A-phase and B-phase, a wave generating at the driving face 522a of the elastic body 522 by way of the vibration excited by the piezoelectric body 521 is a progressive wave, causing the moving body 528 to rotate.

Figure 37:
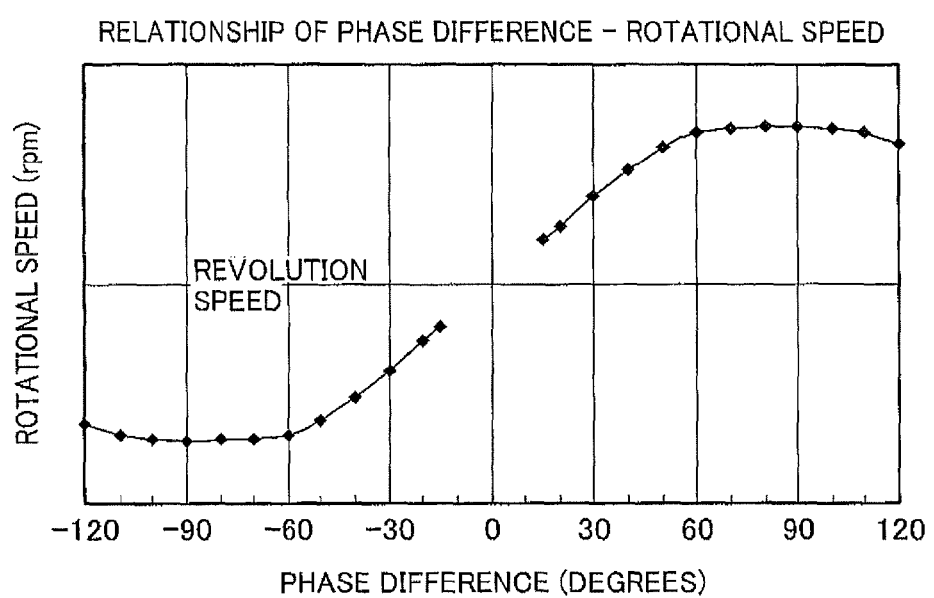
FIG. 37 is a graph showing the relationship between the phase difference between the A-phase and B-phase and the rotational speed of a moving element.

FIG. 37 is a graph showing the relationship between the phase difference of the A-phase and B-phase and the rotational speed of the moving element 528.

As illustrated, when the phase difference of the A-phase and B-phase is +/−90°, the rotational speed of the moving element 528 becomes the fastest. Then, when the phase differences approaches 0 (or 180°), the wave generating at the driving face 522a becomes a standing wave rather than a progressive wave, and the rotation of the moving element 528 stops.

Figure 38:
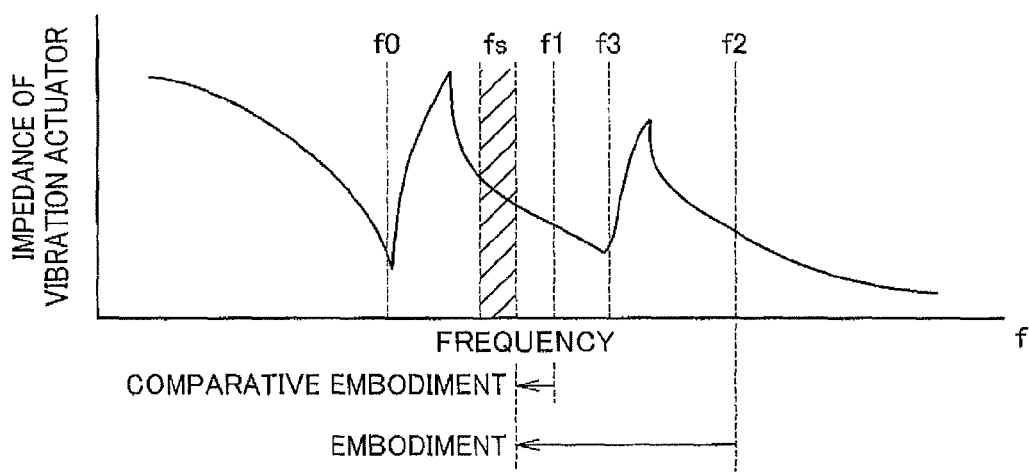
FIG. 38 is a graph showing the relationship between the frequency of the drive signal and the impedance of the vibration actuator.

FIG. 38 is a graph showing the relationship between the frequency of the drive signal and the impedance of the vibration actuator 600. The portion shown by fs in the graph is the drive frequency used upon driving the lens.

During driving of the vibration actuator 600, since it is preferable to start the vibration actuator 600 from low speed, it is common for the frequency of the drive signal applied to the piezoelectric body 521 to start from a higher frequency than the drive frequency (hereinafter referred to as startup frequency), and gradually lower to the drive frequency.

For ease of explanation of this startup frequency, first, a comparative embodiment relative to the present embodiment will be explained. In the comparative embodiment, upon driving the vibration actuator 600, the phase difference of the drive signals of the A-phase and B-phase applied to the piezoelectric body 521 is fixed at 90°, for example.

In this case, the startup frequency starts from a frequency f1 between the drive frequency fs and a resonance frequency f3 of the next high-order vibration mode than the vibration mode (drive mode) in which this drive frequency fs is included, and gradually lowers to the drive frequency fs.

The reason for a higher frequency than the resonance frequency f3 of the next high-order vibration mode than the vibration mode not using f1 in this way is because control of the operation is difficult by the impedance of the vibration actuator 600 increasing upon the frequency of the drive signal exceeding the resonance frequency f3.

However, in the case of this comparative embodiment, the A-phase and B-phase of the startup frequency f1 with the phase difference of 90° are applied to the piezoelectric body 521, simultaneously with the power source turning ON. The startup frequency f1 cannot be set to a sufficiently high frequency due to being smaller than f3, and the vibrator 520 of the vibration actuator 600 suddenly starts a large vibration, and there is a possibility of an outbreak sound generating.

Therefore, in the present embodiment, the electricity application to the piezoelectric body 521 starts from the frequency f2, exceeding the resonance frequency f3 of the next higher-order vibration mode than the drive vibration mode.

The resonance frequency f3 must be exceeded upon lowering the frequency down to the drive frequency fs also in the present embodiment.

Upon exceeding the resonance frequency f3, if the moving element 528 drives, there is a possibility of the movement of the vibration actuator 600 becoming unstable as mentioned above.

Therefore, in the present embodiment, the phase difference between the A-phase and B-phase is set to 0 or 180° until arriving at the drive frequency. However, 0° and 180° are not strict values and, for example, it is a permissible range up to on the order of +/−5°, so long as a range in which the moving element 528 will not rotate.

Then, when the vibration frequency arrives at the drive frequency fs, the phase difference between the A-phase and B-phase is set to about 90°. When the phase difference becomes 90°, the moving element 528 starts rotation, and lens driving by way of the vibration actuator 600 becomes possible.

According to the present embodiment, since not a progressive wave, but rather a standing wave is produced at the driving face 522a of the vibrator 520 until the vibration frequency arrives at the drive frequency fs, torque is not transmitted to the moving element 528. Therefore, since the vibration actuator 600 is stopped, it does not bring about a malfunction in operation. On the other hand, vibration of the vibrator 520 is started from a small vibration; therefore, there is a low possibility of outbreak sound.

Figure 39:
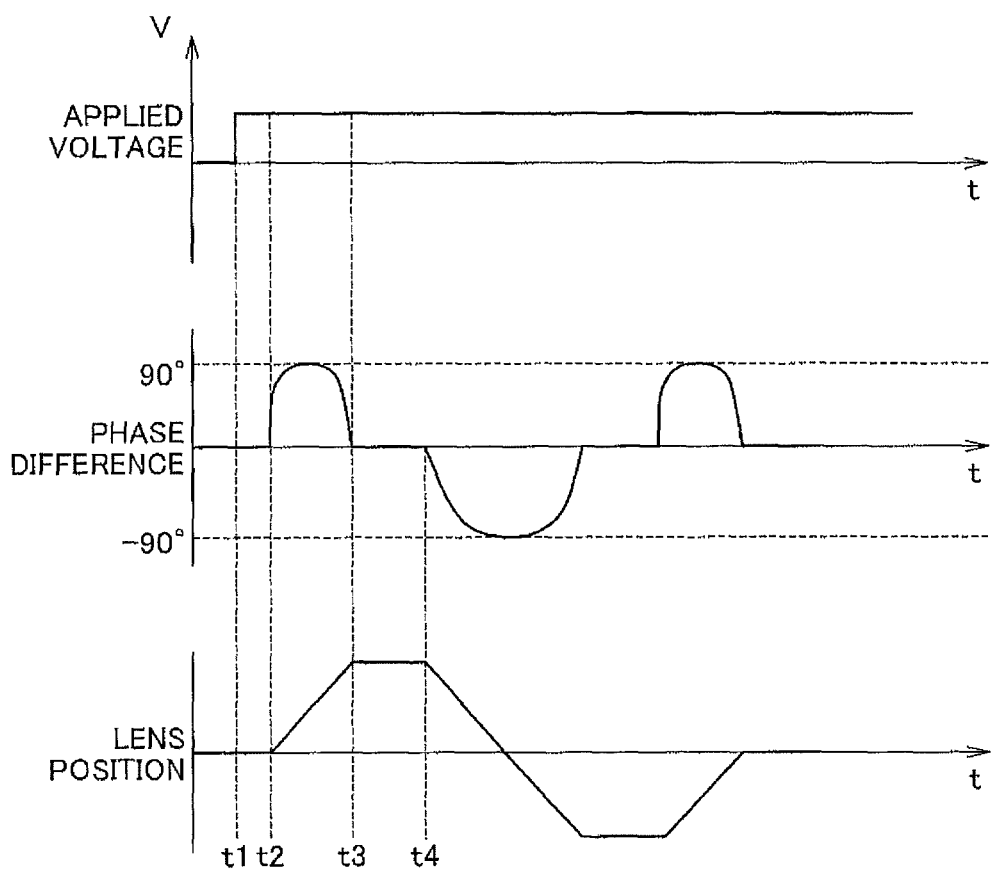
FIG. 39 is a graph showing an example of lens driving by the vibration actuator according to the sixth embodiment.

FIG. 39 is a graph showing an example of lens driving by the vibration actuator 600 according to the sixth embodiment.

First, at the time t1 at which voltage supply to the vibration actuator 600 is started, since the phase difference is 0, the lens remains stopped. Therefore, outbreak sound does not generate by the lens suddenly starting driving.

Then, at t2 at which the frequency of the drive signal is made to decrease, and exceeds the resonance frequency f3 to reach the drive frequency fs, a phase difference between the A-phase and B-phase is produced. In the present embodiment, it is about 90°. It should be noted that, although 90° has good efficiency, it is not limited thereto.

Then, the phase difference is set to about 0° at the time t3 at which the lens 503 arrives at the desired position. The lens 503 thereby stops.

A phase difference between the A-phase and B-phase is produced again at the time t4 at which the necessity for driving of the lens 503 arises again. On this occasion, in a case of causing the lens 503 to drive in the reverse direction to the movement from time t2 to t3, the phase difference is set to −90°.

The following effects are possessed according to the present embodiment above.

(1) Conventionally, upon startup of the vibration actuator 600, the power source voltage is slowly input, and starts up at a slightly higher frequency than the drive frequency. However, the outbreak sound upon turning ON the power source is still present with this. During moving image photography, etc., outbreak sound generates every time turning ON the actuator. In addition, even with suppressing abnormal noise generation, the frequency upon startup only widens until before the resonance point of the next mode.

However, with the present invention, the frequency upon startup widens until the next drive mode, and by starting up from a state in which the vibration is sufficiently small, the generation of outbreak sound upon startup is decreased.

(2) By setting the phase difference of drive signals upon turning the power source ON to 0 or 180°, even if the vibrator 520 starts vibration, there will not be an event of the moving element 528 starting to move, and thus a malfunction will not occur upon the vibration frequency of the drive signal exceeding the resonance frequency.

The present invention is not to be limited to the embodiments explained above, and various modifications and changes like those shown below are possible, and these also are within the scope of the present invention.

Modified Example 6

In the present embodiment, the lens barrel 501 is detachable relative to the main body of the camera 502; however, it is not limited thereto, and may be undetachable.

Modified Example 7

In addition, in the present embodiment, the vibration actuator 600 is explained with an example as ring type equipping the lens inside; however, it is not limited thereto, and may be miniature type that rotates about a different axis from the axis line of the retaining cylinder, outside of the lens retaining cylinder.

Seventh Embodiment

Hereinafter, a seventh embodiment of the present invention will be explained by referencing the drawings, etc.

Figure 40:
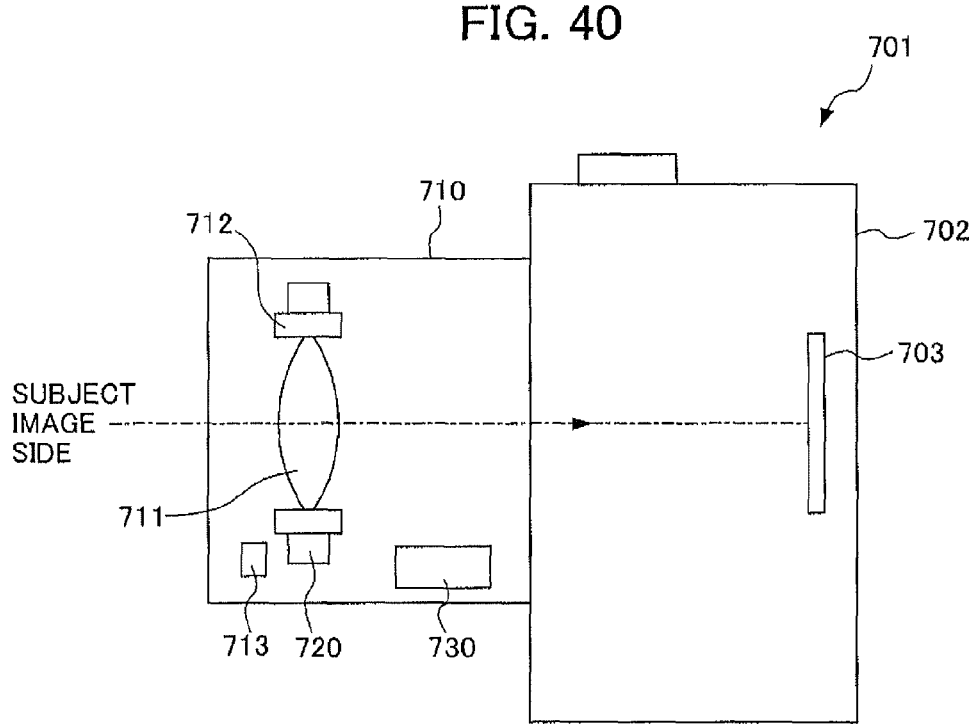
FIG. 40 is a schematic view illustrating the overall configuration of a camera 701 according to a seventh embodiment.

FIG. 40 is a schematic view illustrating the overall configuration of a camera 701 according to the seventh embodiment.

Figure 41:
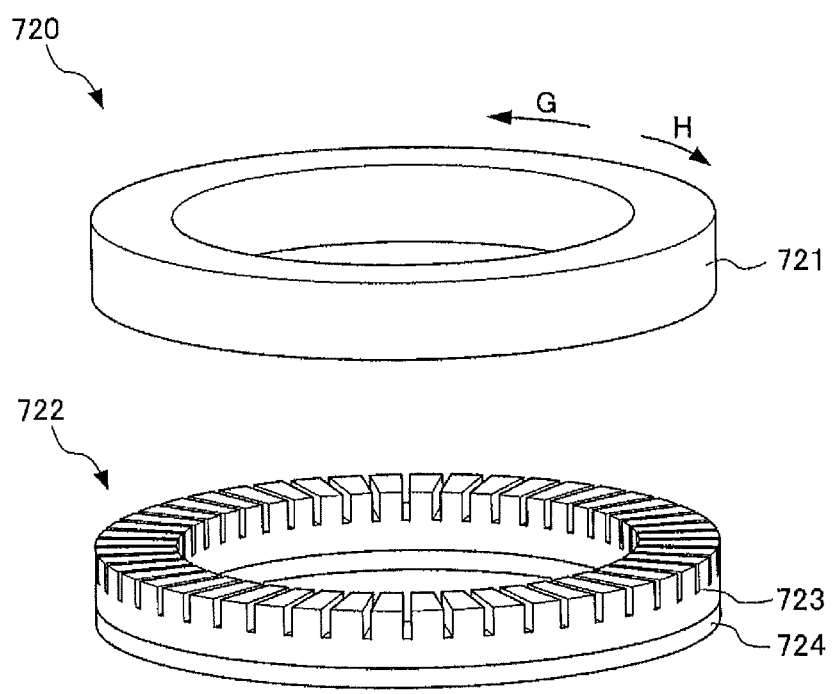
FIG. 41 is a diagram illustrating the configuration of an ultrasonic-wave motor 720 according to the seventh embodiment.

FIG. 41 is a diagram illustrating the configuration of an ultrasonic-wave motor 720 according to the seventh embodiment.

Figure 42:
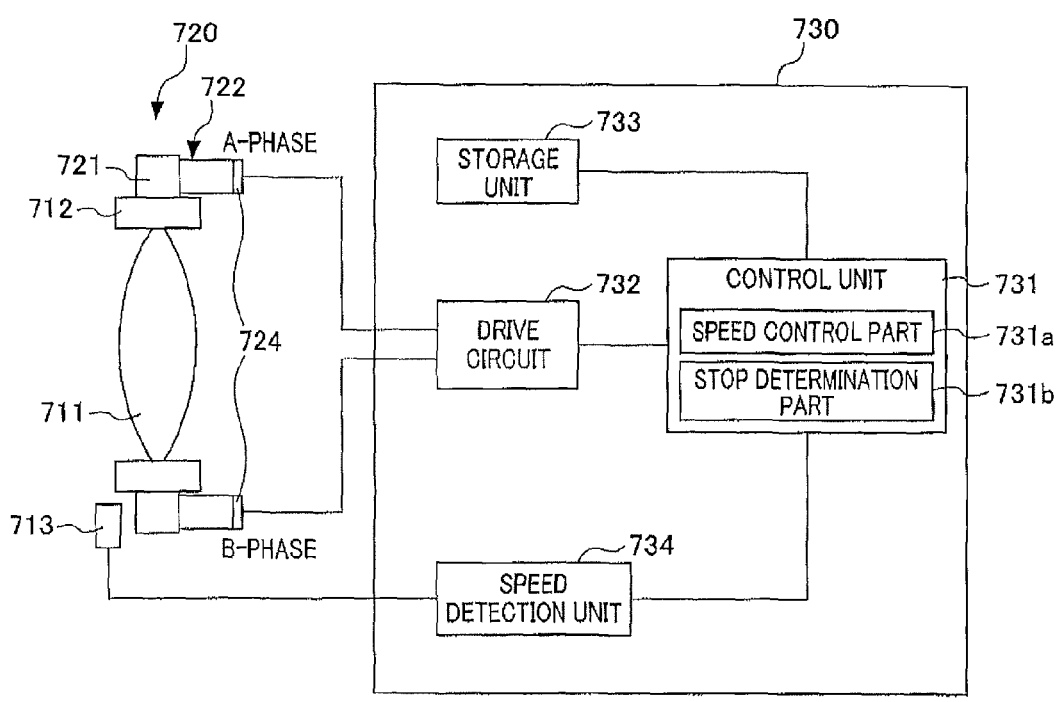
FIG. 42 is a diagram illustrating the configuration of a drive apparatus 330 connected to the ultrasonic-wave motor 720 of the seventh embodiment.

FIG. 42 is a diagram illustrating the configuration of a drive apparatus 730 connected to the ultrasonic-wave motor 720 according to the seventh embodiment.

It should be noted that, in FIG. 40, the front-back direction of the camera 701 is defined as the X direction, the left-right direction is defined as the Y direction, and the vertical direction is defined as the Z direction.

The camera 701 includes a camera housing 702 having an imaging element 703, and a lens barrel 710 as shown in FIG. 40, and is a digital camera that can not only photograph still images of a subject, but also moving images.

The lens barrel 710 is an interchangeable lens that is detachable from the camera housing 702. The lens barrel 710 includes a lens 711 (optical member), a cam cylinder 712, a position detection unit 713, an ultrasonic-wave motor 720 (vibration actuator), a drive apparatus 730 (drive apparatus of vibration actuator), etc. It should be noted that the lens barrel 710 may be established as an integral unit with the camera housing 702.

The lens 711 is supported by the cam cylinder 712, and is a focus lens that performs focal adjustment by moving in the optical axis direction (X direction) by way of the drive power of the ultrasonic-wave motor 720.

The cam cylinder 712 is connected with a rotational element 721 (described later) of the ultrasonic-wave motor 720, converting rotational motion of the ultrasonic-wave motor 720 into linear motion in the optical axis direction (X direction) to make the lens 711 mobile in the optical axis direction (X direction).

The position detection unit 713 is an encoder that detects the position of the lens 711, which moves in the optical axis direction (X direction).

The ultrasonic-wave motor 720 is an annular progressive wave-type ultrasonic-wave motor of rotational type, and is configured from an annular rotational element 721, and a vibrator 722 (vibrating body) that pressurized contacts the rotational element 721, as shown in FIG. 41.

The vibrator 722 is configured from an annular elastic body 723, and an annular piezoelectric element 724 (piezoelectric body) joined to this elastic body 723.

The elastic body 723 is an elastic member to which comb-teeth are provided to a face that pressurized contacts the rotational element 721.

The piezoelectric element 724 is joined to a face on the opposite side to the contact face with the rotational element 721 of the elastic body 723, and has electrode patterns A-phase and B-phase consisting of two phases. The electrode patterns A-phase and B-phase are polarized so that the polarity differs alternatingly for each in the circumferential direction.

The ultrasonic-wave motor 720 causes a progressive vibration wave to generate at the vibrator 722 by applying the two-phase alternating signal having respectively different phases to the electrode patterns A-phase and B-phase of the piezoelectric element 724, and the rotational element 721 under pressurized contact to the vibrator 722 is excited by this vibration wave, whereby a drive force to rotate in the circumferential direction (clockwise direction G, counter-clockwise direction H) is generated.

The drive apparatus 730 is a device that controls driving of the ultrasonic-wave motor 720, as shown in FIG. 42. The drive apparatus 730 includes a control unit 731, a drive circuit 732, a storage unit 733 (frequency storage unit), a speed detection unit 734, etc.

The control unit 731 is a control circuit that unifyingly controls each part of the drive apparatus 730, and is configured from a CPU, etc., for example. The control unit 731 realizes various functions according to the present invention in cooperation with the aforementioned hardware, by reading various programs stored in the storage unit 733 and executing as appropriate.

The control unit 731 is connected to the drive circuit 732, storage unit 733, speed detection unit 734, etc. The control unit 731 includes a speed control part 731$a$, a stop determination part 731$b$, etc.

The speed control part 731$a$ controls the drive operation of the ultrasonic-wave motor 720 and rotational speed n via the drive circuit 732. More specifically, the speed control part 731$a$ causes the phase difference p and drive frequency f of alternating signals input to the respective electrode patterns A-phase and B-phase of the piezoelectric element 724 of the ultrasonic-wave motor 720 to change so as to control the drive operation and rotational speed n of the ultrasonic-wave motor 720. Herein, drive operation refers to an operation of rotational motion (refer to FIG. 41) in the positive rotational direction G of the rotational element 721 of the ultrasonic-wave motor 720, rotational motion in the reverse rotational direction H (refer to FIG. 41), or stopping.

The stop determination part 731$b$ determines whether or not the ultrasonic-wave motor 720 has stopped, based on the state of the phase difference p of the two-phase alternating signals applied to the piezoelectric element 724, and information of the rotational speed n of the ultrasonic-wave motor 720 detected by the speed detection unit 734. More specifically, the stop determination part 731$b$ determines that the ultrasonic-wave motor 720 stopped when confirming that the phase difference of the alternating signals applied to the piezoelectric element 724 is p=0, and the rotational speed detected by the speed detection unit 734 is n=0.

The drive circuit 732 is connected to the electrodes of the respective electrode patterns A-phase and B-phase of the piezoelectric element 724, and is a circuit that generates alternating signals set to a predetermined phase difference p and predetermined drive frequency f, based on the drive signal input from the speed control part 731*a*.

The storage unit 733 is a storage device such as semiconductor memory device for storing programs, information, etc. required in the operation of the drive apparatus 730. In addition, the storage unit 733 stores information of the drive frequency of the alternating signals applied to the ultrasonic-wave motor 720 while stopped as a stop frequency fx (described later).

The speed detection unit 734 inputs information of a position W of the lens 711 detected from the position detection unit 713, and detects the rotational speed n of the rotational element 721 based on this information of position W.

The speed detection unit 734 outputs information of the detected rotational speed n to the control unit 731.

Next, the characteristics of the ultrasonic-wave motor 720 will be explained.

FIG. 43 provides graphs showing the characteristics of the ultrasonic-wave motor 720 according to the seventh embodiment.

Figure 43A:
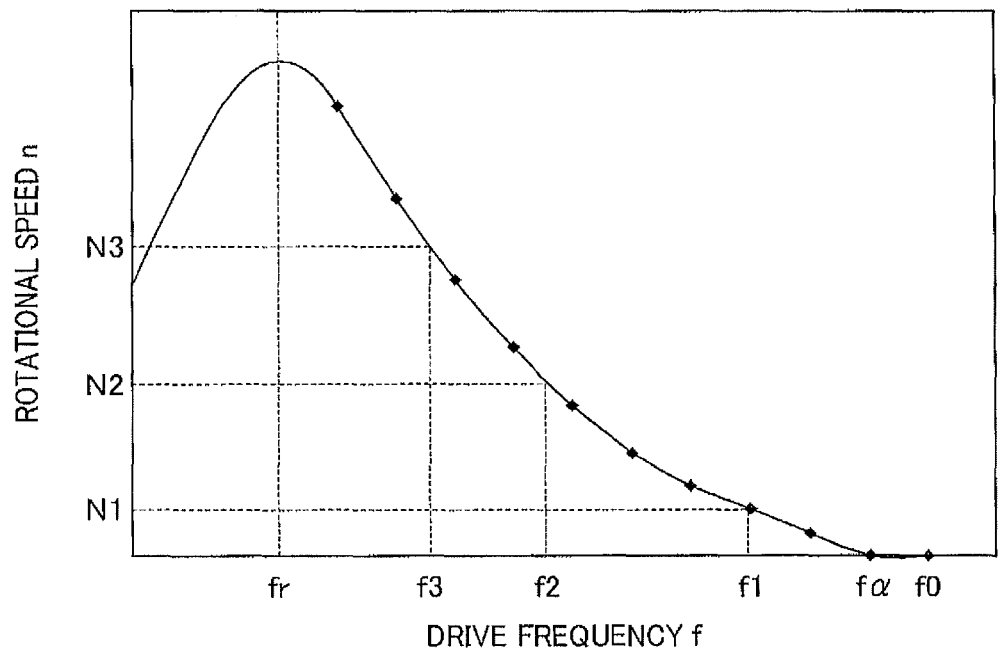
FIGS. 43A and 43B provide graphs showing the characteristics of the ultrasonic-wave motor 720 according to the seventh embodiment.
Figure 43B:
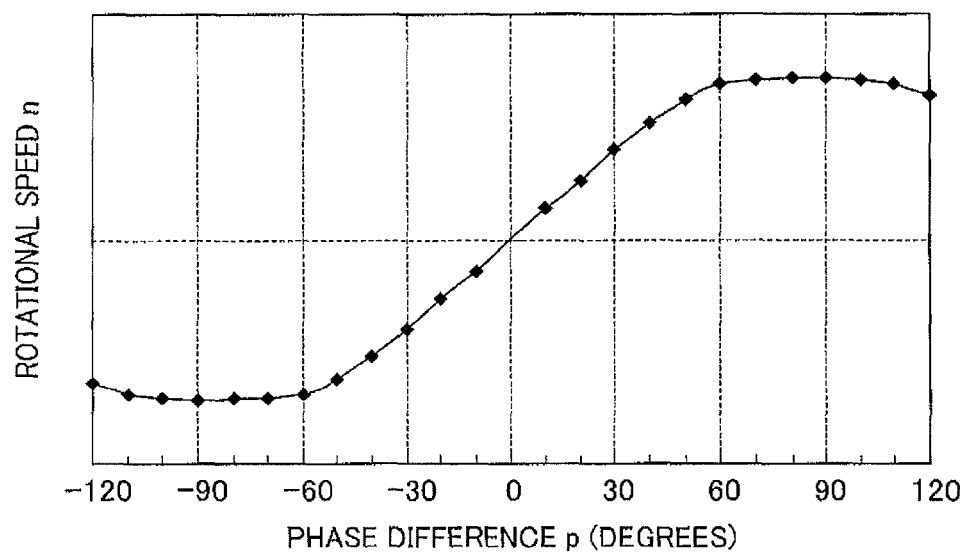

FIG. 43A is a graph showing the relationship between the drive frequency f of the alternating signals applied to the ultrasonic-wave motor 720 and the rotational speed n. FIG. 43B is a graph showing the relationship between the phase difference p of the alternating signals applied to the ultrasonic-wave motor 720 and the rotational speed n.

As shown in FIG. 43A, with the ultrasonic-wave motor 720, it is possible to change the rotational speed n thereof by changing the drive frequency f between fr and f0. More specifically, the ultrasonic-wave motor 720 has a characteristic of the rotational speed n rising when lowering the drive frequency f thereof from f0. For example, in the case of the drive frequency f=f1, the rotational speed becomes n=N1, and in the case of f=f2, then becomes n=N2 (f1>f2, N2>N1).

Herein, fr in FIG. 43A is the mechanical resonance frequency of the vibrator 722 of the ultrasonic-wave motor 720. In addition, f0 is a frequency at which the rotational element 721 of the ultrasonic-wave motor 720 in a state with no load starts to rotate from the stopped state. By taking into account the stability, etc. of control of the ultrasonic-wave motor 720, the relationships between the drive frequency f, fr, and f0 are generally desired to be fr<f<f0, and in the control of the ultrasonic-wave motor 720, uses the characteristic of decreasing to the right from fr in FIG. 43A.

In addition, based on the inductance L of the secondary winding of a transformer (not illustrated) provided to the drive circuit 732 of the drive apparatus 730 and the capacitance C of the piezoelectric element 724 of the vibrator 722, since making f0 match the electrical resonance frequency fc obtained from the formula below is desirable from the aspect of an electricity consumption reduction, f0=fc is established in the seventh embodiment.

$$fc=1/\{2\pi\sqrt{(LC)}\}$$

As stated above, f0 is the frequency at which the rotational element 721 of the ultrasonic-wave motor 720 in a state with no load starts rotation from the stopped state; whereas, fα in FIG. 43A is the frequency at which the rotational element 721 in a state in which the lens 711, cam cylinder 721, etc. are connected starts rotation from the stopped state. The rotational element 721 to which the lens 711, etc. are connected cannot begin rotation at the drive frequency f=f0 due to the weight of the lens 711, etc., the frictional resistance of the sliding part, etc., and begins rotation at the drive frequency f=fα.

The relationship between fα and f0 is f0>fα.

The stop frequency fx stored in the storage unit 733 is the drive frequency of the alternating signals applied to the ultrasonic-wave motor 720 while stopped as described above; therefore, in order to decrease the electricity consumption thereof, it is a frequency arbitrarily set between the aforementioned f0 and fα. In the seventh embodiment, the stop frequency fx is set to a frequency in the middle of f0 and fα, i.e. fx=(f0+fα)/2.

In addition, as shown in FIG. 43B, with the ultrasonic-wave motor 720, it is possible to cause the drive operation to change by the phase difference p of the alternating signals applied to the respective electrode patterns A-phase and B-phase of the piezoelectric element 724 being controlled. In the seventh embodiment, the ultrasonic-wave motor 720 rotates in the positive rotational direction G (refer to FIG. 41) when the phase difference of the alternating signals applied to the respective electrode pattern A-phase and B-phase is set to p=+90°, and rotates in the reverse rotational direction H when the phase difference is set to p=−90° (refer to FIG. 41). In addition, it stops when the phase difference is p=0°. At this time, the lens 711 moves to the subject side (X1 side) when the ultrasonic-wave motor 720 rotates in the positive rotational direction G, and moves to the imaging element 703 side (X2 side) when rotating in the reverse rotational direction H, as shown in FIG. 40.

Next, the driving of the ultrasonic-wave motor 720 and operation of the lens 711 moving by way of this driving will be explained with the wobbling operation as an example.

Figure 44:
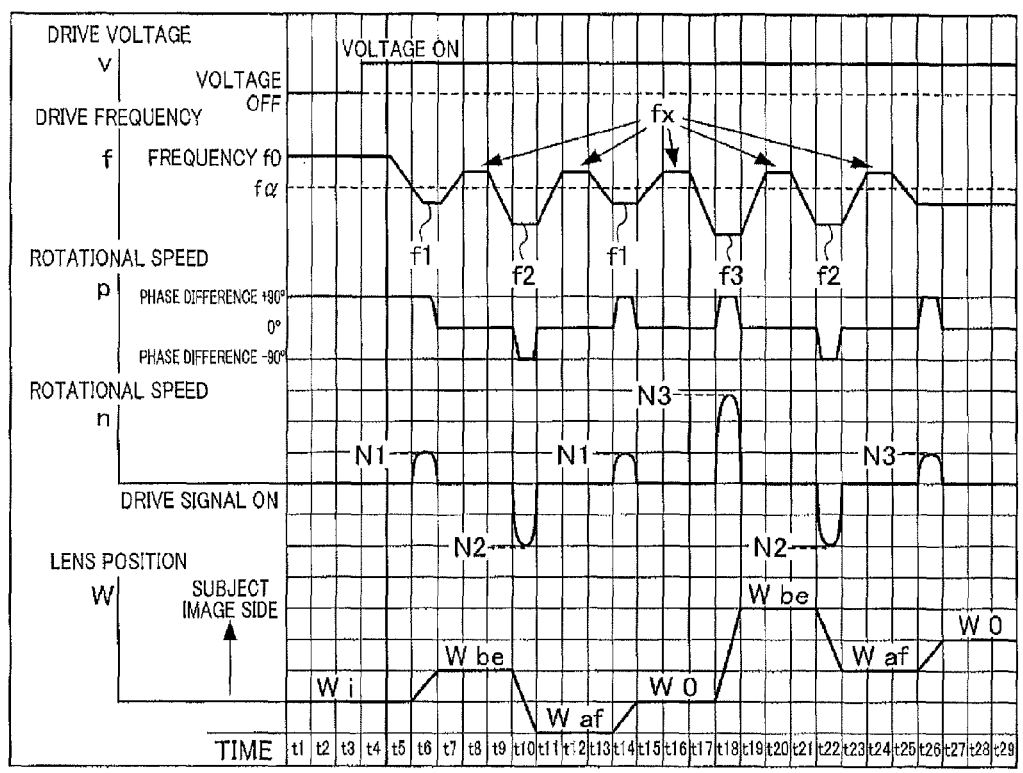
FIG. 44 is a timing chart illustrating the driving pattern of the drive apparatus 730 in wobbling operation according to the seventh embodiment.

FIG. 44 is a timing chart illustrating the driving pattern of a drive apparatus 730 in the wobbling operation according to the seventh embodiment. In FIG. 44, the vertical axis shows in order from the top the drive voltage v, drive frequency f, phase difference p and rotational speed n of the ultrasonic-wave motor 720 and the position W of the lens 711, and the horizontal axis shows time (t1 to t29).

Herein, wobbling operation is one of the focusing means for focusing on a subject automatically during moving image photography. In the wobbling operation, the drive apparatus 730 drives the ultrasonic-wave motor 720 based on a command signal inputted from a control unit of the camera 701 that is not illustrated, and during moving image photography, repeats a sequence of operations (t5 to t16) to cause the position of the lens 11 to move from an initial position Wi to Wbe on the subject side (X1 side) and then stop, cause to move from Wbe to Waf on the imaging element 703 side (X2 side) and then stop, and cause to move from Waf to W0 and then stop, as shown in FIG. 44.

At t4, when moving image photography of the camera 701 is started, the speed control part 731*a* of the drive apparatus 730 applies alternating signals having a drive frequency f=f0 and phase difference p=+90° to the piezoelectric element 724 of the ultrasonic motor 720. At this time, the lens 711 is stopped at the initial position Wi.

At t5, the speed control part 731*a* causes the drive frequency of the ultrasonic-wave motor 720 to change in the lowering direction from f0 to f1, in order to cause the position W of the lens 711 to move from Wi to Wbe, accompanying the start of the wobbling operation.

At t6, when gradually lowering the drive frequency f from f0 to f1, upon passing fα, the ultrasonic-wave motor 720 starts rotation in the clockwise direction G, and the rotational speed reaches n=N1. Along with this, the position W of the lens 711 also starts movement from Wi to the subject side (X1 side). Then, in accordance with the position W of the lens 711 arriving at Wbe, the speed control part 731a changes the phase difference p of the alternating signals applied to the ultrasonic-wave motor 720 from +90° to 0° to cause the ultrasonic-wave motor 720 to stop.

At t7, the stop determination part 731b of the control unit 731 determines whether the ultrasonic-wave motor 720 has stopped, based on the phase difference p of the alternating signals, and information of the rotational speed n output from the speed detection unit 734. If the stop determination part 731b determines that the ultrasonic-wave motor 720 has stopped, the speed control part 731a reads information of a stop frequency fx stored in the storage unit 733, and changes the drive frequency f in the rising direction from f1 to fx.

At t8, the speed control part 731a causes the ultrasonic-wave motor 720 to stop while the drive frequency is f=fx.

At t9, the speed control part 731a causes the drive frequency f of the ultrasonic-wave motor 720 to change in the lowering direction from fx to f2 in order to cause the position W of the lens 711 to move from Wbe to Waf.

At t10, the speed control part 731a gradually changes the phase difference p of the alternating signals applied to the piezoelectric element 724 from 0° to −90°.

The ultrasonic-wave motor 720 thereby rotates in the reverse rotational direction (H direction) and the position W of the lens 711 moves from Wbe to Waf.

Then, in accordance with the position W of the lens 711 arriving at Waf, the speed control part 731a changes the phase difference p of the alternating signals applied to the piezoelectric element 724 from −90° to 0° to cause the ultrasonic-wave motor 720 to stop.

At t11, when the stop determination part 731b determines that the ultrasonic-wave motor 720 has stopped based on information of the phase difference p of the alternating signals and of the rotational speed n output from the speed detection unit 734, the speed control part 731a reads information of the stop frequency fx in the storage unit 311, and changes the drive frequency f in the rising direction from f2 to fx.

At t12, the speed control part 731a causes the ultrasonic-wave motor 720 to stop while the drive frequency is f=fx.

At t13, the speed control part 731a causes the drive frequency f of the ultrasonic-wave motor 720 to change from fx to f1, in order to cause the position W of the lens 711 to move from Waf to W0.

At t14, the speed control part 731a gradually changes the phase difference p of the alternating signals applied to the ultrasonic-wave motor 720 from 0° to +90°.

The ultrasonic-wave motor 720 thereby rotates in the positive rotational direction (G direction), and the position W of the lens 711 moves from Waf to W0.

Then, in accordance with the position of the lens 711 arriving at W0, the speed control part 731a changes the phase difference p of the alternating signals applied to the piezoelectric element 724 from +90° to 0° to cause the ultrasonic-wave motor 720 to stop.

At t15, when the stop determination part 731b determines that the ultrasonic-wave motor 720 has stopped, based on information of the phase difference p of the alternating signals and the rotational speed n output form the speed detection unit 734, the speed control part 731a reads information of the stop frequency fx in the storage unit 733, and changes the drive frequency f in the rising direction from f1 to fx.

At t16, the speed control part 731a causes the ultrasonic-wave motor 720 to stop while the drive frequency is f=fx.

The above sequence of the wobbling operation in t5 to t16 comes to an end, and the drive apparatus 730 repeatedly performs the same operation again from t17.

Next, the operation pattern of the ultrasonic-wave motor in the wobbling operation of a comparative example will be explained. It should be noted that, in the following explanation and in the drawings, explanations for operations similar to the aforementioned operation pattern of the ultrasonic-wave motor 720 of the present invention will be omitted, and only differing operations will be explained.

Figure 45:
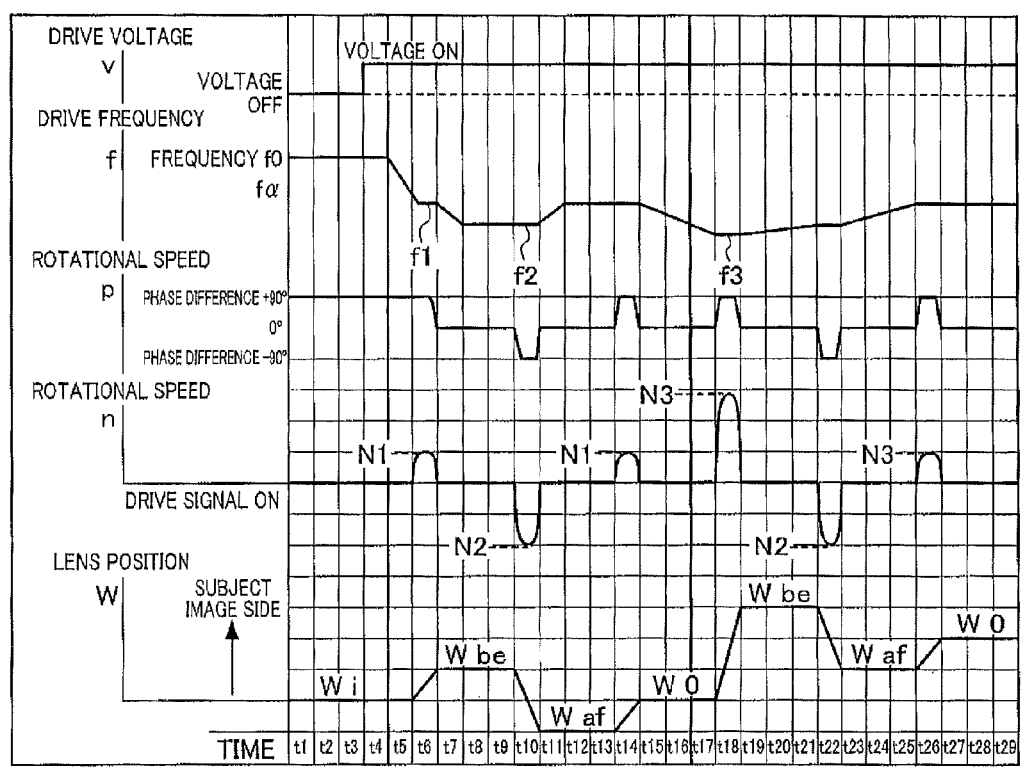
FIG. 45 is a timing chart illustrating the driving pattern of a drive apparatus in the wobbling operation of a comparative example.

FIG. 45 is a timing chart illustrating the drive pattern of the drive apparatus in the wobbling operation of a comparative example. Similarly to FIG. 44, in FIG. 45, the vertical axis shows in order from the top the drive voltage v, drive frequency f, phase difference p and rotational speed n of the ultrasonic-wave motor and the position W of the lens, and the horizontal axis shows time (t1 to t29).

As shown in FIG. 45, in the drive pattern of the drive apparatus in the wobbling operation of the comparative example, if the position W of the lens moves from Wi to Wbe, at t7, the speed control unit changes the drive frequency f in the lowering direction from f1 to f2 in order to move the position W of the lens in a subsequent operation from Wbe to Waf. Then, the speed control part maintains the drive frequency at f=f2, while causing the position W of the lens to move from Wbe to Waf at t10. In contrast, the drive pattern of the present invention differs from the drive pattern of the comparative example in the point of, the speed control part 731a causes the ultrasonic-wave motor 720 to stop with the drive frequency set at f=fx at t8, as mentioned above. In addition, this is similar for t11 to t13 and t15 to 17.

Next, the difference in the amount of power consumption of the ultrasonic-wave motors between the seventh embodiment and the comparative example will be explained.

Figure 46:
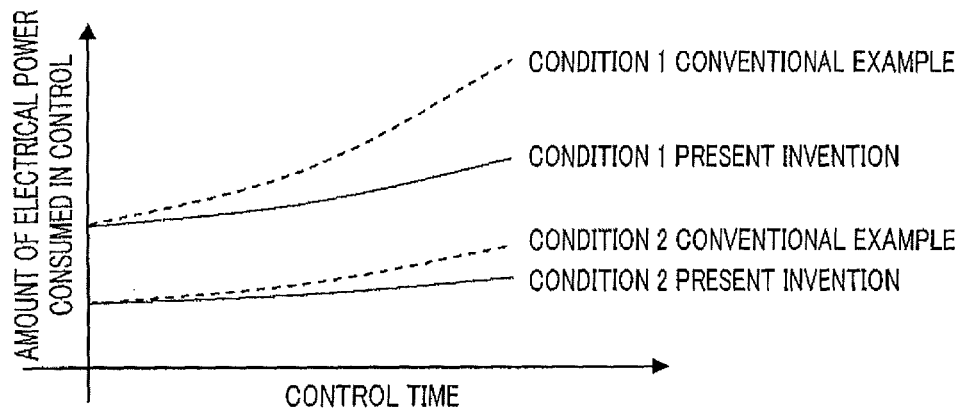
FIG. 46 is a graph comparing between the electricity consumptions of ultrasonic-wave motors according to the comparative example and the seventh embodiment.

FIG. 46 is a graph comparing the amount of power consumption of the ultrasonic-wave motors between the seventh embodiment and the comparative example. In FIG. 46, the vertical axis shows the amount of electrical power consumed by the control of the ultrasonic-wave motor, and the horizontal axis shows the control time.

Since the ultrasonic-wave motor 720 has a trend of the electricity consumption thereof decreasing as the drive frequency f approaches f0 (=fc), when the ultrasonic-wave motor 720 is stopped, the drive apparatus 730 of the present invention changes the drive frequency f thereof to f=fx in the rising direction so as to approach f0.

On the other hand, as mentioned above, when the ultrasonic-wave motor is stopped, in preparation for the subsequent operation, a conventional drive apparatus changes the drive frequency f thereof to f1, f2 or the like, which are in a direction distancing from f0.

Herein, due to being fx>f1>f2, the electricity consumption during stopping of the ultrasonic-wave motor 720 is smaller for the control of the drive apparatus 730 of the present invention, than the control by the drive apparatus of the comparative example.

In FIG. 46, for a case of the stop time of the ultrasonic-wave motor during control being long (condition 1) and a case of being short (condition 2), the electricity consumption is compared according to the drive apparatus 730 of the present invention and the drive apparatus of the comparative example, respectively.

As shown in FIG. 46, in either case, the electricity consumption was lower for the drive apparatus 730 of the present invention than for the drive apparatus of the comparative example, and thus the effect of a reduction in the electricity consumption by the ultrasonic-wave motor 720 of the drive apparatus 730 of the present invention could be confirmed. In addition, since the stop time also lengthens as the control time lengthens, the aforementioned effect of a reduction in the electricity consumption of the present invention becomes more remarkable.

As explained above, there are the following such effects in the drive apparatus 730 and lens barrel 710 according the seventh embodiment.

(1) The drive apparatus 730 can reduce the electricity consumption while stopping of the ultrasonic-wave motor 720 during control, due to making the drive frequency f of the alternating signals applied to the piezoelectric element 724 change to fx in the rising direction so as to approach the electric resonance frequency fc, in the case of the ultrasonic-wave motor 720 being stopped.

(2) Since the stop determination part 731b determines whether the ultrasonic-wave motor 720 has stopped based on the state of the phase difference p of the alternating signals applied to the piezoelectric element 724 and the rotational speed n of the rotational element 721, the speed control part 731a causes the drive frequency f to change prior to the ultrasonic-wave motor 720 completely stopping, and thus can avoid the ultrasonic-wave motor 720 from malfunctioning.

(3) Since the speed detection unit 734 detects the rotational speed n of the rotational element 721 of the ultrasonic-wave motor 720 based on the positional information of the lens 711, an existing position detection unit 713 provided to the lens barrel 710 can be used without providing a sensor for detecting the rotational speed n to the rotational element 721, whereby a reduction in the size of the lens barrel 710 and a cost reduction can be achieved.

(4) Due to using the drive apparatus 730 in driving of the lens 711 of the lens barrel 710, it is possible to reduce the electricity consumption of the ultrasonic-wave motor 720 continuously driving, in a focus operation such as the wobbling operation of the lens 711.

Modified Example 8

The seventh embodiment shows an example in which the stop frequency fx stored in the storage unit 733 is set to a frequency in the middle of f0 and fα, i.e. fx=(f0+fα)/2; however, it is not limited thereto.

As mentioned above, fx can be arbitrarily set so long as between f0 and fα; therefore, it is also possible to set the stop frequency to fx=fα, for example. By configuring as such, it is possible to reduce the electricity consumption during stopping of the ultrasonic-wave motor 720, and quicken the response time from a stopped state of the ultrasonic-wave motor 720 to rotational motion.

In addition, due to being f0=fc if setting the stop frequency to fx=f0, the drive apparatus 730 can cause the electricity consumption during stopping of the ultrasonic-wave motor 720 to reduce the most efficiently.

Modified Example 9

The seventh embodiment shows an example in which the speed detection unit 734 detects the rotational speed n of the rotational element 721 based on positional information of the position detection unit 713; however, it is not limited thereto. For example, a sensor for detecting the rotational speed n may be provided to the rotational element 721, and the rotational speed n of the rotational element 721 may be detected directly.

Modified Example 10

The seventh embodiment shows an example in which the ultrasonic-wave motor 720 is an annular progressive wave-type ultrasonic-wave motor of rotational type; however, it is not limited thereto. For example, it is also possible to employ a rod-shaped ultrasonic-wave motor of rotational type.

Modified Example 11

The seventh embodiment shows an example of using the drive circuit 732 to which a transformer is provided; however, it is also possible to employ a drive circuit to which an inductor is provided, for example.

Modified Example 12

The seventh embodiment explains an example of a wobbling operation during moving image photography of the lens barrel 710; however, it is not limited thereto. It is also possible to employ a different operation, for example, an auto-focus operation during still image photography, and similar effects as the present invention can be obtained thereby.

The embodiments and modified examples explained above are merely exemplifications after all, and the present invention is not limited to these contents so long as the characteristics of the invention are not impaired. In addition, the embodiments and modified examples explained above may be realized by combinations thereof, so long as the characteristics of the invention are not impaired.

The invention claimed is:

1. A drive apparatus, comprising:
   a signal generation unit that generates a pair of drive signals;
   an electro-mechanical conversion element to which the drive signals generated by the signal generation unit are applied;
   a vibrating body that generates a drive force by way of vibration of the electro-mechanical conversion element;
   a moving body that is under pressurized contact with the vibrating body and is driven by way of the drive force; and
   a control unit that sets a frequency and phase difference of the drive signals, wherein
   the control unit changes the phase difference after setting the frequency to a holding frequency at which a drive speed of the moving body becomes substantially zero, when changing a driving direction of the moving body.

2. The drive apparatus according to claim 1, wherein the control unit sets an average value of a natural frequency fn of an nth order vibration and a natural frequency fn+1 of an n+1th order vibration as the holding frequency.

3. The drive apparatus according to claim 1, wherein the control unit sets a frequency that is higher frequency than the average value of a natural frequency fn of an nth order vibration and a natural frequency fn+1 of an n+1th order vibration, and lower frequency than the natural frequency fn+1, or sets a frequency that is lower frequency than the average value and higher frequency than the natural frequency fn, as the holding frequency.

4. The drive apparatus according to claim 3, wherein the control unit sets a frequency that is lower frequency than the average value and higher frequency than the natural frequency fn, when a subsequent driving direction of the moving body is the same as a previous driving direction, and sets a frequency that is higher frequency than the average value and lower frequency than the natural frequency fn+1, when the subsequent driving direction of the moving body is opposite to the previous driving direction, as the holding frequency.

5. An optical device comprising the drive apparatus according to claim 1.

* * * * *